US011194100B2

(12) United States Patent
Shonkwiler et al.

(10) Patent No.: US 11,194,100 B2
(45) Date of Patent: Dec. 7, 2021

(54) OPTICAL FIBER CONNECTION SYSTEM

(71) Applicant: 3M INNOVATIVE PROPERTIES COMPANY, St. Paul, MN (US)

(72) Inventors: Nathaniel S. Shonkwiler, Austin, TX (US); Richard L. Simmons, Austin, TX (US); Donald K. Larson, Cedar Park, TX (US); William J. Clatanoff, Austin, TX (US); Janet A. Kling, Manor, TX (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/652,571

(22) PCT Filed: Oct. 15, 2018

(86) PCT No.: PCT/IB2018/057980
§ 371 (c)(1),
(2) Date: Mar. 31, 2020

(87) PCT Pub. No.: WO2019/077472
PCT Pub. Date: Apr. 25, 2019

(65) Prior Publication Data
US 2020/0241211 A1 Jul. 30, 2020

Related U.S. Application Data

(60) Provisional application No. 62/573,931, filed on Oct. 18, 2017.

(51) Int. Cl.
*G02B 6/38* (2006.01)
(52) U.S. Cl.
CPC .................. *G02B 6/3803* (2013.01)

(58) Field of Classification Search
CPC .................................................. G02B 6/3803
See application file for complete search history.

(56) References Cited

U.S. PATENT DOCUMENTS 3,810,802 A   5/1974 Buhite
3,864,018 A   2/1975 Miller
(Continued)

FOREIGN PATENT DOCUMENTS

AU   200178275   1/2002
EP   0927897     7/1999
(Continued)

OTHER PUBLICATIONS

International Search report for PCT International Application No. PCT/IB2018/057980 dated Jan. 28, 2019, 5 pages.

*Primary Examiner* — Sung H Pak
(74) *Attorney, Agent, or Firm* — Jonathan L. Tolstedt

(57) ABSTRACT

An optical fiber connection system (600) configured to interconnect a plurality of first and second optical fibers (54, 54') is described. The connection system comprises a first bare fiber holder (620) that includes a clamping plate (540) having an interconnection portion (544) with a generally planar surface, wherein bare ends of the plurality of first optical fibers (54) are disposed adjacent to interconnection portion (544) and wherein the plurality of first optical fibers (54) are secured in the first bare fiber holder (620) at a first distance from the bare ends of the plurality of first optical fibers (54) and a second bare fiber holder (620') that includes a splicing plate (580) having a plurality of alignment channels (585), wherein a bare end of each of the second optical fibers (54') extend at least partially into one of the plurality of alignment channels (585) and wherein the plurality of second optical fibers (54') are held at a second distance from the bare ends of the plurality of second optical fibers (54').

26 Claims, 48 Drawing Sheets

(56) References Cited

U.S. PATENT DOCUMENTS

| | | |
|---|---|---|
| 3,919,037 A | 11/1975 | Miller |
| 4,046,454 A | 9/1977 | Pugh, III |
| 4,148,559 A | 4/1979 | Gauthier |
| 4,186,997 A * | 2/1980 | Schumacher ........ G02B 6/3809 385/65 |
| 4,227,951 A | 10/1980 | Mignien |
| 4,580,874 A | 4/1986 | Winter |
| 4,662,713 A | 5/1987 | Davies |
| 4,717,233 A | 1/1988 | Szkaradnik |
| 4,973,126 A | 11/1990 | Degani |
| 5,042,902 A | 8/1991 | Huebscher |
| 5,381,498 A | 1/1995 | Bylander |
| 5,732,174 A | 3/1998 | Carpenter |
| 5,757,997 A | 5/1998 | Birrell |
| 6,151,433 A | 11/2000 | Dower |
| 6,331,080 B1 | 12/2001 | Cole |
| 6,758,600 B2 | 7/2004 | Del Grosso |
| 6,869,227 B2 | 3/2005 | Del Grosso |
| 9,791,635 B2 | 10/2017 | Richmond |
| 2006/0159402 A1* | 7/2006 | Ammer ................ G02B 6/3809 385/71 |
| 2011/0198324 A1* | 8/2011 | de Jong ................ G02B 6/245 219/121.72 |
| 2017/0299831 A1* | 10/2017 | Ott ....................... G02B 6/4403 |

FOREIGN PATENT DOCUMENTS

| | | |
|---|---|---|
| EP | 1039322 | 9/2000 |
| EP | 1184695 | 3/2002 |
| WO | WO 2018-045383 | 3/2002 |
| WO | WO 2015-009811 | 1/2015 |
| WO | WO 2017-063106 | 4/2017 |
| WO | WO 2018-044565 | 3/2018 |
| WO | WO 2018-045382 | 3/2018 |
| WO | WO 2018-052777 | 3/2018 |
| WO | WO 2019-030635 | 2/2019 |
| WO | WO 2019-077470 | 4/2019 |
| WO | WO 2019-077471 | 4/2019 |

\* cited by examiner

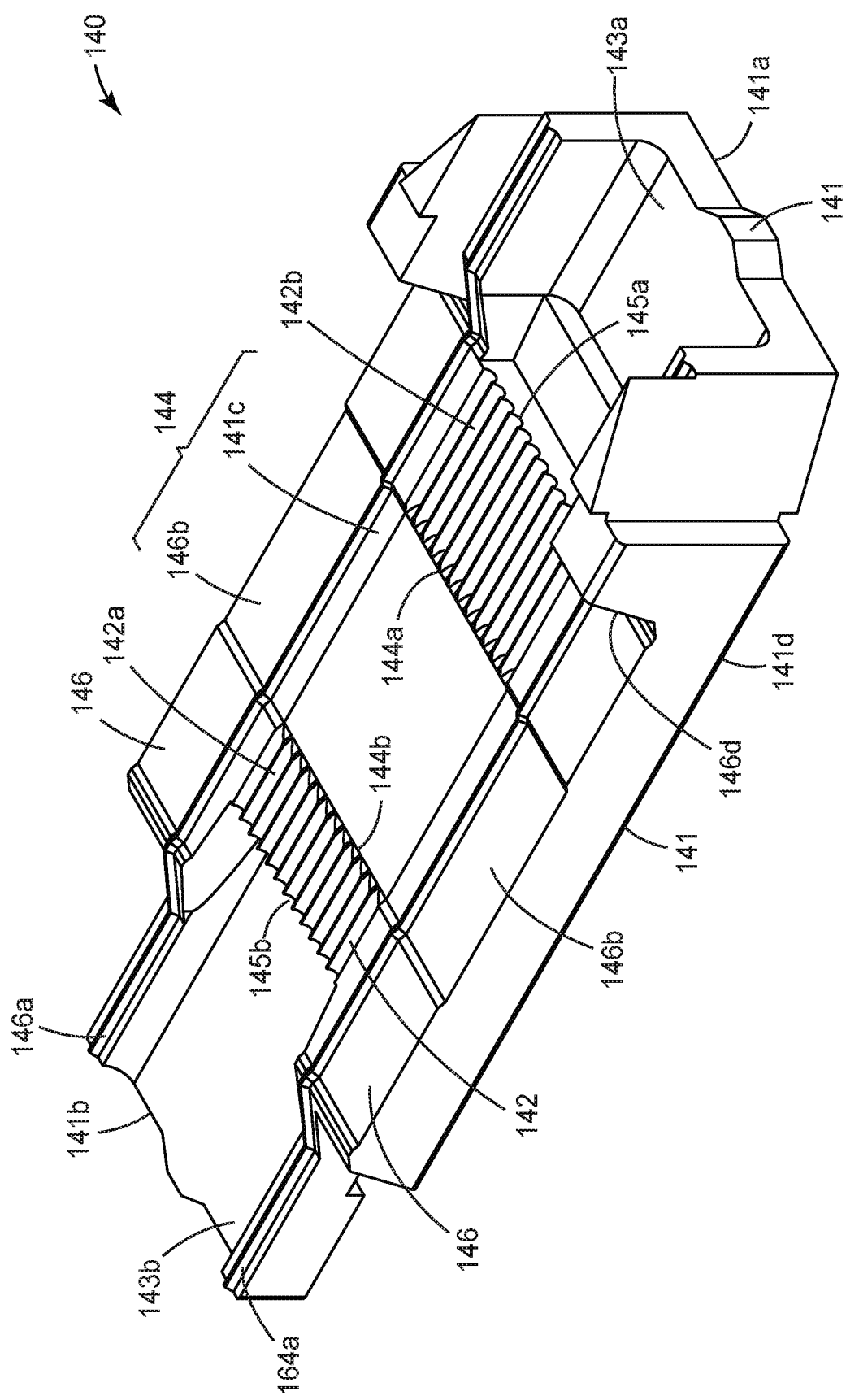

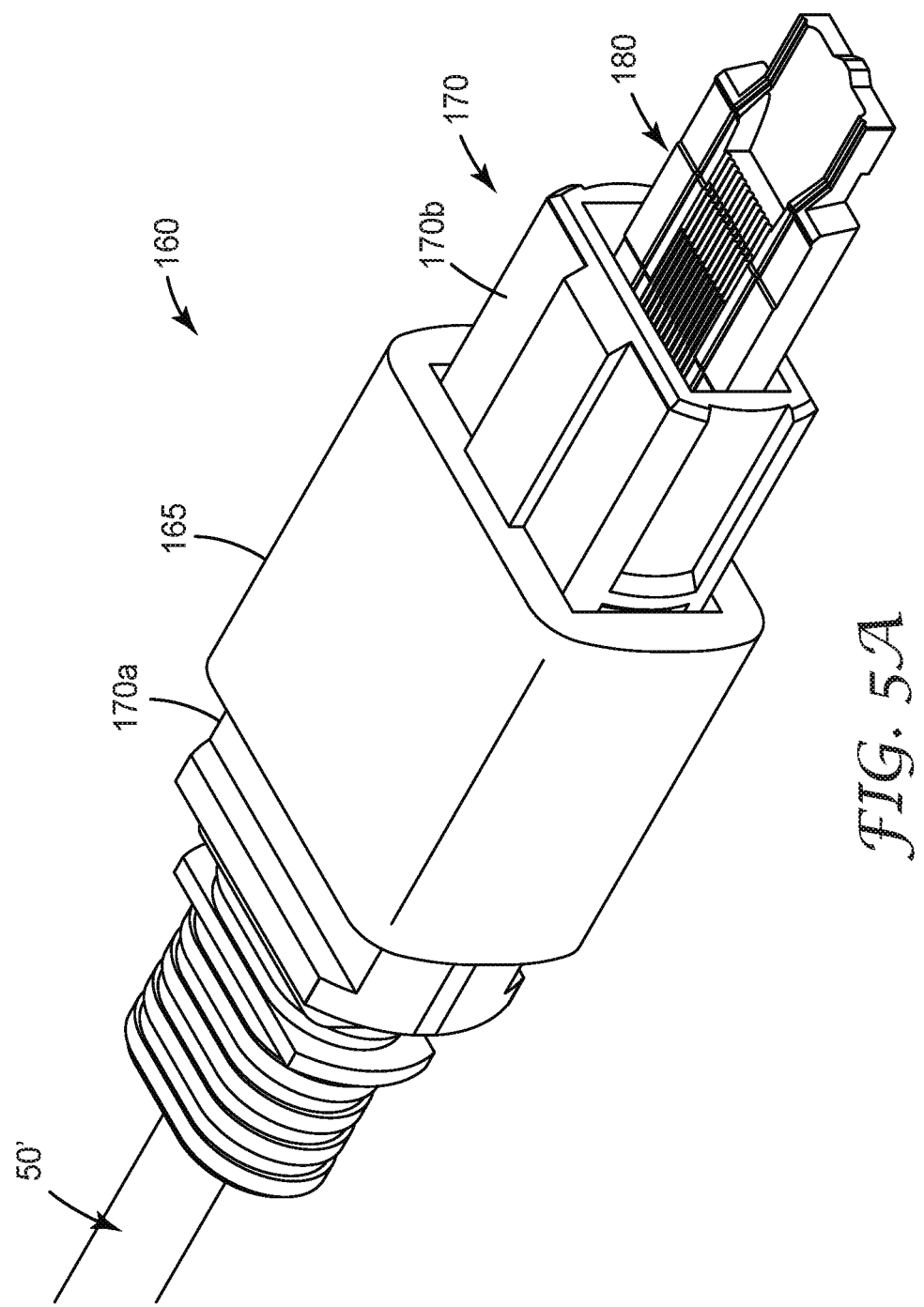

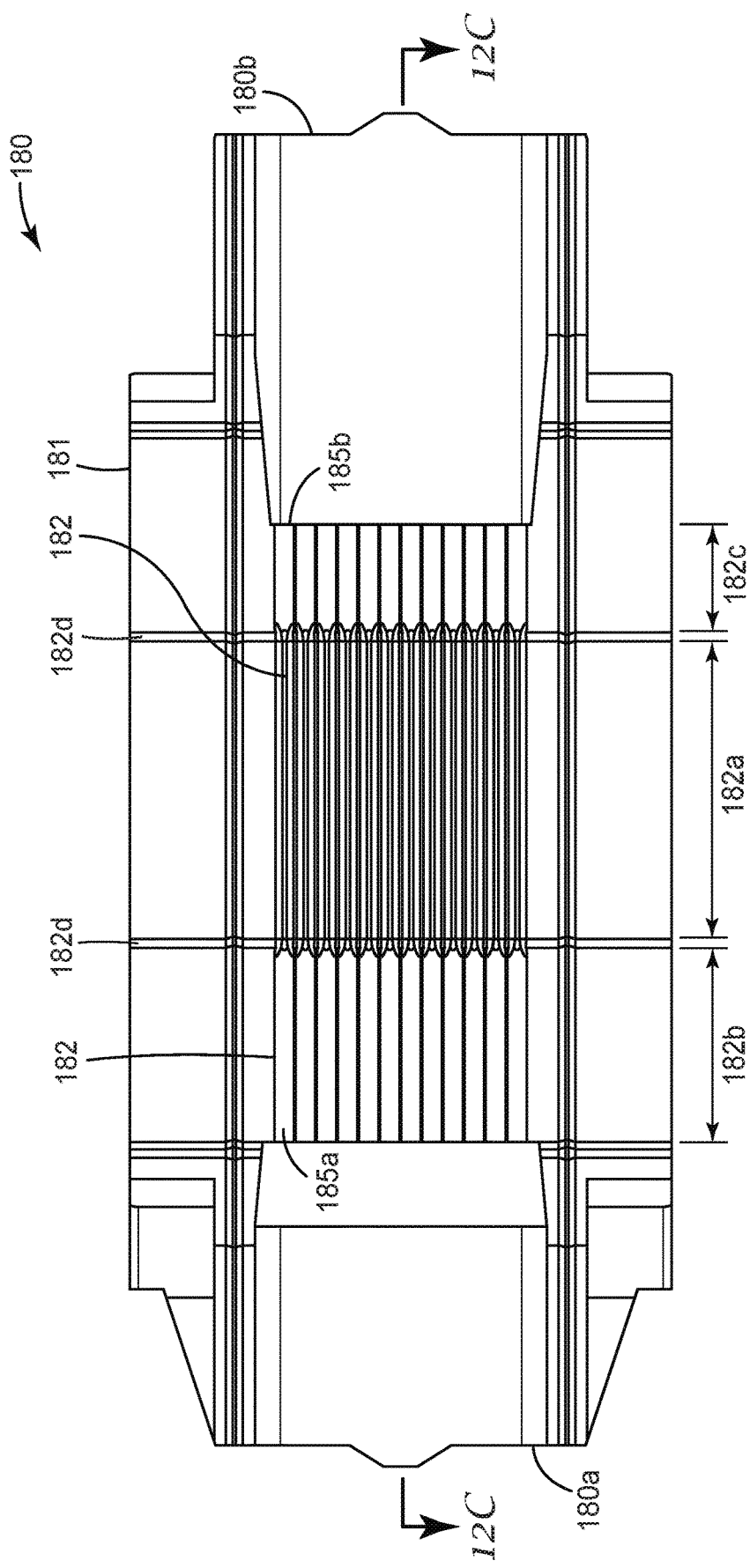

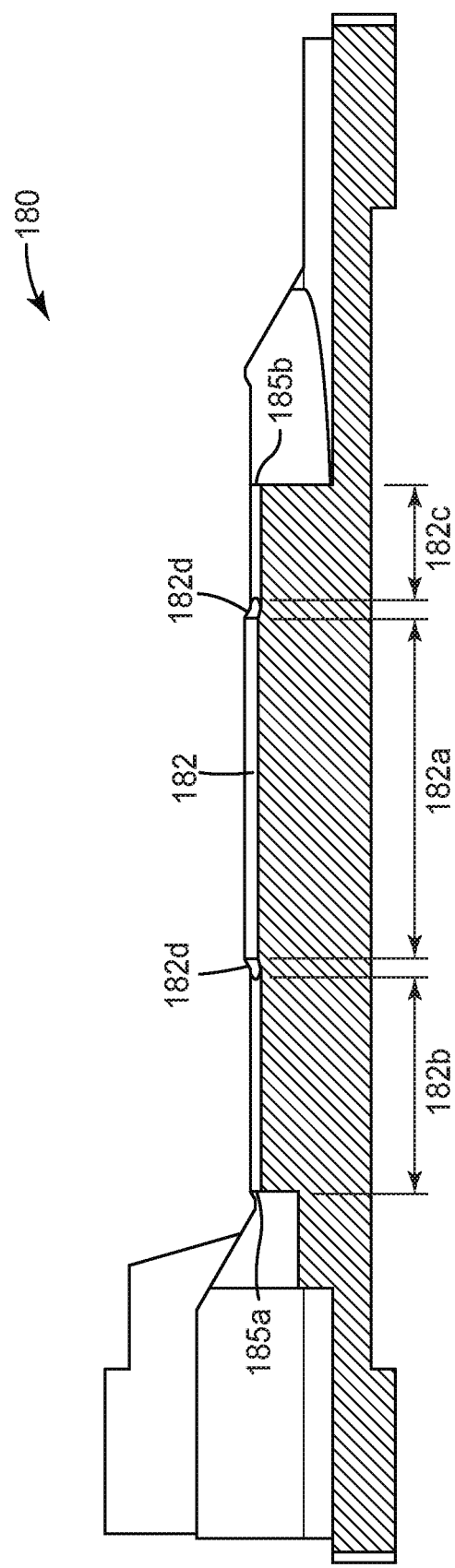

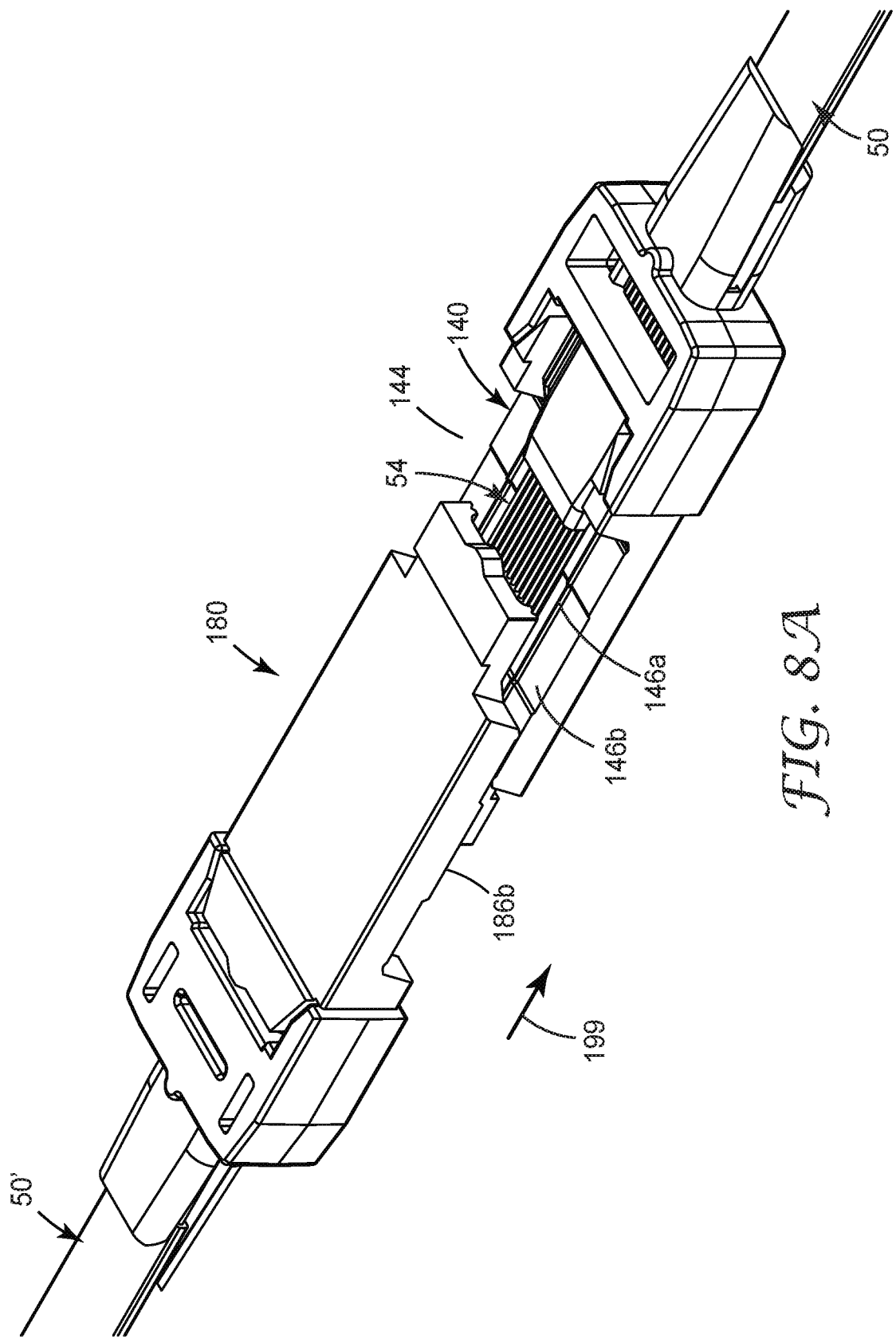

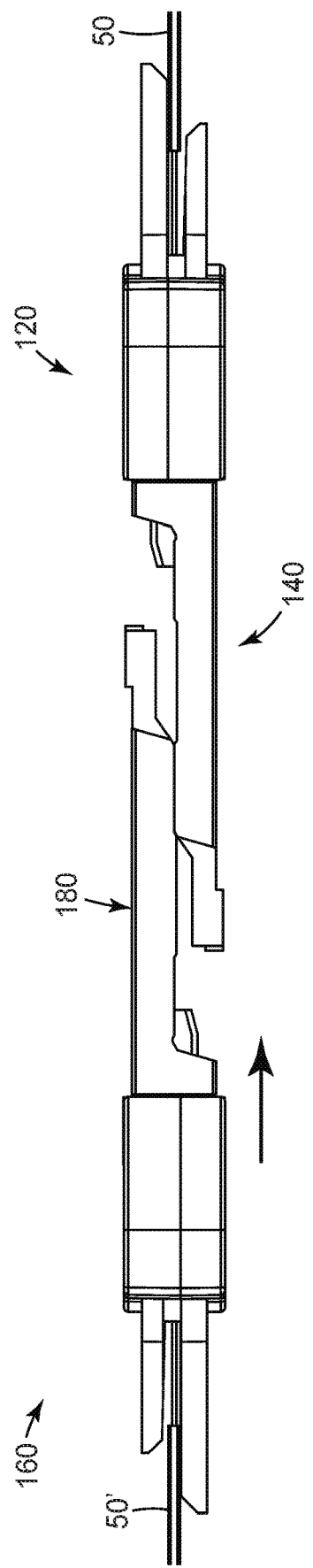

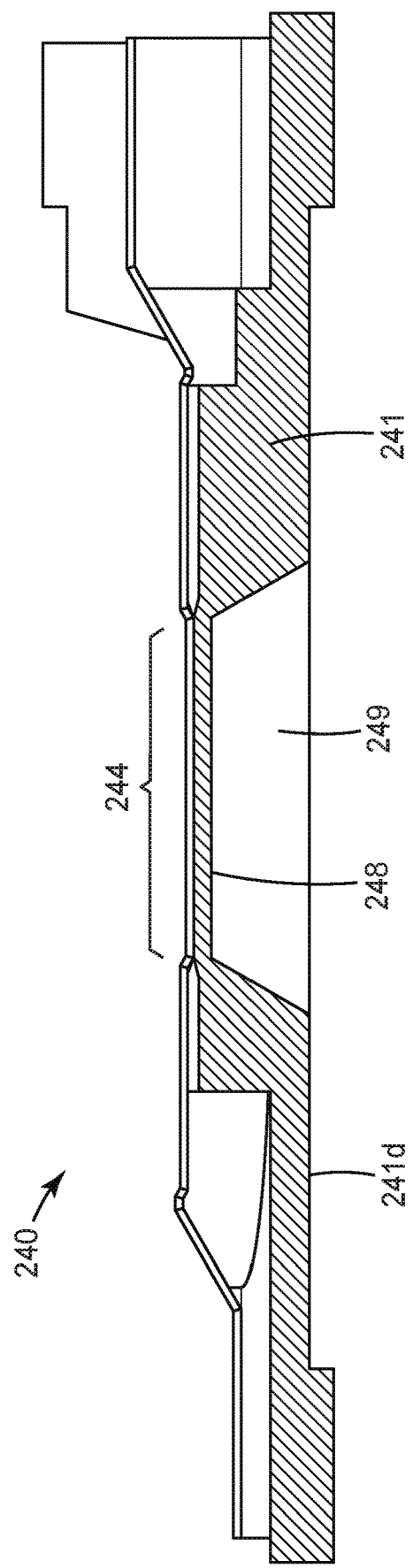

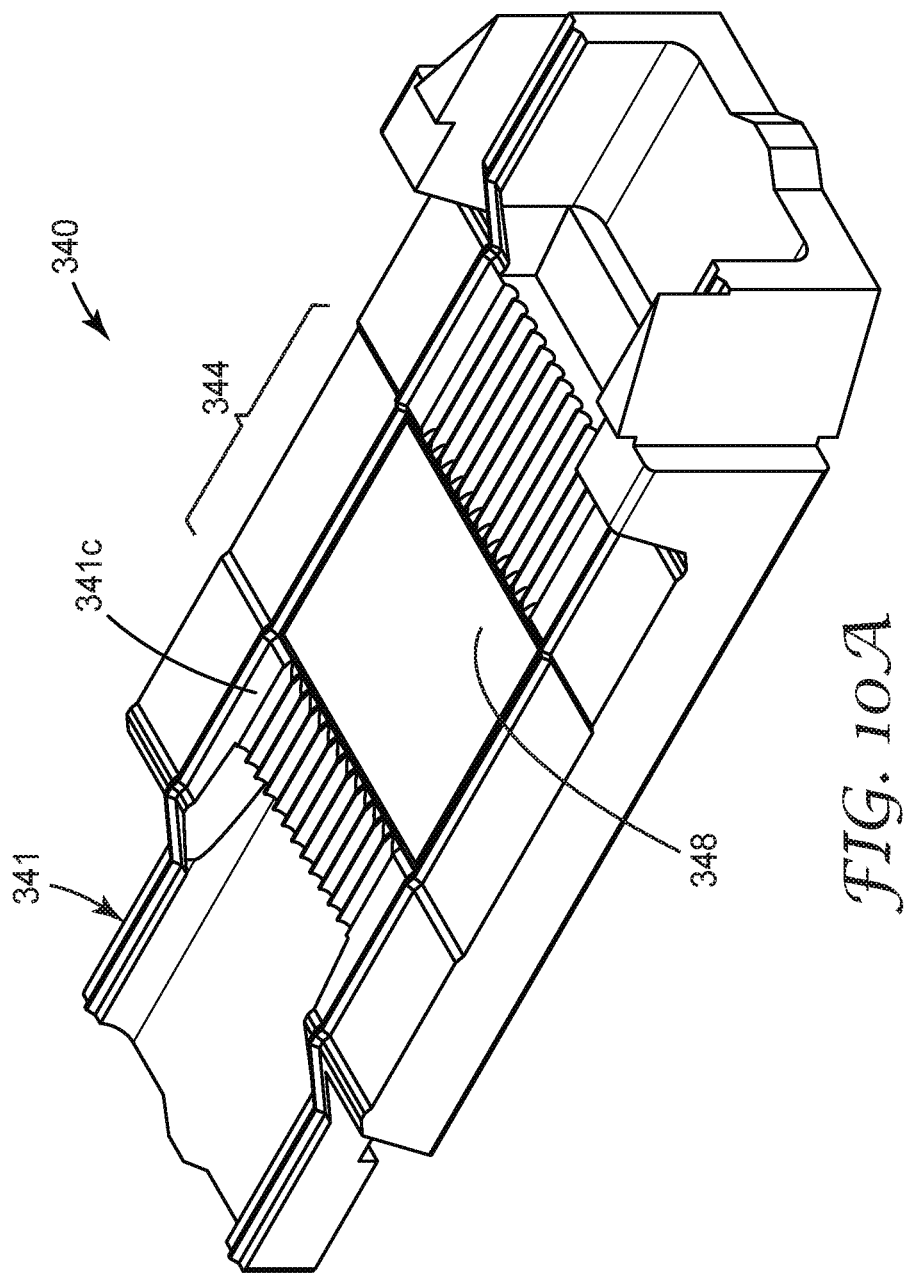

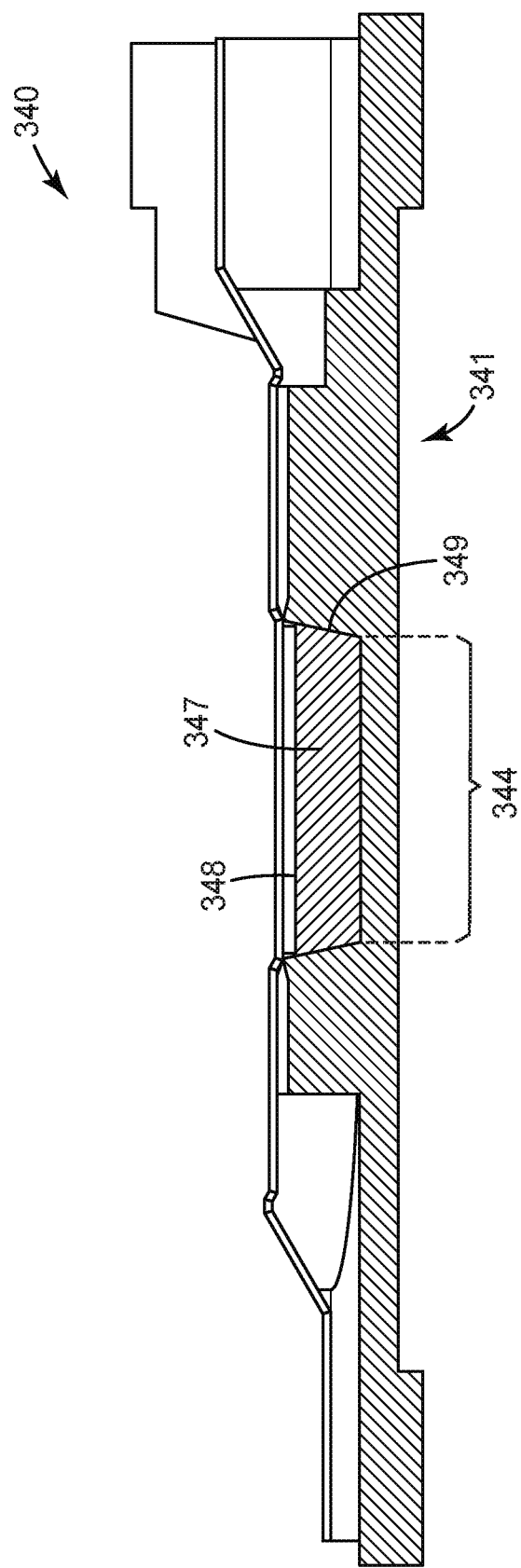

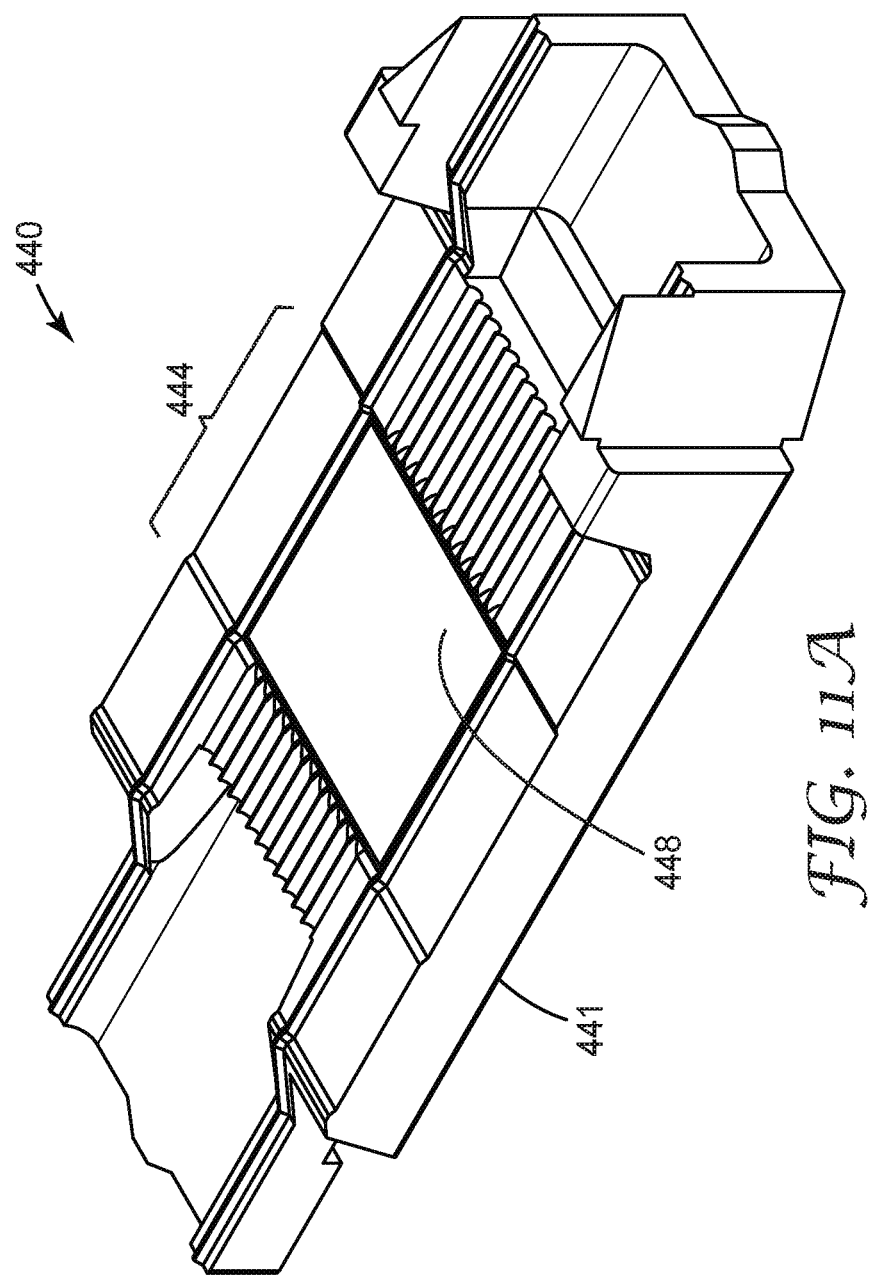

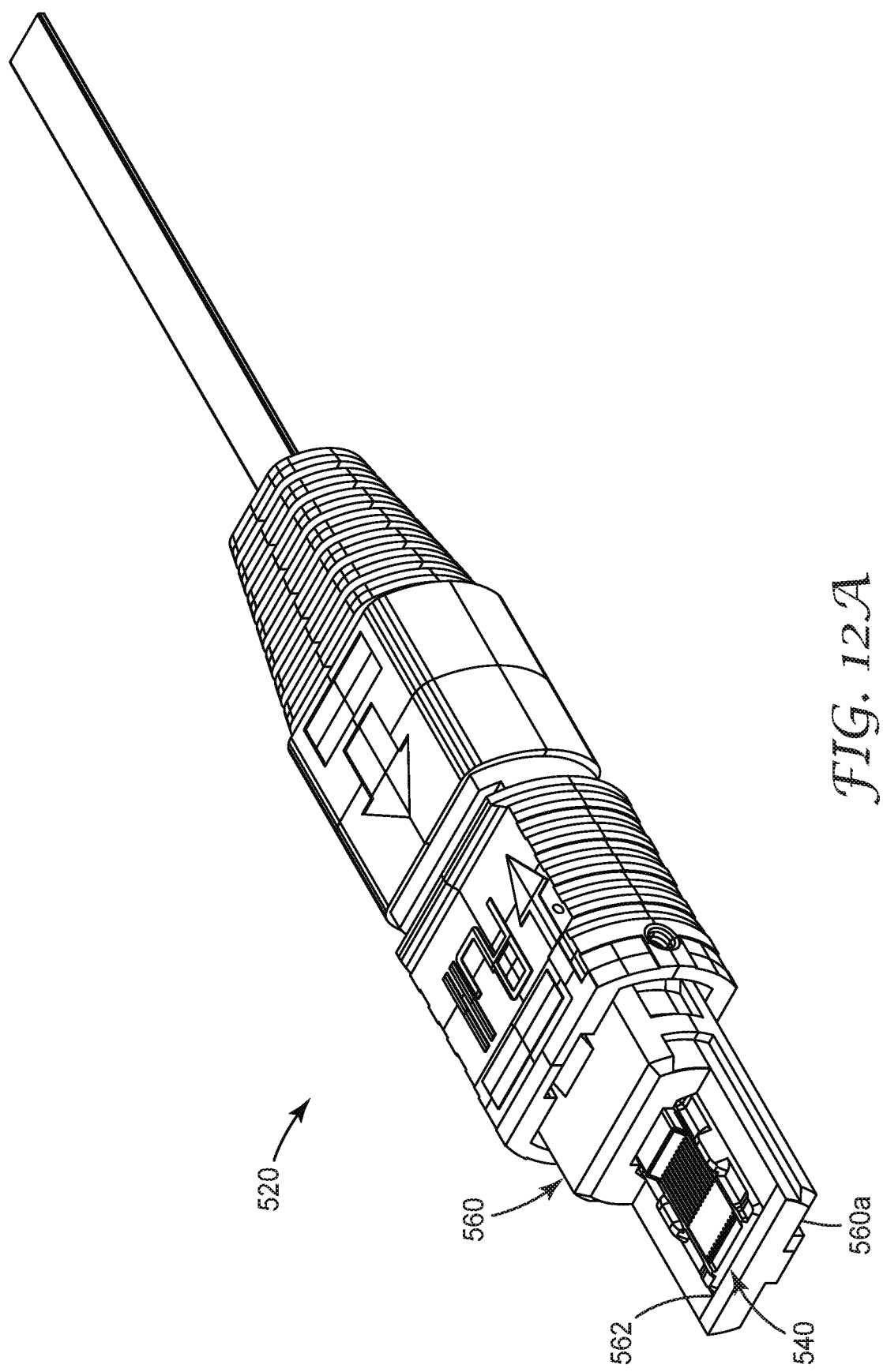

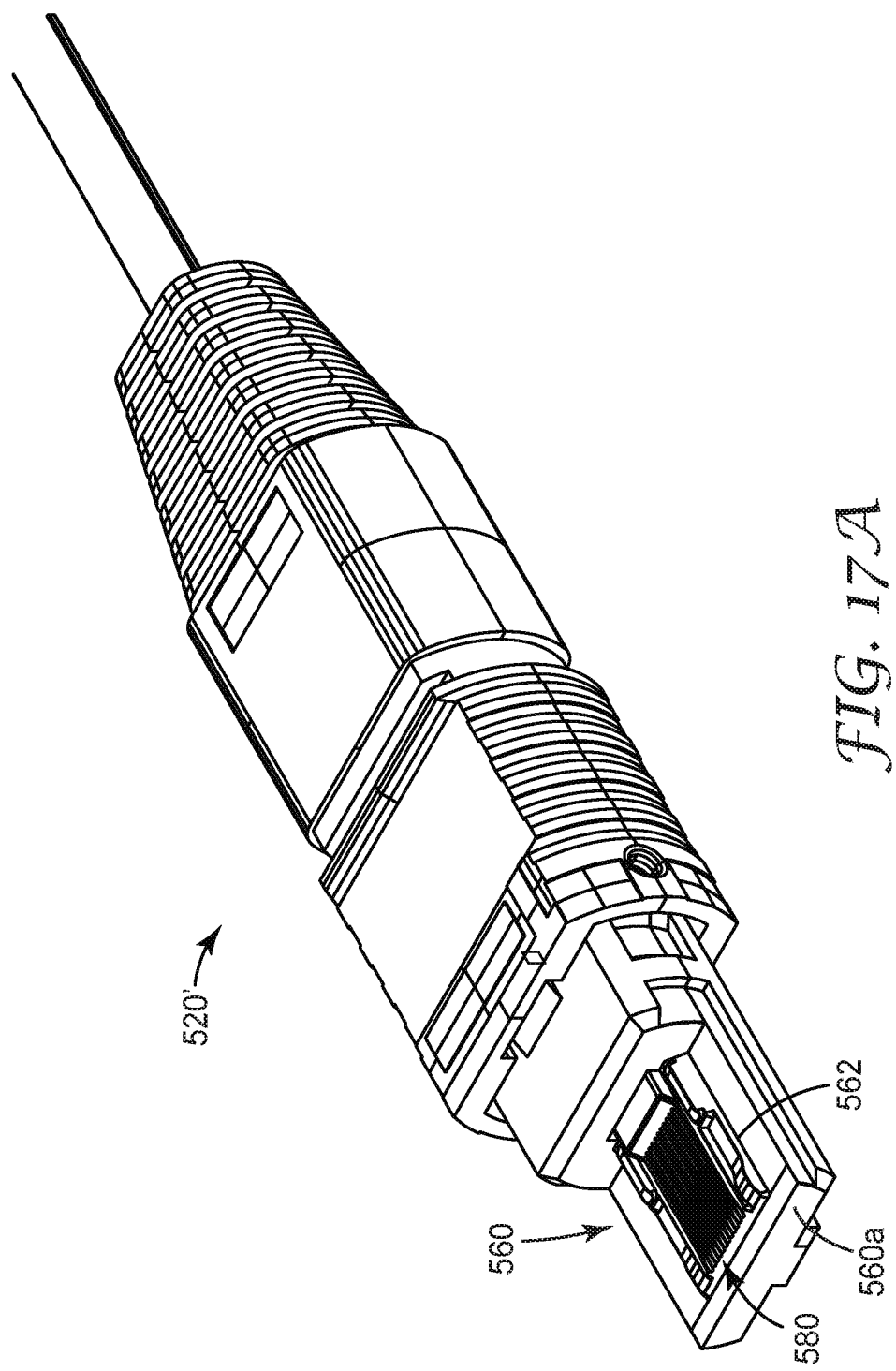

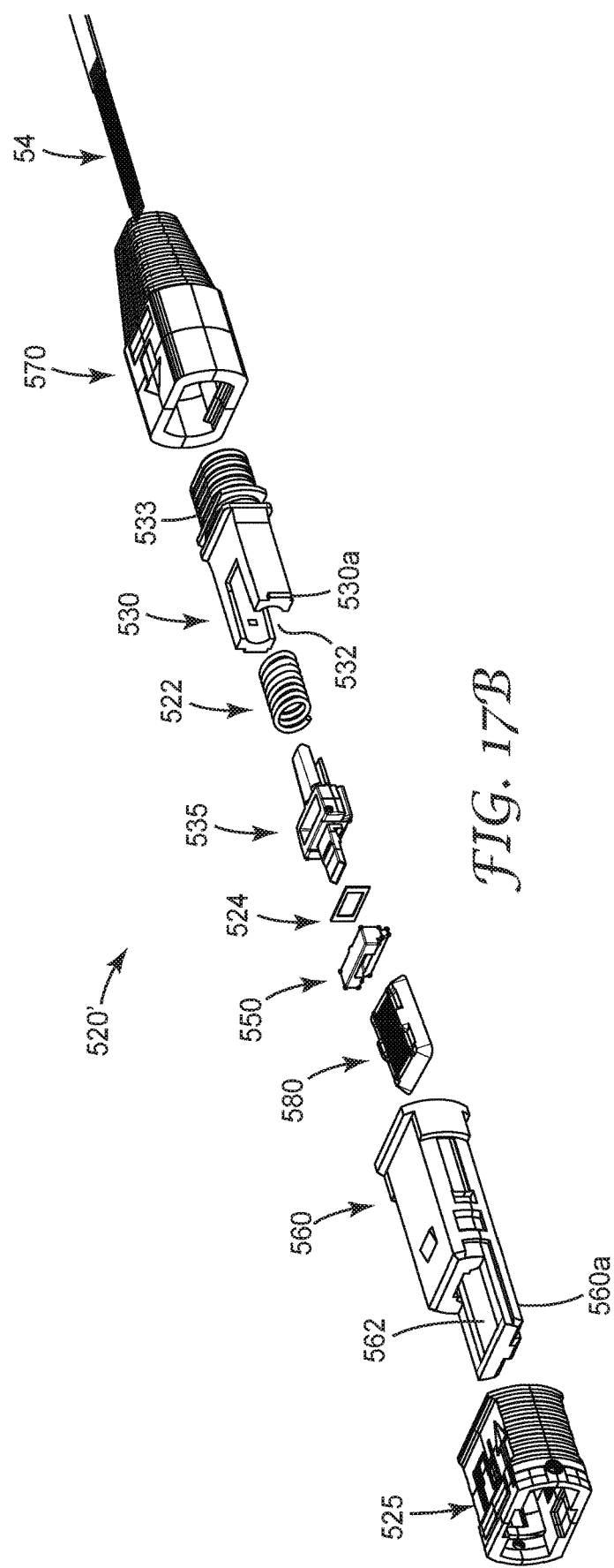

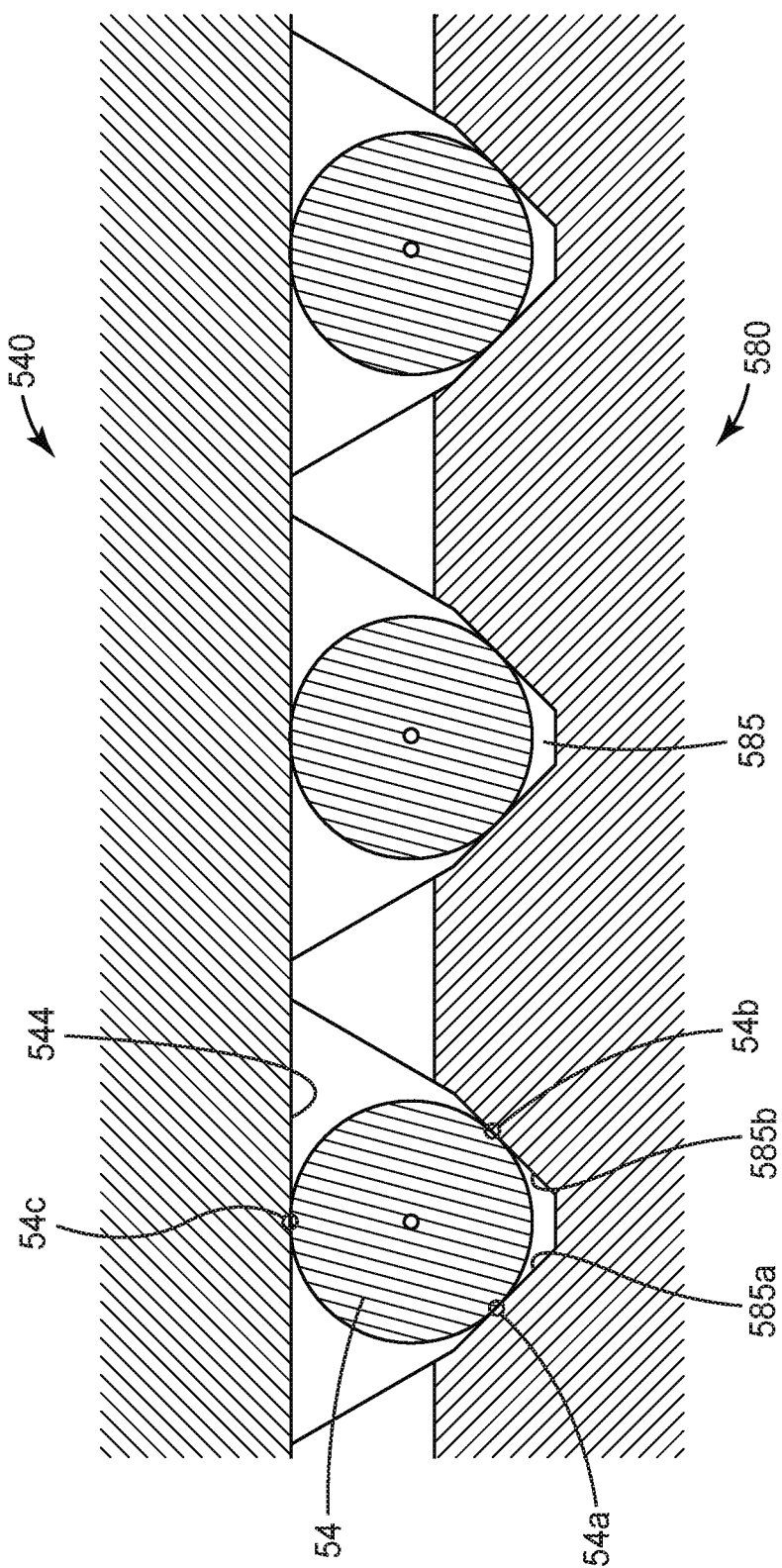

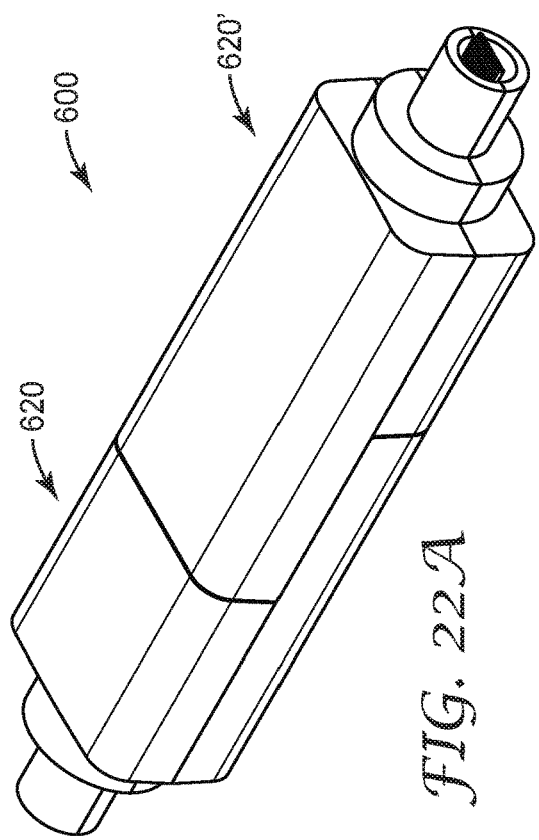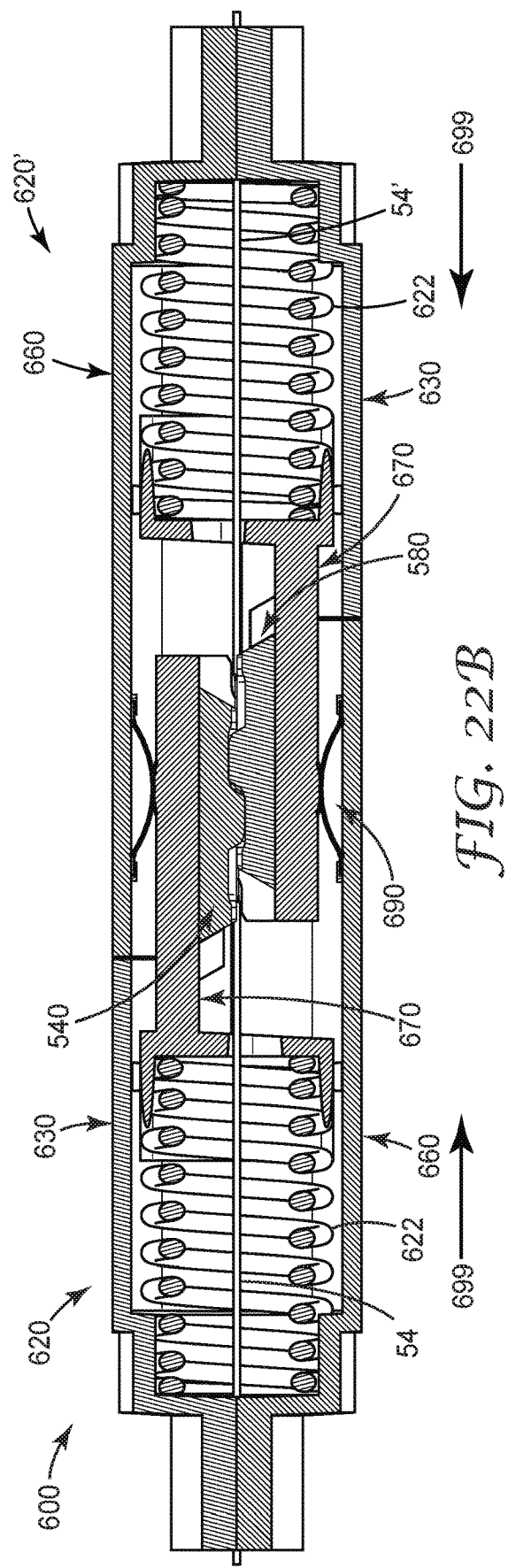
FIG. 22A
FIG. 22B

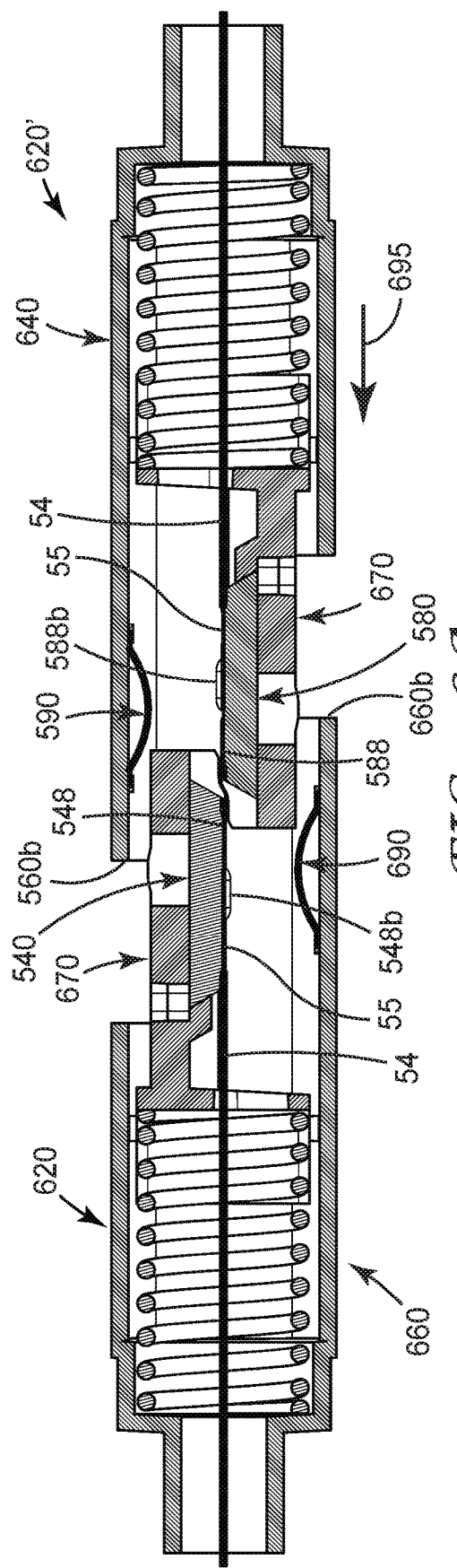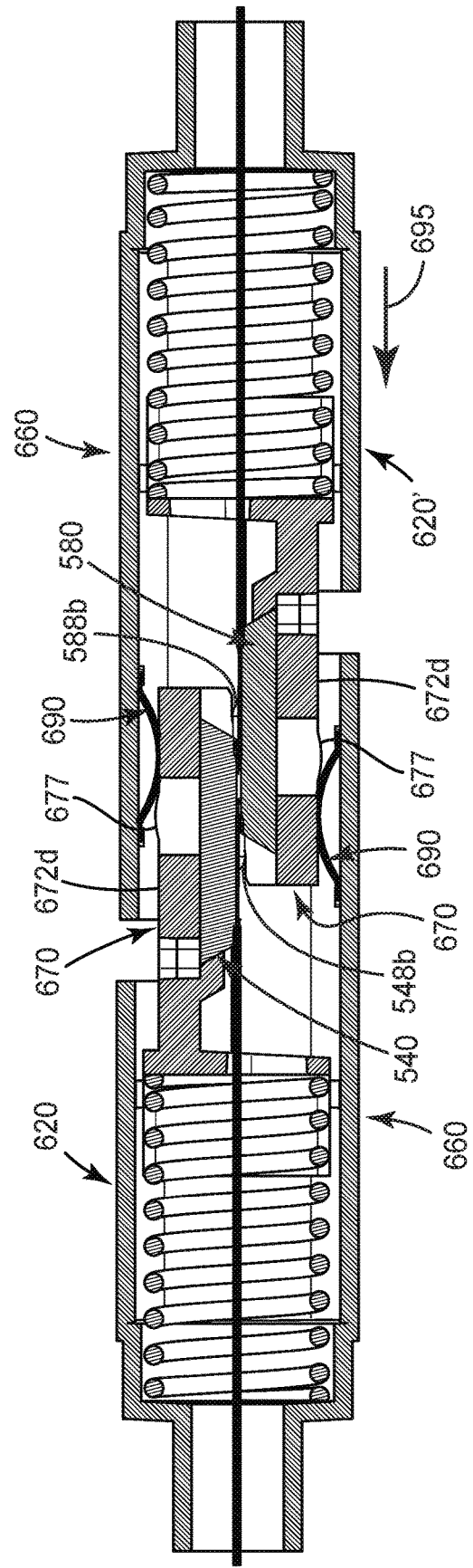

OPTICAL FIBER CONNECTION SYSTEM

BACKGROUND

Field of the Invention

The present invention is directed to an optical fiber connection system to interconnect a first plurality of optical fibers and a second plurality of optical fibers.

Related Art

Communication network owners and operators are faced with increasing demands to deliver faster and better service to their customers. They can meet these needs for greater bandwidth by incorporating fiber optics in their networks. Optical fiber cables are used in the optical network to transmit signals between access nodes to transmit voice, video, and data information.

Some conventional optical fiber cables include optical fiber ribbons that includes a coated group of optical fibers that are arranged in a planar array. Optical fibers in the ribbon are generally disposed generally parallel to each other. Optical fiber ribbons are typically interconnected using multi-fiber optical connectors, for example, MPO/MTP connectors which can be used in data centers or other points in the network where parallel optical interconnections are needed.

Data centers rely on 10G and 40G transmission rates which are relatively mature technologies. The global data center Internet protocol (IP) traffic is anticipated to grow by about 31 percent annually within the next five years due to changes in the way people are using Internet. Cloud computing, mobile devices, access video and social media content around the globe are driving data centers to migrate from 10G and 40G transmission rates to 100G and 400G transmission rates.

Data centers are moving toward 40G/100G transmission rates which utilize multiple parallel network links that are then aggregated to achieve higher overall data rates. Polarity in fiber optic cabling is essentially the matching of the transmit signal (Tx) to the receive equipment (Rx) at both ends of the fiber optic link by providing transmit-to-receive connections across the entire fiber optic system. Polarity is managed by use of transmit and receive pairs (duplex cabling), but becomes more complex with multi-fiber connectivity which support multiple duplex pairs such as MPO/MTP connectors.

Higher bandwidth links will require more power to assure signal transmission integrity. Today, heat dissipation from the electronics is already a concern and increasing the power further will amplify the issues that data centers are already facing. This increasing need for more power as well as the desire to install future flexible structured cabling systems is driving interconnection performance to low loss performance (less than 0.1 dB per connection point).

Conventional single fiber ferrule type connectors offer easy reconfiguration, but have the drawback of high optical loss (0.2-0.3 dB) and even higher loss for multi-fiber ferruled connectors such as MPO/MTO connectors (0.35-0.7 dB). Ferruled connectors must be cleaned every time that they are mated. In addition, space required for ferruled connectors limits the interconnection density.

Fusion splicing is another conventional interconnection method, which creates low loss permanent reliable splices. However, handling 250-micron fiber during preparation, fuse, storage can be troublesome. Today, such fusion splices typically require their own splice rack in the data center.

Finally, traditional gel type mechanical splices offer permanent and reliable fiber slices with insertion loss better than connectors and approaching that of fusion splices. However, these mechanical splices employ index matching gels which are not solid materials and therefore, provide no structural integrity.

Thus, need exists for new multi-fiber interconnect technology that offer "fusion-like" optical performance to facilitate datacenter bandwidth migration from 10G and 40G transmission rates, today, to tomorrow's 100G and 400G transmission rates.

SUMMARY

According to an embodiment of the present invention, an optical fiber connection system configured to interconnect a plurality of first and second optical fibers is described herein. The connection system comprises a first bare fiber holder comprising a bare fiber holding plate, wherein the bare fiber holding plate of the first bare fiber holder is a clamping plate having an interconnection portion with a generally planar surface and wherein bare ends of the plurality of first optical fibers are disposed adjacent to interconnection portion and where the plurality of first optical fibers are secured in the first bare fiber holder at a first distance from the bare ends of the plurality of first optical fibers and a second bare fiber holder comprising a bare fiber holding plate, wherein the bare fiber holding plate of the second bare fiber holder is a splicing plate having a plurality of alignment channels and wherein a bare end of each of the second optical fibers extend at least partially into one of the plurality of alignment channels and wherein the plurality of second optical fibers are held at a second distance from the bare ends of the plurality of second optical fibers. The first and second bare fiber holders are slidably connected together or mated to simultaneously form a plurality of optical connections between the bare ends of the plurality of first and second optical fibers.

In a second embodiment, an optical fiber connection system configured to interconnect at least a first and a second optical fiber comprises a first bare fiber holder and a second bare fiber holder. The first bare fiber holder includes a bare fiber holding plate, wherein the bare fiber holding plate of the first bare fiber holder is a clamping plate. The clamping plate has an interconnection portion with a generally planar surface, wherein a bare end of the first optical fiber is disposed adjacent to the interconnection portion and where the first optical fiber is secured in the first bare fiber holder at a first distance from the bare end of the first optical fibers. The second bare fiber holder has a bare fiber holding plate, wherein the bare fiber holding plate of the second bare fiber holder is a splicing plate. The splicing plate has a plurality of alignment channels formed in a surface thereof, wherein a bare end of the second optical fiber extends at least partially into the alignment channel. The second optical fiber is held at a second distance from the bare end of the second optical fibers. The first and second bare fiber holders are slidably connected or mated together to simultaneously form an optical connection between the bare ends of the first and second optical fibers.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIG. 3 is an isometric view of an exemplary first bare fiber holding plate of the first bare fiber holder of FIGS. 2A-2B.

FIGS. 5A-5B are two views of a second bare fiber holder according to an aspect of the invention.

FIGS. 6A-6C is an exemplary second bare fiber holding plate of the second bare fiber holder of FIGS. 5A-5B.

FIGS. 8A-8D are four views showing the optical coupling of first and second optical fiber arrays held by the first and second bare fiber holders, respectively.

FIGS. 9A-9C are three views of an exemplary alternative first bare fiber holding plate of the first bare fiber holder.

FIGS. 10A-10B are two views of a second exemplary alternative first bare fiber holding plate of the first bare fiber holder.

FIGS. 11A-11C are three views of a third exemplary alternative first bare fiber holding plate of the first bare fiber holder.

FIGS. 12A and 12B are two views of a first bare fiber holder according to another embodiment of the invention.

FIGS. 17A and 17B are two views of a second bare fiber holder according to another embodiment of the invention.

FIG. 19 is a schematic diagram showing a plurality of optical fibers being held between the clamping element of FIG. 13 and the splice element of FIGS. 18A and 18B.

FIGS. 22A and 22B are two views of a third embodiment of an exemplary optical fiber connection system in accordance with the present invention.

FIGS. 26A-26C are three cross-sectional views showing the mating of the first bare fiber holder of FIGS. 23A-23C and the second bare fiber holder of FIGS. 25A-25B.

Figure 1:
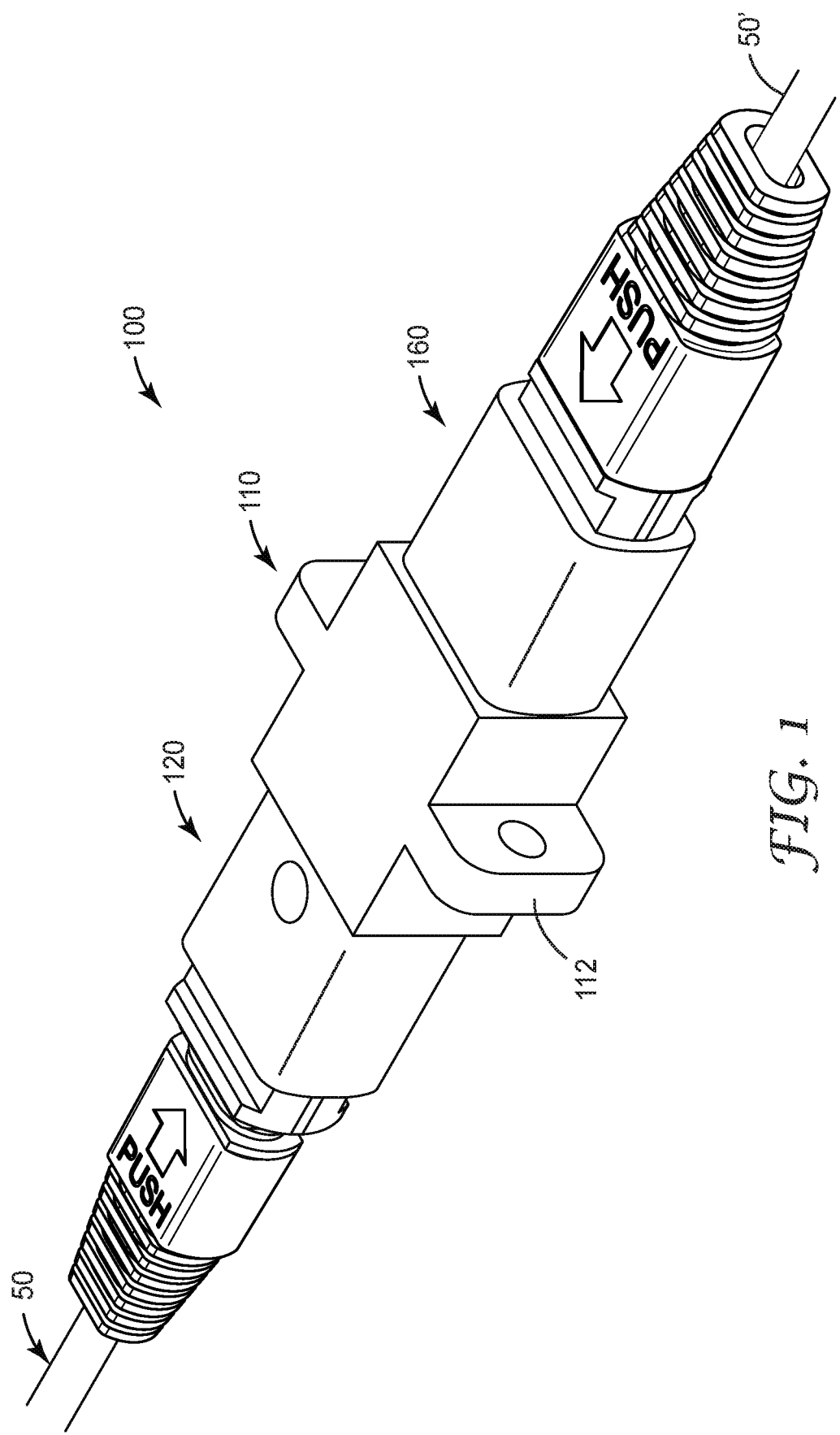
FIG. 1 is an isometric view of an optical fiber splice connection system according to an aspect of the invention.

While the invention is amenable to various modifications and alternative forms, specifics thereof have been shown by way of example in the drawings and will be described in detail. It should be understood, however, that the intention is not to limit the invention to the embodiments described. On the contrary, the intention is to cover all modifications, equivalents, and alternatives falling within the scope of the invention as defined by the appended claims.

DETAILED DESCRIPTION OF THE EMBODIMENTS

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention.

In a first embodiment, the optical fiber connection system comprises an alignment mechanism and an optical coupling material. The alignment mechanism can be formed using a sol casting resin to generate net shape silica ceramic parts such as is described in U.S. patent application Ser. No. 15/695,842, herein incorporated by reference in its entirety.

In one aspect, the optical coupling material can be an optical adhesive that can be used to permanently secure the plurality of parallel optical fibers in the exemplary splice element. An exemplary optical adhesive can be cured with actinic radiation via a rapid and straightforward procedure using an eye-safe visible, e.g., blue, LED light source such as is described in U.S. patent application Ser. No. 15/695,842, herein incorporated by reference in its entirety. In an alternative aspect, the optical coupling material can be an index matching gel configured to optimize the signal transmission thought the optical fiber splice, the exemplary splice element provides for an optical fiber splice with very low optical loss to achieve near-fusion splice levels of optical loss and reflectivity performance, thus providing a reliable, low loss, permanent termination which may be accomplished by a minimally trained craft person.

In an alternative aspect, the alignment mechanism can be made of an injection molded plastic using such plastics as polyetherimide (PEI) (available under the tradename of ULTEM from Sabic) or a liquid crystal polymer (LCP) (available under the tradename VECTRA from Celanese) or can be stamped or pressed from aluminum.

FIG. 1 shows an optical fiber splice connection system 100 that provides a ferrule-less interconnection system to optically couple a plurality of first and second optical fibers. Optical fiber splice connection system 100 comprises first and second bare fiber holders 120, 160. First and second bare fiber holders 120, 160 can be secured together by a clamping member 110 in the form of a clamping sleeve as shown. The clamping sleeve is a generally tubular structure having a passage way extending therethrough. The passage way is sized to secure the first and second bare fiber holders together when in their mated condition. Optionally, clamping member 110 can include a connection flange (such as flange 112) extending from the external surface of the clamping member to secure the clamping member in a bulkhead, face plate or wall of an enclosure, module, cassette or patch panel.

Bare fiber holders 120, 160, according to the current invention, manage and protect a fiber array of one or more optical fibers having an exposed glass portion adjacent to the end face or terminal end of the optical fiber(s). In other words, the polymer coatings have been removed from at least a portion of the optical fiber(s) circumferential diameter to facilitate alignment during mating a pair of bare fiber holders to optically interconnect the fiber arrays held by said bare fiber holders.

In an exemplary aspect, optical fiber splice connection system 100 includes first and second bare fiber holders 120, 160 that can be field terminated or installed or mounted onto an optical fiber cable or fiber ribbon in the field followed by assembly of the first and second bare fiber holders to form either a semi-permanent or permanent optical connection. Alternatively, the first and second bare fiber holders can be factory terminated or installed or mounted onto an optical fiber cable or fiber ribbon in the factory followed by assembly of the first and second bare fiber holders to form either a semi-permanent or permanent optical connection in the field.

In an exemplary aspect, the bare fiber holders can be configured to resemble the look and feel of an MPO or MTP optical fiber connector, while at the same time providing the enhanced signal performance and in some embodiments permanence of an optical fiber splice.

Referring to FIGS. 2A-2B, 3 and 5A-5B, each of the first and second bare fiber holders 120, 160 comprises an outer housing 125, 165; an inner housing 130, 170; wherein the inner housing comprises a first housing portion 130a, 170a and a second housing portion 130b, 170b that can be secured together to form the inner housing; a bare fiber holding plate 140, 180 and a fiber comb/fiber organizer 135, 175 disposed between the bare fiber holding plate and first housing portion.

Each bare fiber holding plate 140, 180 can comprise a plate body 141, 181 having a first end 141a, 181a and a second end 141b, 181b, respectively, as shown in FIGS. 3 and 6A-6C. Each plate body includes an integral alignment mechanism comprising a plurality of alignment grooves or channels 142, 182. Each alignment channel is configured to guide and support a single optical fiber. The bare fiber holding plates of the first and second bare fiber holders will be described in additional detail below.

Referring to FIGS. 2B, 4A-4C and 5B, the bare fiber holders, such as the first bare fiber holder 120 and the second bare fiber holder 160 include a fiber comb structure 135, 175 to reduce the complexity assembling the bare fiber holders onto the end of a fiber cable or fiber ribbon comprising a plurality of optical fibers. The fiber comb structure provides a straightforward mechanism to simultaneously feed the plurality of optical fibers into alignment channels formed in a surface of bare fiber holding plates of the first and second bare fiber holders.

The bare fiber holders of the present invention utilize a remote fiber gripping technique, where the plurality of optical fibers are permanently secured in the bare fiber holder at some distance away from the terminal ends of the optical fibers leaving the terminal ends of the plurality of optical fibers are essentially free of adhesive, allowing the fibers to move, float, and/or bow within the bare fiber holding plate until a clamping force is applied to optically couple two arrays of optical fibers and/or an optical coupling material is cured to secure the mated optical fibers within connection system 100. Such a field mountable splice device can be used in a variety of applications, including fiber-to-the-home installations, fiber-to-the-antenna installations, local area networks, data center connections, and high performance computing, to name a few.

Optical fiber splice connection system 100 is configured as a multi-fiber optical splice connection system. In the exemplary embodiments described herein, the optical fiber splice connection system is configured to connect a first and second arrays of optical fibers. In the exemplary embodiment provided herein, the optical fiber splice connection system is configured to connect two 12 fiber arrays. As would be apparent to one of ordinary skill in the art given the present description, optical fiber splice connection system 100 can be modified to include fewer optical fibers or a greater number of optical fibers in each fiber array.

For example, the first fiber organizer can include a remote gripping region 137 (FIG. 4A) to remotely grip a plurality of optical fibers outside of the bare fiber holding plate. The bare fiber holding plates can comprise a splice element in one of the first and second bare fiber holders and a fiber clamping plate in the other of the second and first bare fiber holders.

Figure 2A:
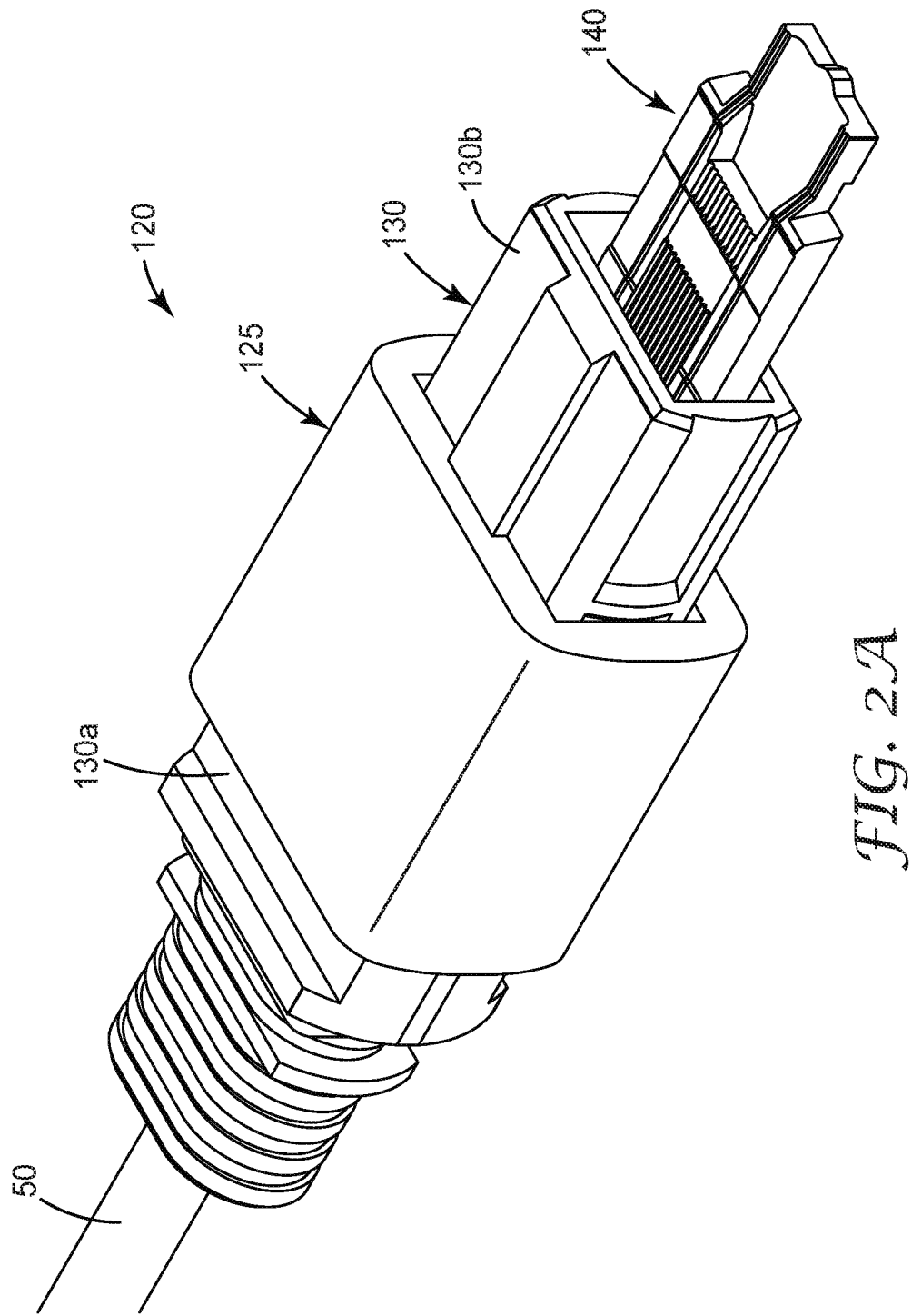
FIGS. 2A-2B are two views of a first bare fiber holder according to an aspect of the invention.
Figure 2B:
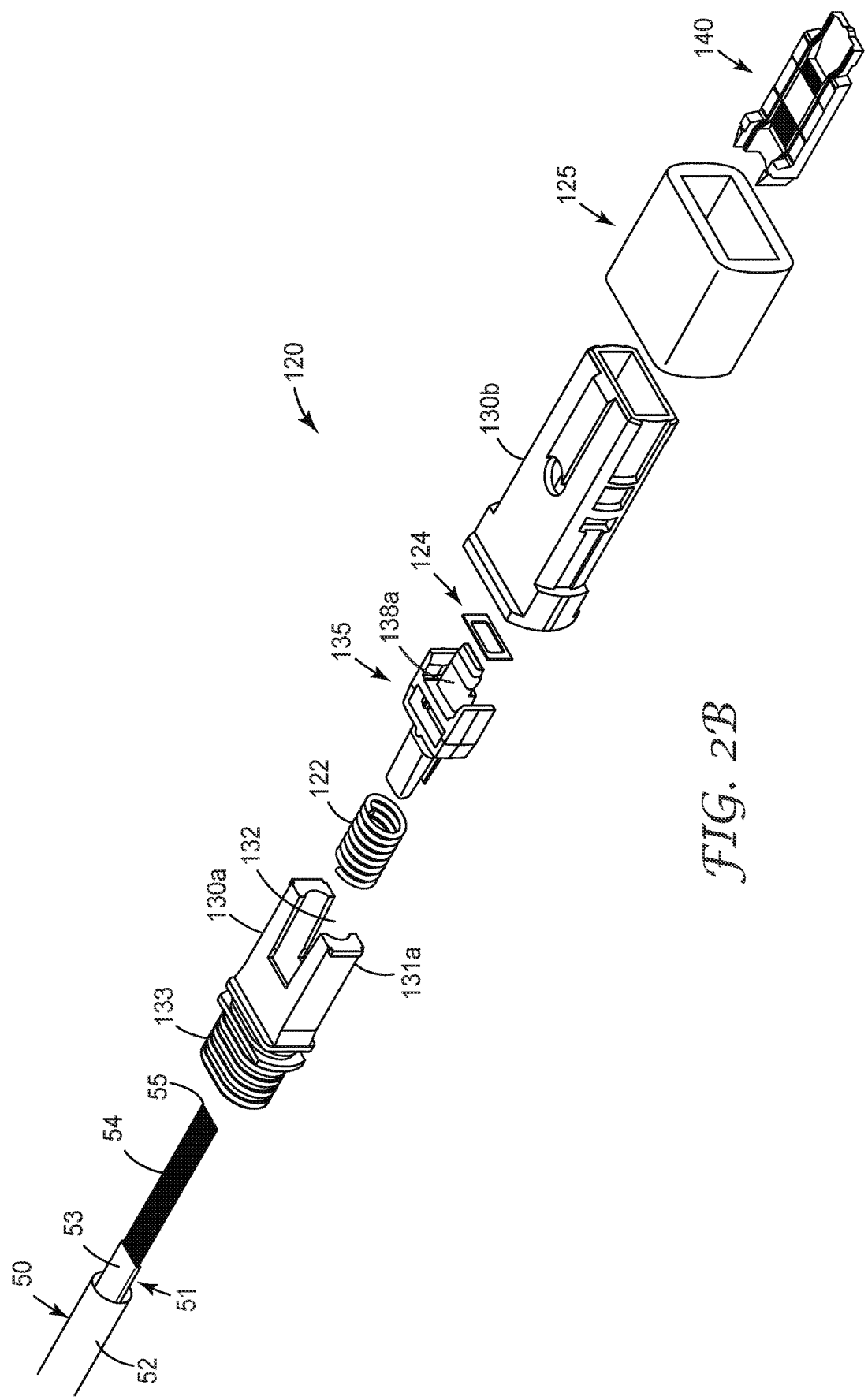

FIG. 2A shows first bare fiber holder 120 in an assembled state, and FIG. 2B shows an exploded view of the first bare fiber holder showing the bare fiber holder's internal components. The first bare fiber holder 120 has a first inner housing 130 to hold and protect first bare fiber holding plate 140 and first fiber organizer 135. The first inner housing is composed of a first housing portion 130a and a second housing portion 130b that can be secured together to form the inner housing. In an exemplary aspect, at least a portion of first housing portion can be inserted into a portion of the second housing portion to secure the two housing portions together.

First inner housing 130 provides structural support and retention for bare fiber holder 120 in clamping member 110. First housing portion 130a includes a front portion 131a configured to secure the second housing portion 130b (e.g., via a snap or friction fit). The front portion 131a can also include a slot 132 configured to accommodate a resilient element or main spring, such as first compression spring 122, which provides a prescribe bias force of about 1100 g, for example. The first housing portion can further include a mounting structure 133 (opposite the front portion 131a) that provides for coupling to a fiber strain relief boot (not shown), which can be utilized to protect the optical fiber cable from bend related stress losses. According to an exemplary embodiment of the present invention, first and second housing portions 130a, 130b can be formed or molded from a polymer material, although metal and other suitably rigid materials can also be utilized.

A first intermediate spring element 124 can be disposed between a front portion of the first fiber organizer and a rear portion of the first bare fiber holding plate 140 to help control the force placed on the fiber ends when connected. Intermediate spring 124 can be a small spring element, such as a flat or leaf spring that is seated on a shelf or shoulder portion 136a of the first fiber organizer 135 (see e.g., FIG. 4A). In one aspect, the intermediate spring can provide a countering force of about −550 g to dampen the force placed on the mated fibers. As shown in FIG. 3, the first bare fiber holding plate 140 includes a protrusion or bump 141 located on a rear portion thereof that provides a point of contact with the intermediate spring and helps center the force applied by the intermediate spring element. The intermediate spring element enables a desired ratio of spring forces to be applied to the fibers being terminated and helps balance the forces within the bare fiber holder.

The actual force applied to the end of the fiber array can be controlled by tuning the compressive force of intermediate spring 124 to create a variable resulting force on the fiber array. By using this configuration, the multi-fiber splice device(s) of the present invention can utilize the spring forces of the fiber array, the intermediate spring and the main spring to achieve a force balance of about 550 g across an array containing 12 optical fibers or about 45 g per fiber.

In one exemplary aspect, this force balancing can be used to enable the exemplary remote grip bare fiber holders to be used to create a reliable dry splice interface (no optical coupling material or index matching gel or adhesive) in the optical path in conjunction with fiber end face shaping techniques known in the industry. For example, putting a spherical end face shape onto the fiber can eliminate the need for index matching material in the splice region and yield an insertion loss of less than 0.5 dB.

Figure 4A:
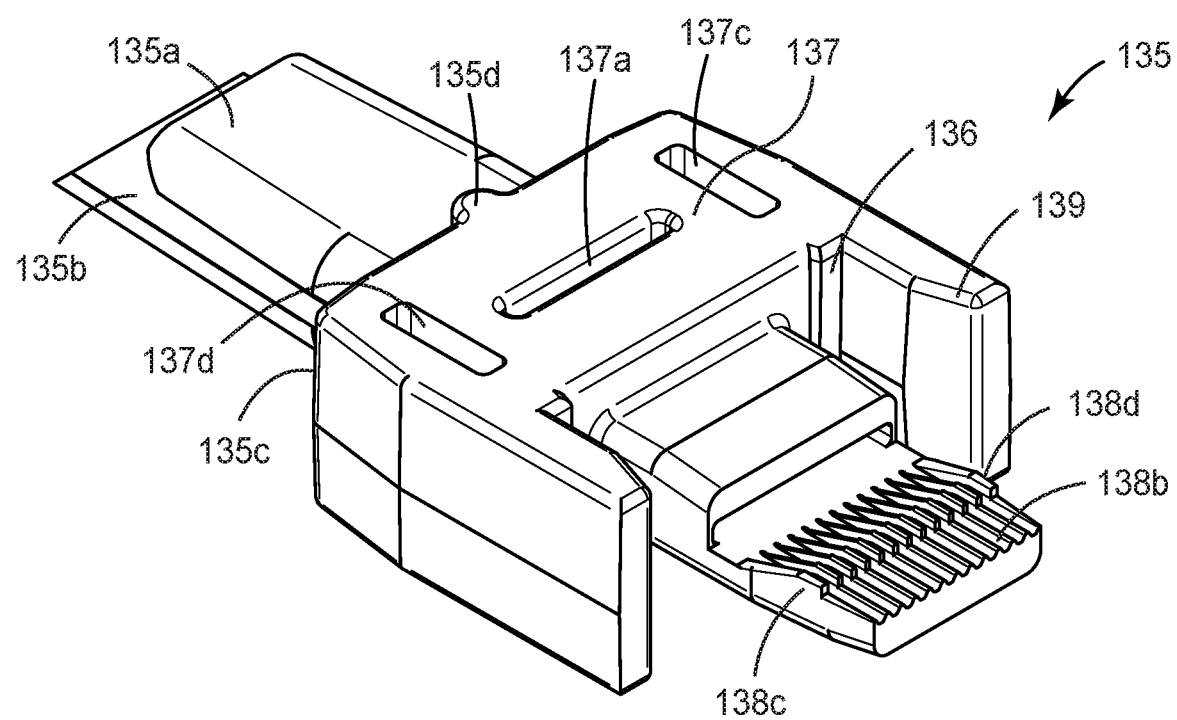
FIGS. 4A-4C are three views of an exemplary fiber organizer of the bare fiber holders according to an aspect of the invention.
Figure 4B:
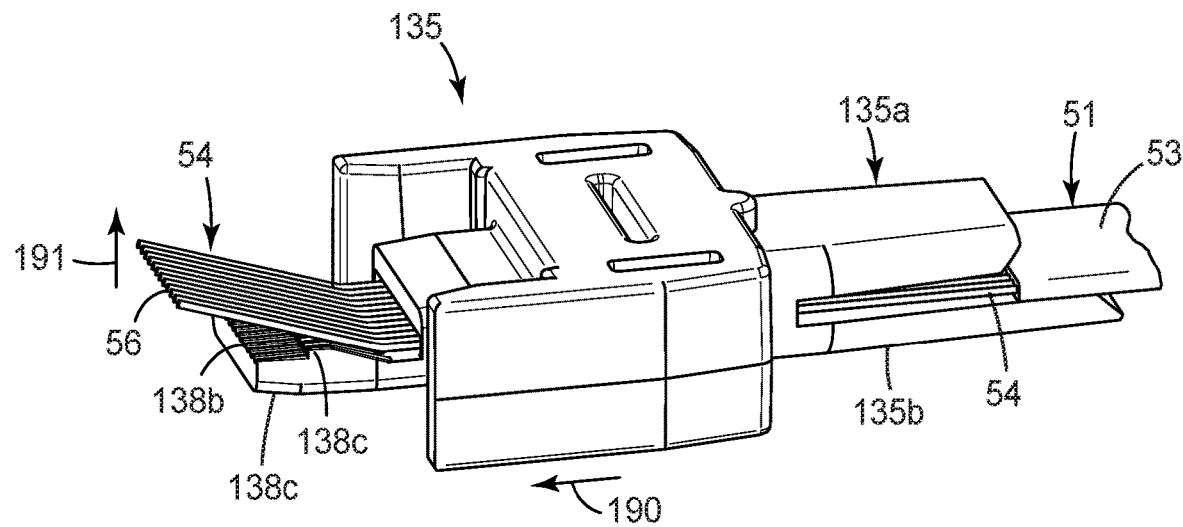
Figure 4C:
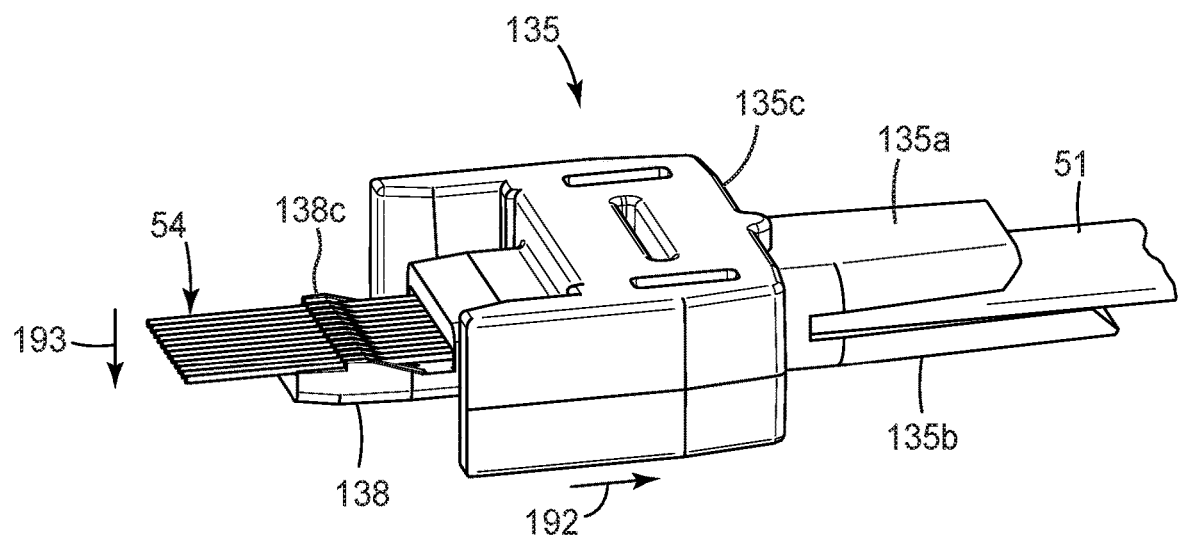

According to exemplary embodiments shown in FIGS. 4A-4C, first fiber organizer 135 is a multi-purpose element that provides for orderly insertion of the plurality of optical fibers into the bare fiber holding plate 140 and supports securing the plurality of optical fibers in a remote gripping region 137 of the first fiber organizer so that the plurality of optical fibers can be firmly held in bare fiber holder 120. In this way, the fibers do not need to be attached to the bare fiber holding plate but are free to move axially within the alignment channels of the bare fiber holding plate. In one aspect, the remote gripping region that includes a pocket 137a (see e.g., FIG. 9B) of the first fiber organizer. The fiber organizer has passage 136 extending through the remote gripping region that allows the optical fibers to pass through the fiber organizer. A smaller slot or opening 137b can be formed opposite pocket 137a. Additional slots and openings (such as slots 137c, 137d shown in FIG. 10A) can also be provided in in the first fiber organizer to accommodate features of the clamping mechanism, if needed. In one aspect, a mechanical clamp (not shown) can be utilized to secure an array of optical fibers within the first fiber organizer. Alternatively, an adhesive, such as a fast-curing UV or visible light initiated adhesive or a thermally activated adhesive, such as a hot-melt material can be utilized to secure an array of optical fibers within the fiber organizer.

First fiber organizer 135 includes a fiber comb portion 138 that is used to support, align and guide the optical fibers to be terminated. The fiber comb portion includes a top surface 138a (see FIG. 2B) and an array of grooves 138b (see FIGS. 4A-4C), located on the underside of the top surface, disposed on an end of the first fiber organizer (nearest the bare fiber holding plate when assembled), with each individual groove or channel 138b configured to guide and support a single optical fiber of the fiber cable 50. The fiber comb portion also includes a ramp section 138c adjacent groove array 138b and disposed between the groove array and the main body portion of the first fiber organizer. The ramp section includes gradual rising dividing structures 138d that separate the individual groove which can help align the individual fibers during the fiber insertion process. The structure of the fiber comb portion separates potentially tangled fibers, arranges the fiber array in a uniform pitch, and allows for straightforward feeding of the fiber array into the alignment channels of the bare fiber holding plate 140. In addition, the groove array/ramp structure of the fiber comb portion allows for precision placement of the fiber array with the naked eye.

First fiber organizer 135 also includes a rear portion having an opening (not shown) that allows for insertion of the fiber cable 50 into the first fiber organizer. In one aspect, the rear portion includes extending support structures 135a and 135b (disposed opposite each other about the opening) that are configured to receive and support first compression spring 122. The compression spring can fit over the support structure such that it rests against a rear side 135c of the first fiber organizer on one side of the compression spring and against the first housing portion on the opposite side of the compression spring. A contact bump or protrusion 135d can be formed on the rear portion of the first fiber organizer to contact compression spring 122 and to center the force of the spring relative to the first fiber organizer. Thus, when first bare fiber holder 120 is assembled, the resilient element/ compression spring 122 will be disposed between the first fiber organizer 135 and the first housing portion 130a.

According to an aspect of the present invention, first fiber organizer 135 can be formed or molded from a polymer material, although metal and other suitable materials can also be utilized. For example, first fiber organizer 135 can comprise an injection-molded, integral material. The choice of suitable materials for the fiber organizers can be made in accordance with the temperature stability parameters.

Figure 8C:
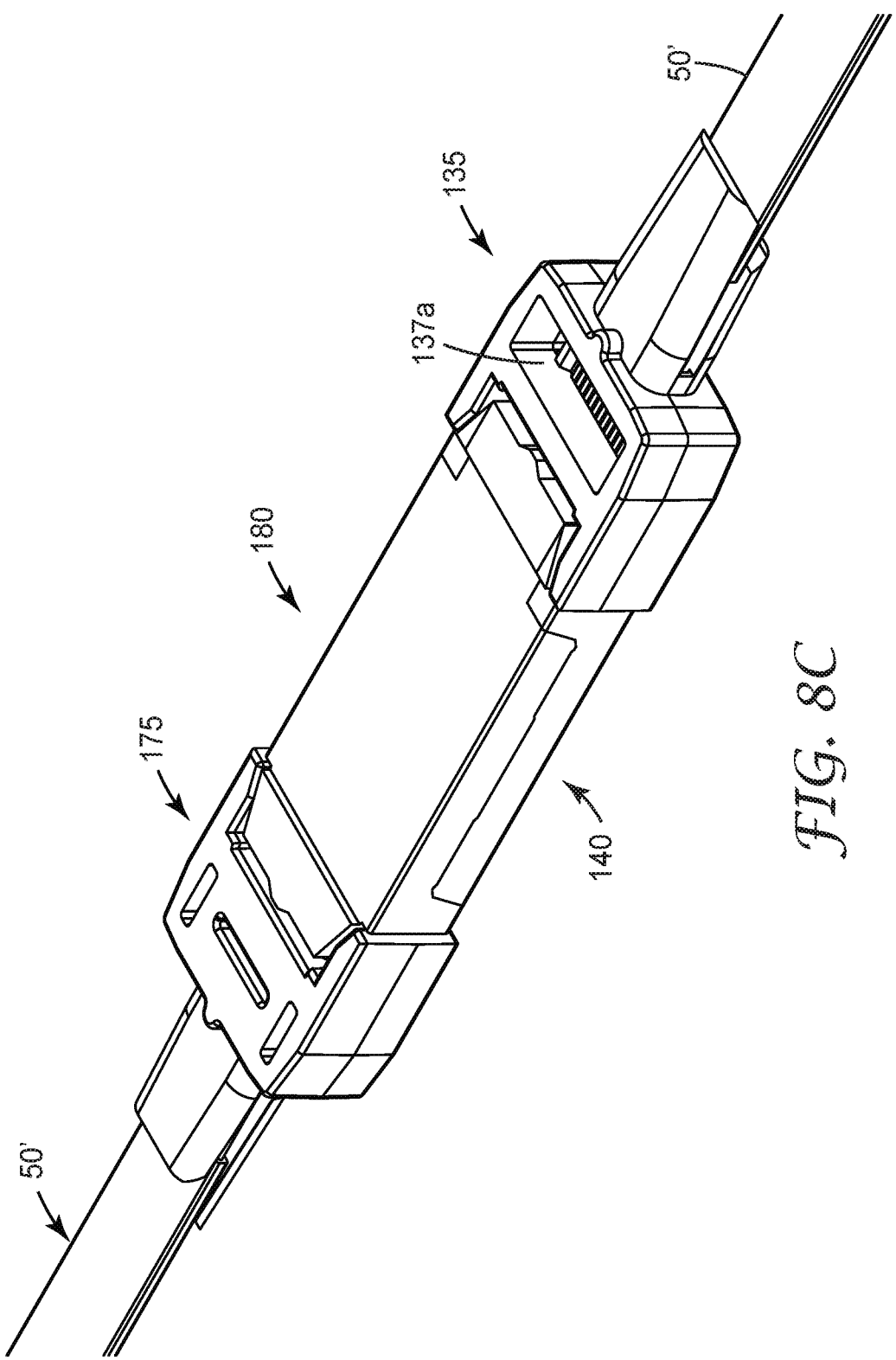

In the exemplary embodiment shown in FIGS. 2A-2B and 3, bare fiber holding plate 140 is a fiber clamping plate. The fiber clamping plate 140 has a generally rectangular plate body 141 extending from a first end 141a to a second end 141b and having a top major surface 141c and a back major surface 141d. Fiber clamping plate 140 is configured to join a plurality of parallel optical fibers 54, 54' of first and second optical fiber ribbons 50 as shown in FIGS. 8A-8C when mated with bare fiber holding plate 180. Plate body 141 has a pocket 143a disposed at the first end of the body that is configured to receive a portion of fiber organizer 135 disposed therein and a mating pocket 143b disposed at the second end of the plate body that is configured to receive at least a portion fiber organizer 175 of the second bare fiber holder 160 (FIGS. 5A-5B) when the first and second bare fiber holders are mated together in clamping member 110 forming optical fiber splice connection system 100 as shown in FIG. 8C.

Plate body 141 included an integral alignment mechanism comprising a plurality of alignment grooves or channels 142 formed in at least a portion of top major surface 141c and running longitudinally between pocket 143a and mating pocket 143b. Alignment channels 142 can be continuous or can be discontinuous. In the exemplary embodiment shown in FIGS. 9A-9C, the alignment channels are discontinuous around interconnection region 144.

Interconnection region 144 can have a generally flat surface which can be centrally disposed on fiber clamping plate 140 and is configured to press on the plurality of optical fibers when the first and second bare fiber holders are joined together. Each alignment channel is configured to guide and support a single optical fiber.

In some embodiments as shown in FIG. 3, the alignment channels 142 are discontinuous having a first alignment portion 142a and a second alignment portion 142b disposed on either side of interconnection region 144. For example, the first alignment portion 142a of alignment channels 142 can be substantially flat and can extend from an edge of pocket 143*a* to the first side 144*a* of interconnection region, and the second alignment portion 142*b* of alignment channels 142 can extend from the second side 144*b* of the interconnection region to an edge of the mating pocket 143*b*. Each alignment channel 142 can have a semi-circular cross section, a trapezoidal cross section, a rectangular cross section, a v-shaped cross section or the cross-section profile may vary along the length of the alignment channels. In alternative aspects, the alignment channels can have a generally arched profile to aid insertion of the optical fibers into the alignment channels in the proper position. The alignment channels can have a constant width or can have a variable width as will be described with respect to the alignment channels 182 of bare fiber holding plate 180, best shown in FIG. 12B.

The optical fibers can be inserted into the alignment mechanism through entrance openings or apertures 145*a*, 145*b*. In some aspects, the entrance apertures can comprise a funneling inlet portion formed by the tapering of the partitions between adjacent alignment channels to provide for more straightforward fiber insertion.

The entrance openings 145*a*, 145*b* are characterized by a channel pitch (i.e. the distance between the centerline of adjacent alignment channels). The channel pitch at the entrance openings should be similar to the groove pitch in the comb portions of fiber organizers 135, 175, respectively. In an exemplary aspect, the width of each alignment channel should be greater than the diameter of the optical fibers disposed therein, but less than the diameter of the buffer coating that is coated on said optical fibers. By having the width of the entrance openings less than the diameter of the buffer coated optical fibers, the entrance openings can serve as a stop to limit the forward progress of the optical fibers as they are inserted into the alignment channels.

In the exemplary embodiment of FIG. 3, the entrance openings 145*a*, 145*b* are disposed in a common plane and all of the fibers being joined by the exemplary fiber clamping plate 140 enter the alignment channels 142 along this common plane. Alternatively, some of the entrance openings can be disposed on a different plane that is vertically offset from the common plane of the rest entrance openings. This can be useful when the inter-fiber spacing on one side of the fiber clamping plate is different than the inter-fiber spacing on the other side of the fiber clamping plate.

Bare fiber holding plate 140 includes a rail 146 disposed along each longitudinal edge of plate body 141. Each rail can include one of an alignment rib 146*a* or an alignment notch (e.g. to alignment notch 186*a* in FIG. 6A) disposed along the length rail. The alignment ribs and/or alignment notches on one of the first or second bare fiber holding plates engages with alignment notches and/or alignment ribs of the other of the second or first bare fiber holding plates to align and guide the first and second bare fiber holding plates as they are brought together during the mating process.

Bare fiber holding plate 140, 180 can include standoff features that provide a controlled vertical offset between the bare fiber plates during at least a portion of the mating process. For example, a first plurality of optical fibers can be secured in first alignment channels 142 in first bare fiber holding plate 140 and a plurality of second optical fibers can be secured in second alignment channels 182 in the second bare fiber holding plate 140. The optical connection is made by sliding or mating the bare fiber holding plates on the standoff features formed on one of the first and second bare fiber holding plates until the standoff features fit into depressions formed in the surface of the other of bare fiber holding plates. In the embodiment shown in FIGS. 3, 6A-6C and 8A-8C, each rail of the first and second holding plates can include a locking depression or locking protrusion. For example, bare fiber splicing plate 140 includes locking depression 146*b* in rail 146, and bare fiber holding plate 180 includes locking protrusion 186*b* on rail 186. Thus, bare fiber holding plate 180 includes locking protrusion 186*b* having an alignment notch 186*a* that can be slid along alignment ribs 146*b* formed on rails 146 of the first fiber holding plate, until the locking protrusion 186*b* of bare fiber holding plate 180 slips into locking depression 146*b* of bare fiber splicing plate 140 which brings the terminal ends of the first and second pluralities of optical fibers into end-to-end alignment.

Figure 5B:
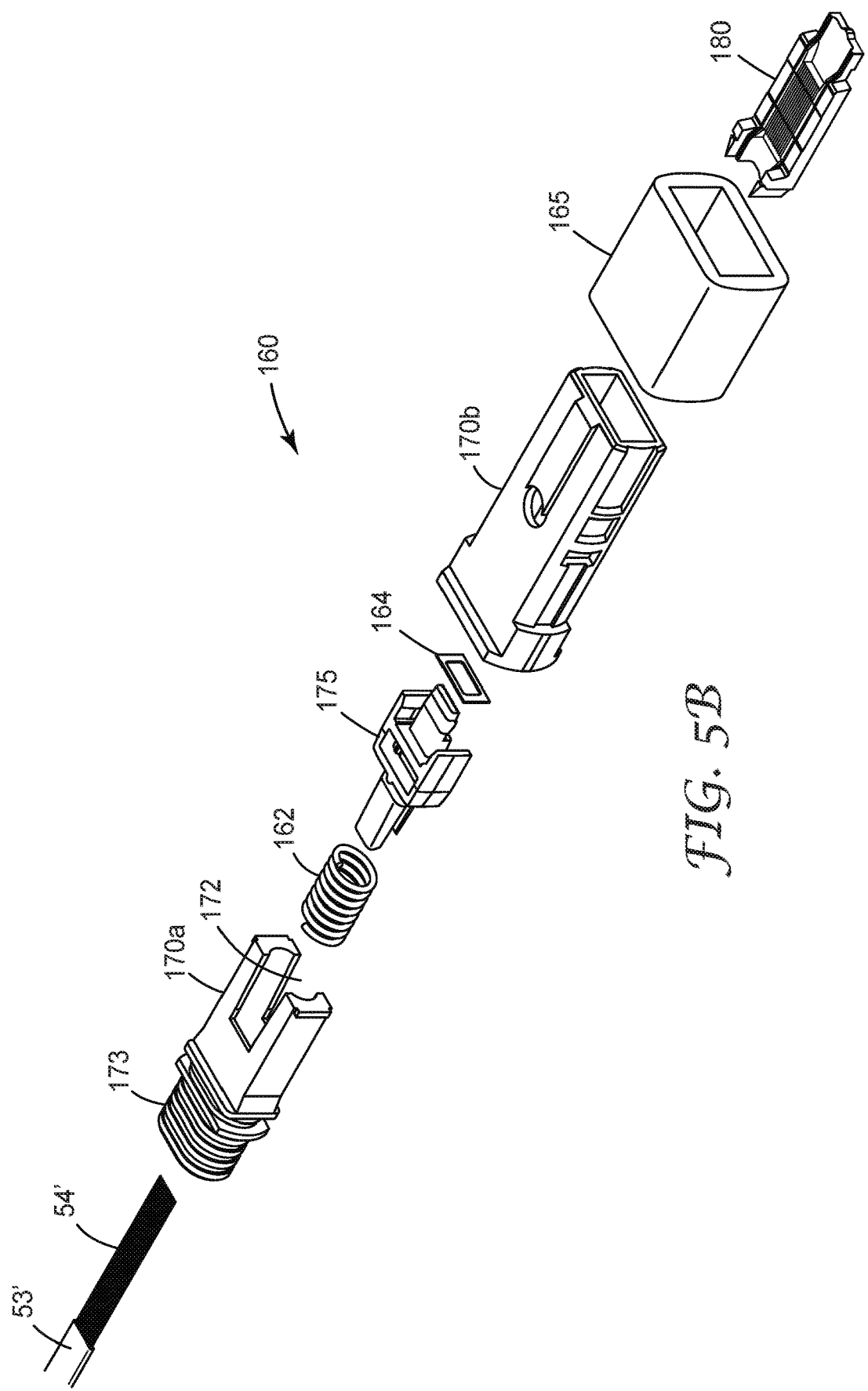

Second bare fiber holder 160 is substantially similar to the first bare fiber holder 120 described above in that the second bare fiber holder comprises a second outer housing 165, a second inner housing 170; wherein the second inner housing comprises a first housing portion 170*a* and a second housing portion 170*b* that can be secured together to form the second inner housing, a second bare fiber holding plate 180 and a second fiber organizer 175 disposed between the bare fiber holding plate and first housing portion as illustrated in FIGS. 5A and 5B. Second bare fiber holding plate 180 is configured as a splice plate in contrast to the fiber clamping plate design of first bare fiber holder 140.

Figure 6A:
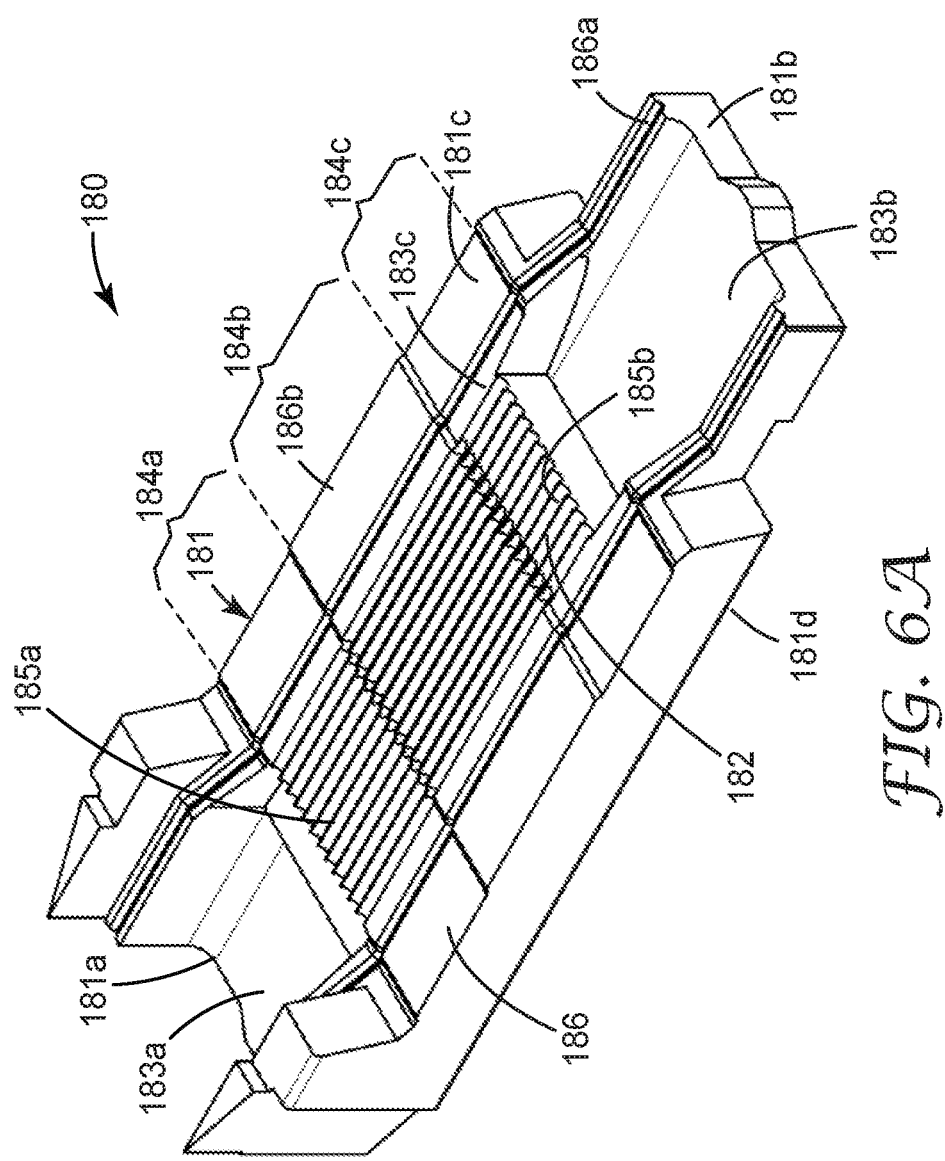

FIGS. 6A-6C show second bare fiber holding plate 180 as a splice plate. Splice plate 180 has a generally rectangular plate body 181 extending from a first end 181*a* to a second end 181*b* and having a top major surface 181*c* and a back major surface 181*d*. Splice plate 180 is configured to join a plurality of parallel optical fibers 54, 54' of first and second optical fiber ribbons 50, 50' as shown in FIGS. 8A-8C when mated with a fiber clamping plate 140.

Plate body 181 has a pocket 183*a* disposed at the first end of the plate body that is configured to receive a portion of fiber organizer 175 disposed therein and a mating pocket 183*b* disposed at the second end of the plate body that is configured to receive at least a portion fiber organizer 135 of the first bare fiber holder 120 (FIGS. 11A-11B) when the first and second bare fiber holders 120, 160 are mated together in clamping member 110 forming the optical fiber splice connection system 100.

Plate body 181 included an integral alignment mechanism comprising a plurality of alignment grooves or channels 182 formed in at least a portion of top major surface 181*c* and running longitudinally between pocket 183*a* and mating pocket 183*b*. Alignment channels 182 can be continuous or can be discontinuous. In the exemplary embodiment shown in FIGS. 6A-6C, the alignment channels extend continuously between an edge of pocket 183*a* to an edge of the mating pocket 183*b*, which can be centrally disposed on splice plate 180. Each alignment channel is configured to guide and support a single optical fiber. The alignment channels 182 can have a semi-circular cross section, a trapezoidal cross section, a rectangular cross section or a V-shaped cross section.

In the present embodiment, alignment channels 182 can be substantially flat and can have a variable width. In alternative aspects, the alignment channels can have a generally arched profile to aid insertion of the optical fibers into the alignment channels in the proper position.

The fibers can be inserted into the alignment mechanism through entrance openings or apertures 185*a*, 185*b*. into a course alignment section 182*b*, 182*c* that extends from the edge of pocket 183*a* or mating pocket 183*b*, respectively, toward the interconnection region 182*a*. The alignment channels in the course alignment section can be characterized by the width and the depth of the alignment channels in this section. The alignment channels in the interconnection region provide fine alignment of the ends of the optical fibers disposed therein and can be characterized by the width and the depth of the alignment channels in the interconnection region. At least one of the channel width and the channel depth in the course alignment section is greater than the corresponding channel width or channel depth in the interconnection region.

A transition region 182*d* is disposed between the course alignment sections and the interconnection region to provide a smooth transition between the larger portions of the alignment channels in the coarse alignment section to the smaller alignment channels in the interconnection region. For example, FIG. 6B is a top view of bare fiber holding plate 180 showing how the transition region reduces the width of the alignment channels 182 from the coarse alignment sections 182*b*, 182*c* to a narrower width in the interconnection section 182*a*. Similarly, FIG. 6C is a cross section view of bare fiber holding plate 180 through one of the alignment channels showing how the transition region reduces the depth of the alignment channels 182 from the coarse alignment sections 182*b*, 182*c* to a shallower depth in the interconnection section 182*a*.

The fibers can be inserted into the alignment mechanism through entrance openings or apertures 185*a*, 185*b*. In some aspects, the entrance apertures can comprise a funneling inlet portion formed by the tapering of the partitions between adjacent channels to provide for more straightforward fiber insertion. The entrance openings 185*a*, 185*b* are characterized by a channel pitch (i.e. the distance between the centerline of adjacent alignment channels). The channel pitch at the entrance openings should be similar to the groove pitch in the comb portion of fiber organizer 175. In an exemplary aspect, the width of each alignment channel should be greater than the diameter of the optical fibers disposed therein, but less than the diameter of the buffer coating that is coated on said optical fibers. By having the width of the entrance openings less than the diameter of the buffer coated optical fibers, the entrance openings can serve as a stop to limit the forward progress of the optical fibers as they are inserted into the alignment channels.

Bare fiber holding plate 180 includes a rail 186 disposed along each longitudinal edge of plate body 181. Each rail can include one of an alignment notch 186*a* or an alignment rib (e.g. to an alignment rib 246*a* in FIG. 3) disposed along the length rail. The alignment ribs and/or alignment notches on one of the first or second bare fiber holding plates engages with alignment notches and/or alignment ribs of the other of the second or first bare fiber holding plates to align the first and second bare fiber holding plates when the first and second bare fiber holders are mated together, as described previously.

Bare fiber splicing plate 180 includes a locking protrusion 186*b* extending from rail 186 such that bare fiber splicing plate 180 can be slid along alignment ribs 146*a* of bare fiber holding plate 140 until the locking protrusion 186*b* slips into locking depression 146*b* of bare fiber splicing plate 140 bringing the terminal ends of the first and second pluralities of optical fibers into end-to-end alignment as shown in FIGS. 8A-8C.

Figure 7A:
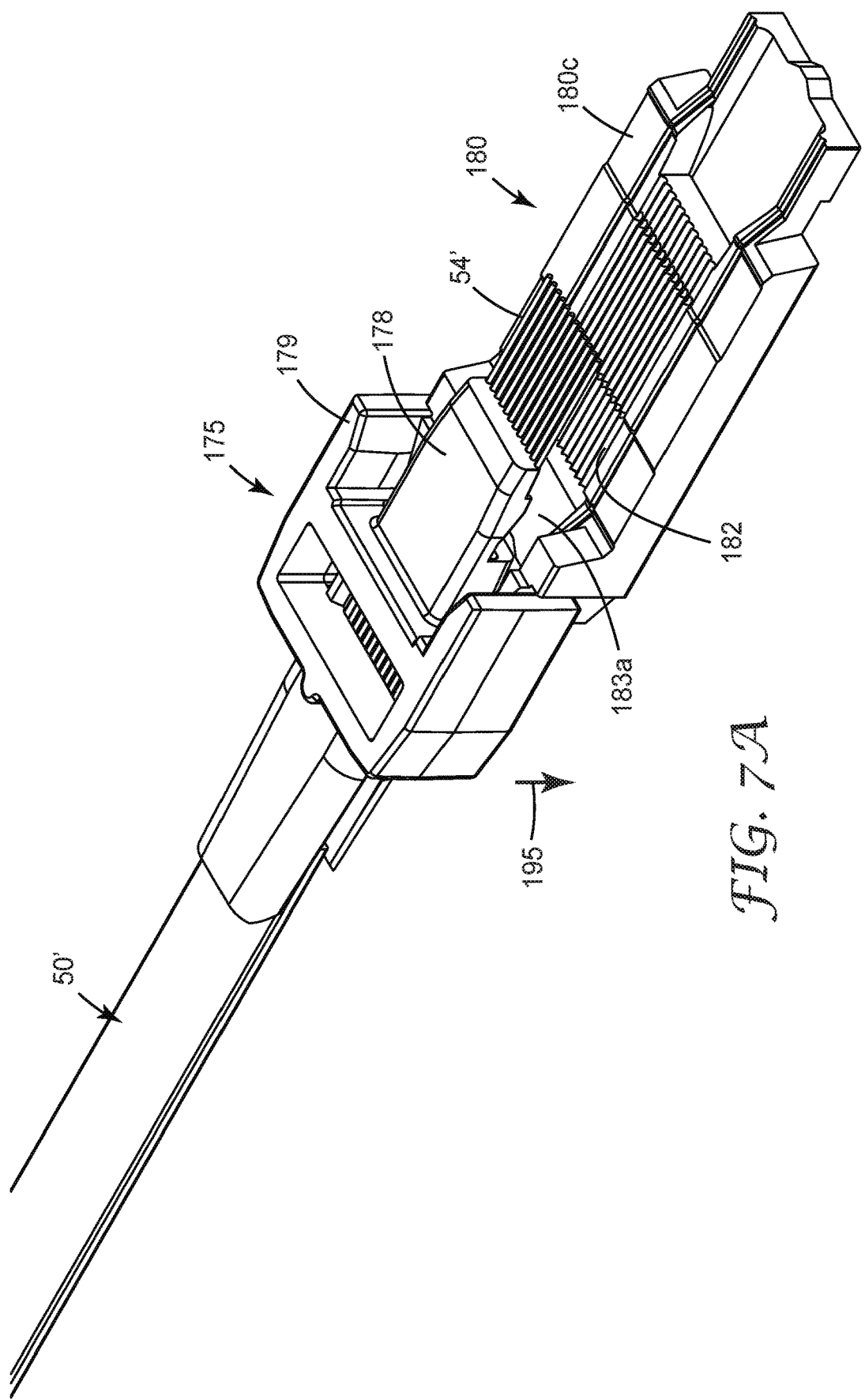
FIGS. 7A-7B show the placing of a plurality of optical fibers held by a second fiber organizer into alignment channels of the second bare fiber holding plate.
Figure 7B:
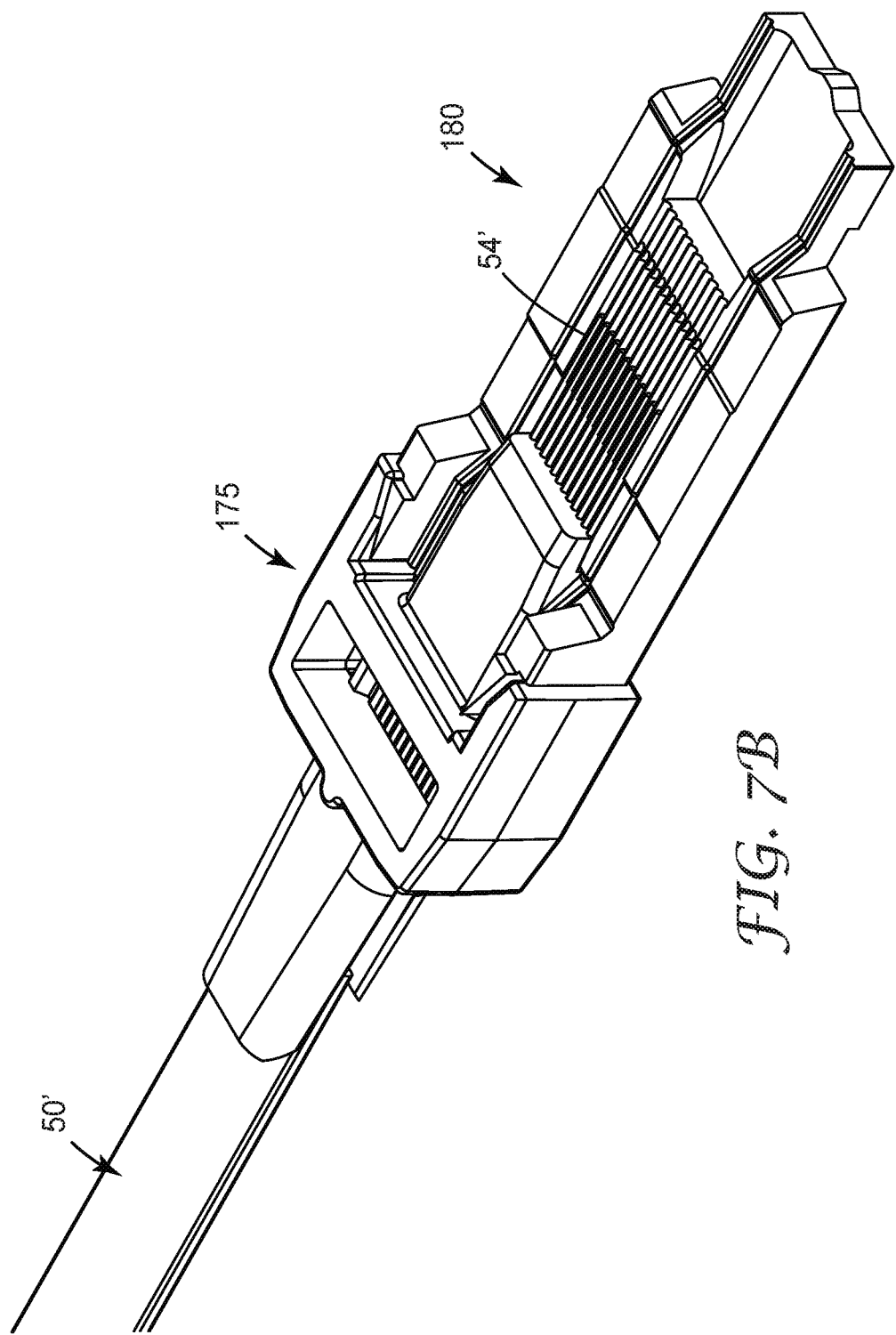

FIGS. 7A-7B show the placing of a plurality of optical fibers 50' held by a second fiber organizer 175 into alignment channels 182 of the second bare fiber holding plate 180. The optical fibers being mounted into the second fiber organizer 175 as depicted in FIGS. 4B-4C which showed the mounting of optical fiber ribbon 50 mounted in first fiber organizer 135. Next, intermediate spring (not shown) can be positioned over the comb portion of the fiber organizer. Fiber organizer is lowered onto the second bare fiber holding plate 180 as indicated by directional arrow 195 such that the fibers disposed in the grooves of the comb portion 178 are oriented with respect to the top major surface 180*c* of the second bare fiber holding plate, such that the optical fibers will be disposed between the top major surface 180*c* of the second bare fiber holding plate and the comb structure when assembled together.

Guide arms 179 extending from the fiber organizer 175 on either side of comb portion 178 are slid down the outer surface of pocket 183*a* providing rough alignment of the fiber organizer to the second bare fiber holding plate 180. As the fiber organizer is lowered further, the front portion of the organizer enters the pocket and the fibers enter alignment channels 182 in the second bare fiber holding plate as shown in FIG. 13B. The first and second housing portions (not shown) are secured together around the fiber organizer and the bare fiber holding plate to hold them in the proper position. The outer housing can be slipped over the inner housing and the strain relief boot can be secured to the mounting structure on the second end of the inner housing to complete assembly of bare fiber holder 160 shown in FIG. 5A.

FIGS. 8A-8C show the mating of the first and second bare fiber holders 120, 160 to make an optical connection between first and second arrays of optical fibers. The inner and outer housings are not shown so the mating of the bare fiber holding plates can be appreciated. FIG. 8A is an isometric view of showing the initiation of the assembly process of the first and second bare fiber holders 120, 160 and FIG. 8B is the corresponding side view. The ends terminal optical fibers 54 are disposed in the interconnection region 144. Bare fiber holding plate 180 is positioned over the second end of bare fiber holding plate 140 such that the alignment notches (not shown) of the second bare fiber holding plate engage with the alignment ribs 146*a* of the first bare fiber holding plate 140. The second bare fiber holding plate is then slid in the direction indicated by arrow 199 until locking protrusion 186*b* of the second bare fiber holding plate slips into locking depression 146*b* of first bare fiber holder 140 completing the optical interconnection, as shown in FIG. 8C.

Figure 8D:
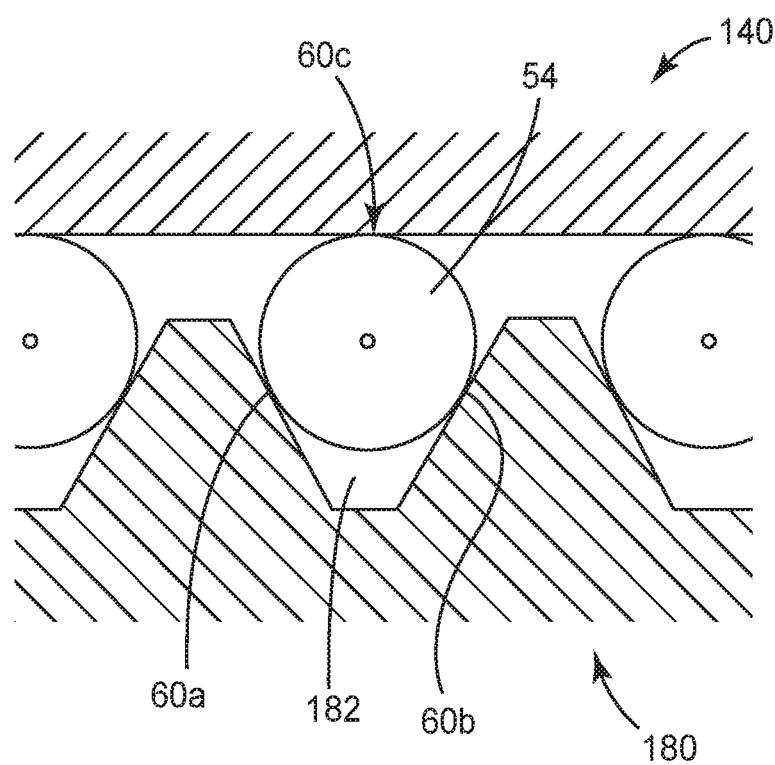

FIG. 8D is a cross sectional detail view of the mated bare fiber holders showing the positioning of optical fibers 50 in the alignment channels 182 of bare fiber holding plate 180 and between bare fiber holding plates 140, 180. In particular, the angled walls of the alignment channels result in two primary lines of contact 60*a*, 60*b* (extending perpendicular to the cross section shown in FIG. 8D) and a third line of contact 60*c* provided by the flat interconnection portion of the clamping plate or bare fiber holder 140. The three lines of contact are positioned around the circumference of the optical fiber to optimize fiber alignment within each alignment channel.

The first and second bare fiber holders 120, 160 can be permanently secured together with an optical adhesive such as the optical adhesive described in U.S. patent application Ser. No. 15/696,901. Alternatively, the first and second bare fiber holders can be semi-permanently secured together via a mechanical clamping element, such as clamping element 110, in either a dry state or using an index patching material disposed between the terminal ends of the optical fiber arrays being joined in the exemplary an optical fiber splice connection system 100 exemplified by FIGS. 1-8 as provided above.

Figure 9A:
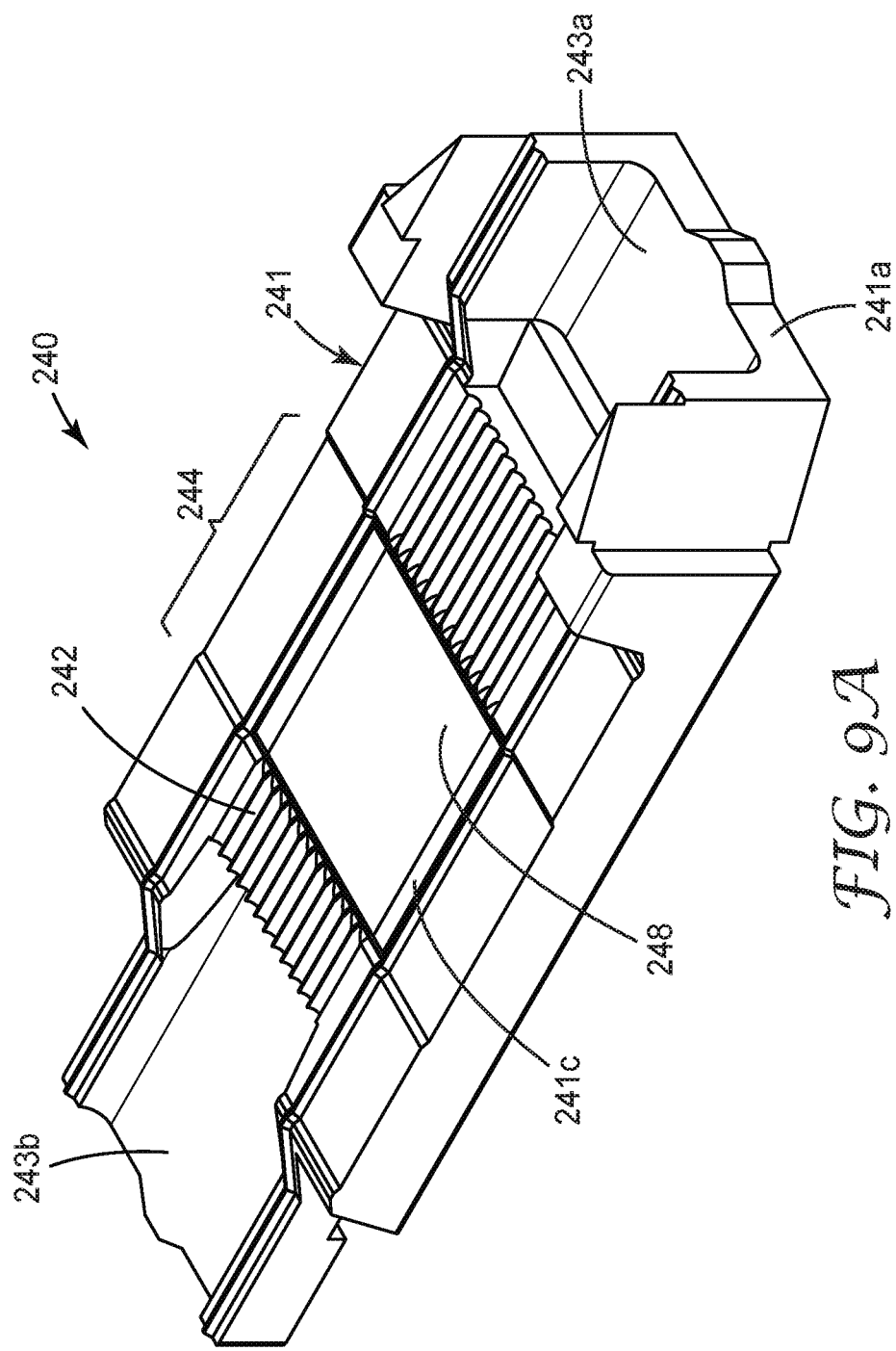
Figure 9B:
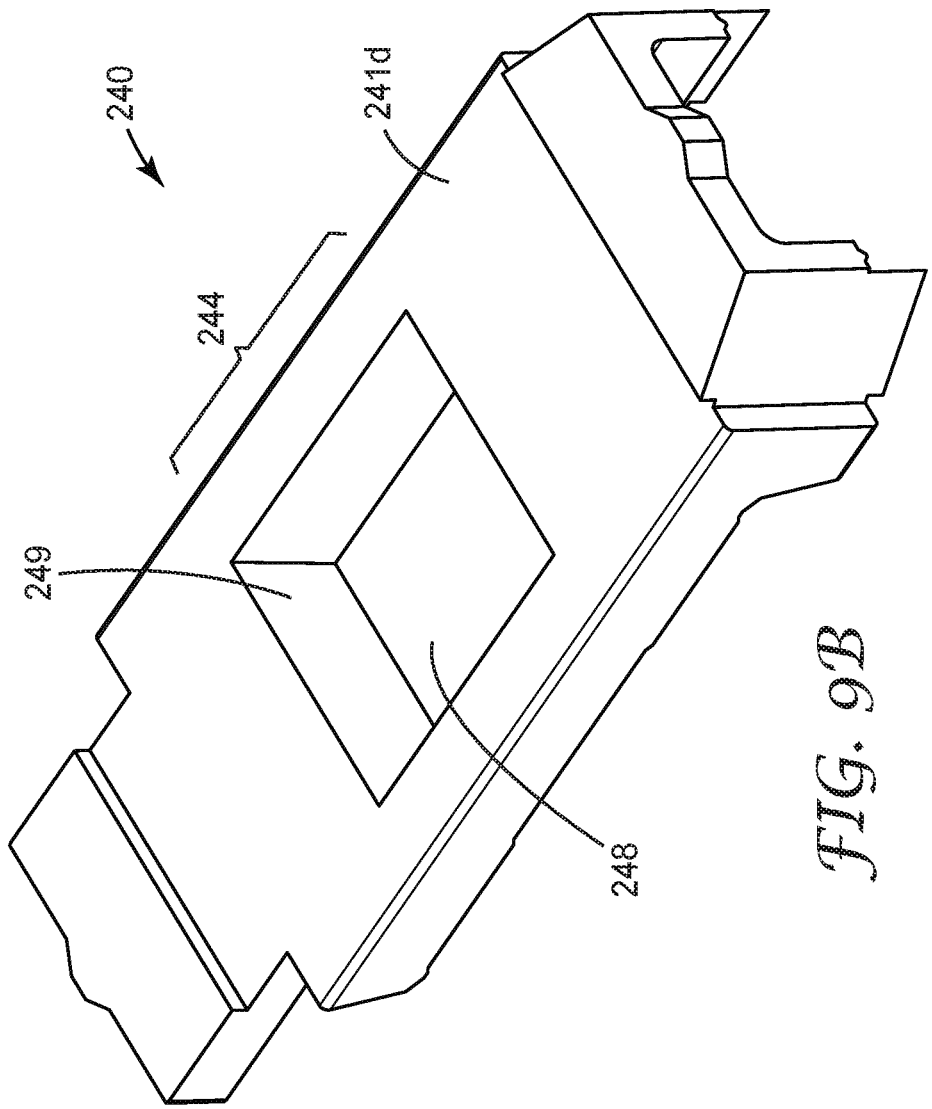

FIGS. 9A-9C illustrate an alternative first bare fiber holding plate 240 for use in place of first bare fiber holding plate 140 in first bare fiber holder 120 described above in reference to FIGS. 2A-2C and 3. First bare fiber holding plate 240 is very similar to first bare fiber holding plate 140 except the first bare fiber holding plate 240 includes a thin flexible region 248 in the interconnection area 244. The thin flexible portion can be flexed upon application of an external force to press and secure the plurality of first and second optical fibers in the interconnection region of second bare fiber holding plate when the first and second bare fiber holders are mated together. In an exemplary embodiment, an optical adhesive can be irradiated in the interconnection region to permanently fix the optical fibers between the first and second bare fiber holding plate.

FIG. 9A is an isometric view of the top of first bare fiber holding plate 240 showing plate body 241 that includes a pocket 243a disposed at the first end 241a of the plate body that is configured to receive a portion of fiber organizer 135 of bare fiber holder 120 (FIG. 2B) disposed therein and a mating pocket 243b disposed at the second end of the plate body that is configured to receive at least a portion fiber organizer 175 of the second bare fiber holder 160 (FIGS. 5A-5B) when the first and second bare fiber holders are mated together. The plate body also includes an integral alignment mechanism comprising a plurality of alignment grooves or channels 242 formed in at least a portion of top major surface 241c and running longitudinally between pocket 243a and mating pocket 243b as described previously.

FIG. 9B is an isometric view of the bottom of first bare fiber holding plate 240 and FIG. 9C is a cross-sectional view of first bare fiber holding plate 240 showing the thin flexible region 248 in the interconnection area 244. A well 249 is formed in the bottom surface 241d that extends partially through the thickness of the plate body 241. Well 249 can be formed during the molding of the silica sol used to form the first bare fiber holding plate, similar to the method used to form the splice elements described in U.S. patent application Ser. No. 15/695,842, which is incorporated herein by reference.

FIGS. 10A-10B illustrate a second alternative first bare fiber holding plate 340 for use in place of first bare fiber holding plate 140 in first bare fiber holder 120 described above in reference to FIGS. 2A-2C and 3. In this embodiment, a well 349 is formed in the top surface 341c of interconnection region 344 of plate body 341 to create a flexible region within the clamping plate. The well extends part way though the plate body is filled with an elastomeric filler material having a controlled Shore A durometer between about 50 and about 90. A thin flexible clamping element 348 covers the elastomeric filler material. The combination of the elastomeric material and the thin flexible clamping element will apply a force to press and secure the plurality of first and second optical fibers in the interconnection region of second bare fiber holding plate when the first and second bare fiber holders are mated together.

Figure 11B:
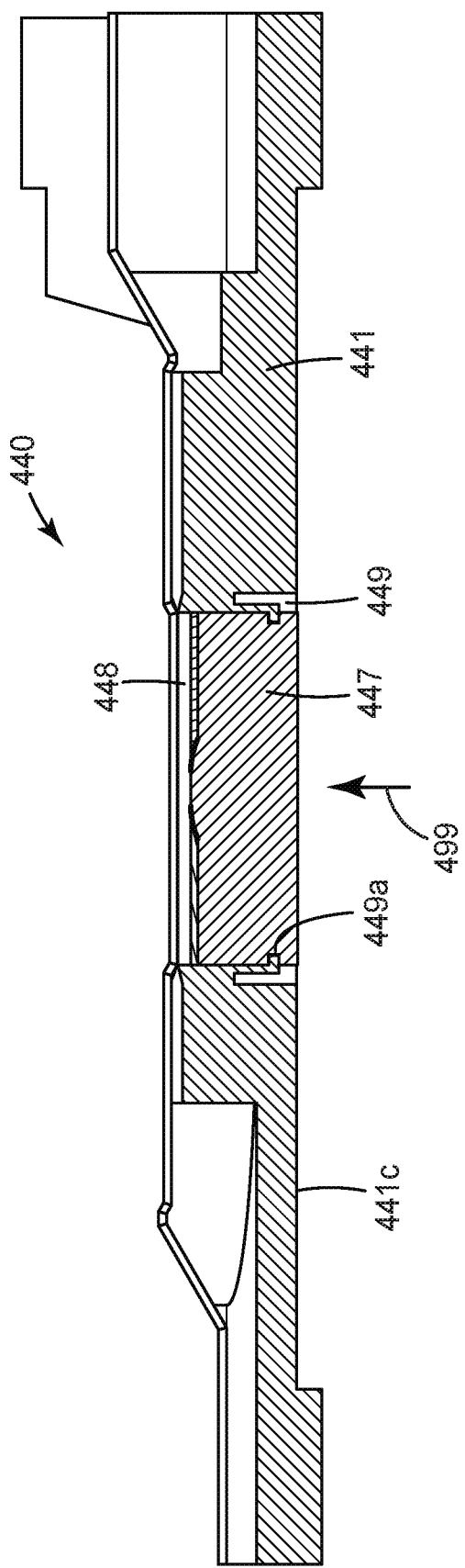
Figure 11C:
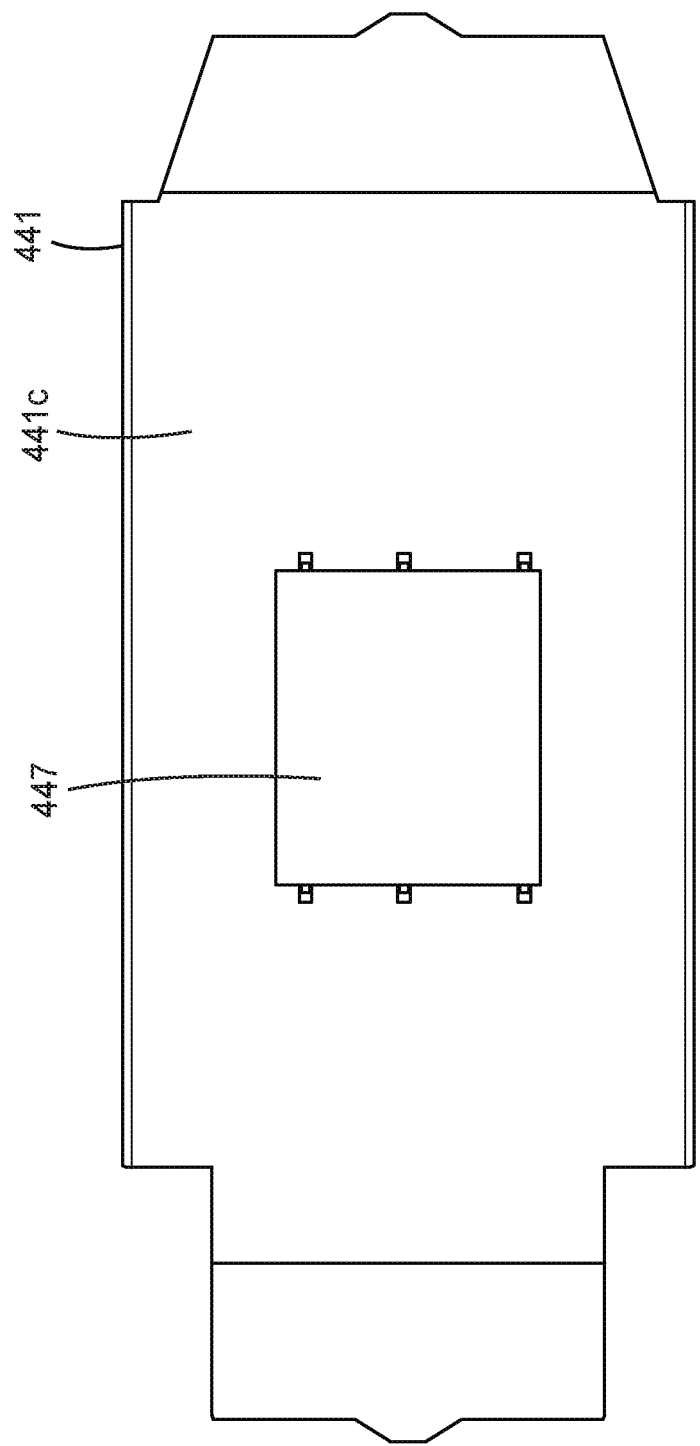

FIGS. 11A-11C show a third first bare fiber holding plate 340 having a flexible region for use in place of first bare fiber holding plate 140 in first bare fiber holder 120 described above in reference to FIGS. 2A-2C and 3. In this embodiment, well 449 is formed in interconnection region 444 of plate body 441 such that the well extends completely through the plate body. The force applying mechanism of this embodiment includes a thin flexible clamping element 448 and a sliding presser foot 447. The presser foot can be displaced in a direction as provided by directional arrow 499 during mating of the first and second bare fiber holders such that it exerts a force on the flexible clamping element. Subsequently, the optical fibers can be permanently locked in place using an optical adhesive and optionally the presser foot can be released.

The exemplary multifiber splice devices and multifiber splice connection systems described herein provide fusion-like performance without the need for fusion splicing, so no expensive or delicate optical fusion machine is required. Such fusion machines require a source of electrical power, time to heat to shrink the protective sleeve, and are precision instruments which are easily damaged if dropped.

FIGS. 12A-12B, 17A-17B and 21 show two alternative bare fiber holders 520, 520' that can be used to form an exemplary optical fiber splice connection system 500 that provides a ferrule-less interconnection system to optically couple a plurality of first and second optical fibers. First and second bare fiber holders 520 of optical fiber splice connection system 500 can be secured together by a clamping member (not shown) similar to optical fiber splice connection system 100 shown in FIG. 1. In an alternative embodiment, the bare fiber holders may be permanently connected with an adhesive, either with or without the use of a clamping member.

Bare fiber holders 520, 520', according to the current invention, manage and protect a fiber array of one or more optical fibers having an exposed glass portion adjacent to the end face or terminal end of the optical fiber(s). In other words, the polymer coatings have been removed from at least a portion of the optical fiber(s) circumferential diameter to facilitate alignment during mating a pair of bare fiber holders to optically interconnect the fiber arrays held by said bare fiber holders.

Structurally, the first and second bare fiber holders 520, 520' are substantially similar. Each of the first and second bare fiber holders 520, 520' can comprise an outer housing 125; a holder housing 521; wherein the holder housing comprises a first housing portion 530 and a second housing portion 560 that can be secured together to form the holder housing; a fiber alignment mechanism 540, 580 and a fiber comb/fiber organizer 535 disposed between the bare alignment mechanism and first housing portion. The difference between the first and second bare fiber holders is the purpose and structure of fiber alignment mechanism within each of the bare fiber holders. For example, the alignment mechanism disposed in the first bare fiber holder 520 can be a clamping element, such as clamping element 540 shown in FIGS. 12A-12B and 13, while the alignment mechanism disposed in the second bare fiber holder 520' can be a splice element, such as splice element 580 shown in FIGS. 17A-17B and 18A-18B.

The first and second bare fiber holders 520, 520' that can be field terminated or installed or mounted onto an optical fiber cable or fiber ribbon in the field followed by assembly of the first and second bare fiber holders to form either a semi-permanent or permanent optical connection. Alternatively, the first and second bare fiber holders can be factory terminated or installed or mounted onto an optical fiber cable or fiber ribbon in the factory followed by assembly of the first and second bare fiber holders to form either a semi-permanent or permanent optical connection in the field.

Optical fiber splice connection system 500 is configured as a multi-fiber optical splice connection system. In the exemplary embodiments described herein, the optical fiber splice connection system is configured to connect first and second arrays of optical fibers. In the exemplary embodiment provided herein, the optical fiber splice connection system is configured to connect two 12 fiber arrays. As would be apparent to one of ordinary skill in the art given the present description, optical fiber splice connection system 500 can be modified to include fewer optical fibers or a greater number of optical fibers in each fiber array. In one exemplary aspect, optical fiber splice connection system 500 can be modified as a single fiber optical splice connection system.

Figure 12B:
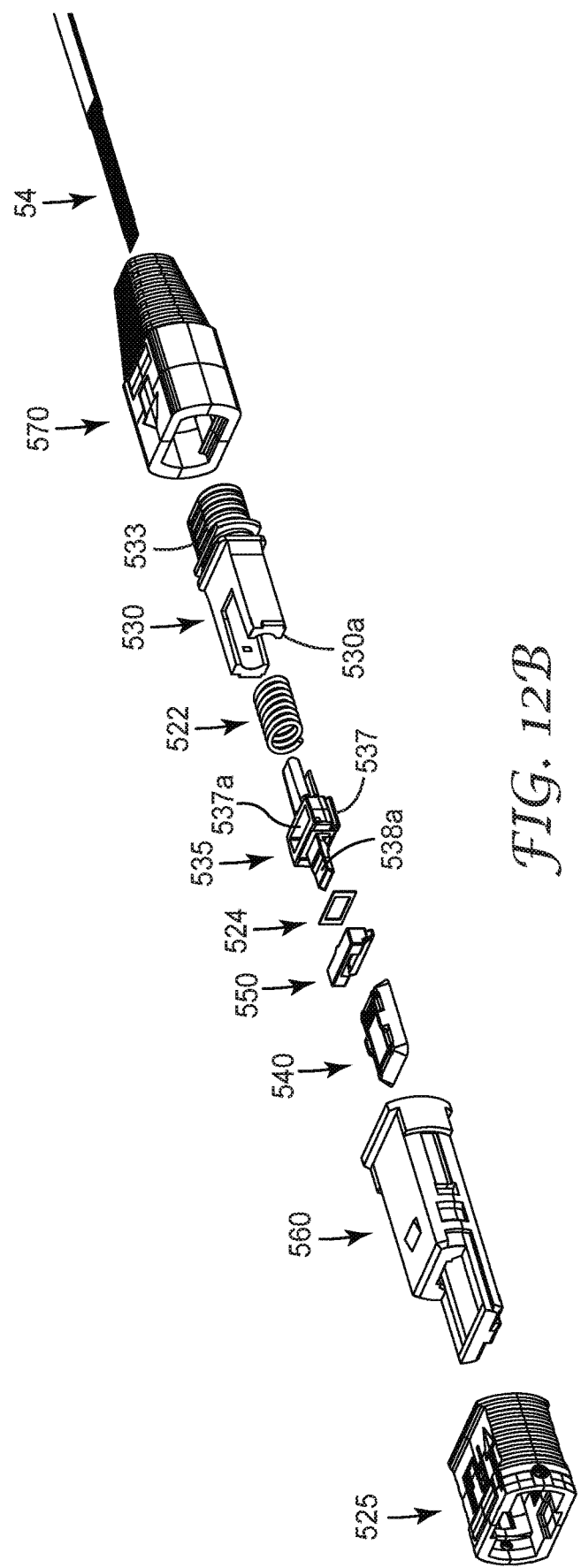

FIG. 12A shows first bare fiber holder 520 in an assembled state, and FIG. 12B shows an exploded view of the first bare fiber holder showing the bare fiber holder's internal components. The first bare fiber holder 520 has a first housing portion 530 and a second housing portion 560 that can be secured together to form the holder housing 521 configured to arrange and hold the rest of the elements of the fiber holder. In an exemplary aspect, at least a portion of first housing portion can be inserted into a portion of the second housing portion to secure the two housing portions together.

Clamping element 540 is a precision element that is disposed in an element receiving pocket 562 adjacent to a first end of the second housing portion 560 of the first bare fiber holder 520. A blocking element 550 is disposed behind the clamping element within the internal cavity 561 of the second housing portion which pushes on the element to ensure that it is properly positioned within the first bare fiber holder. A fiber organizer 535 is disposed between the blocking element and first housing portion. The fiber organizer helps reduce the complexity of assembling the first bare fiber holder onto the end of a fiber cable or fiber ribbon comprising a plurality of optical fibers.

Figure 15:
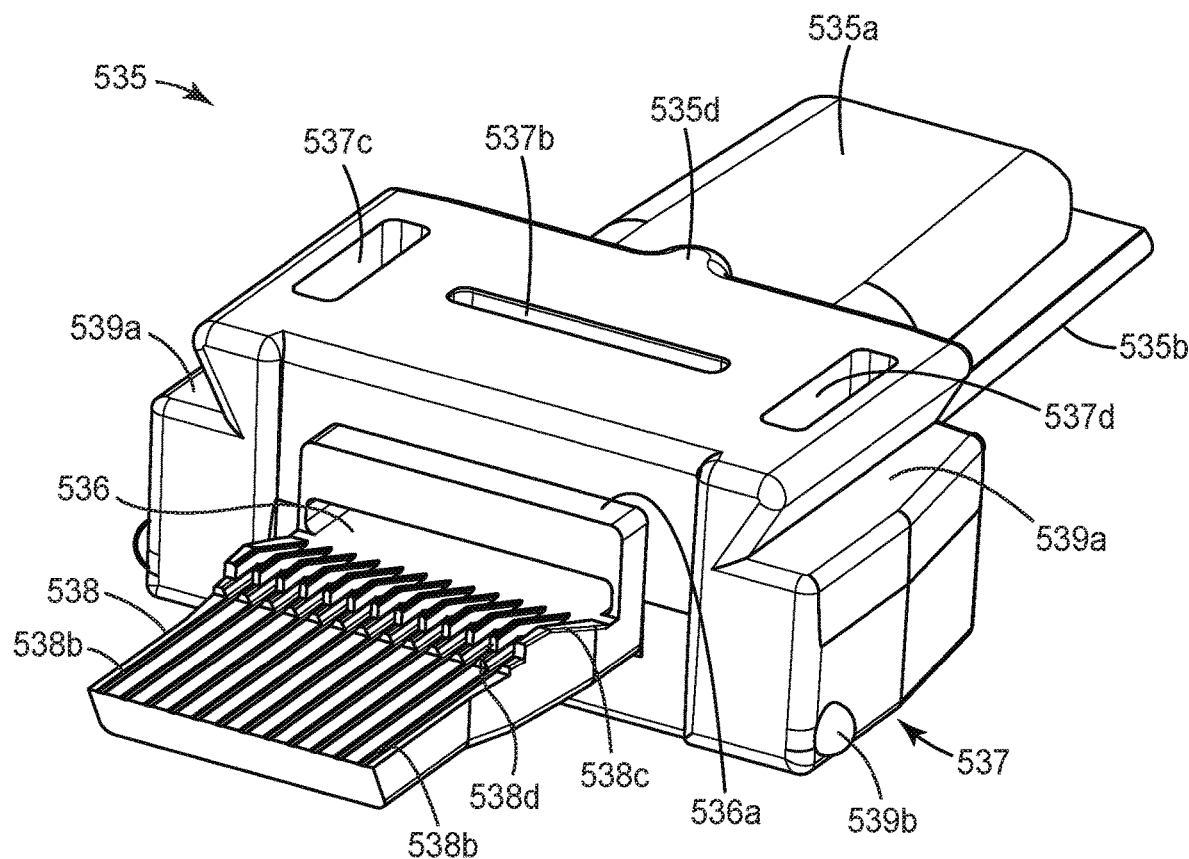
FIG. 15 isometric view of a modified fiber organizer of the bare fiber holders according to an aspect of the invention.

Fiber organizer 535, shown in FIG. 15, is a multi-purpose element that provides for orderly insertion of the plurality of optical fibers into the alignment mechanisms in the first and second bare fiber holders. The fiber organizer has a body portion 537 having a passage 536 extending therethrough to permit insertion of a plurality of optical fibers through the body of the fiber organizer. The body of the fiber organizer supports securing the plurality of optical fibers in a remote gripping region or pocket 537a (FIG. 12B) of the fiber organizer so that the plurality of optical fibers can be firmly held in bare fiber holder 520. In this way, the fibers do not need to be attached to the alignment mechanism (i.e. clamping element 540 in the first bare fiber holder 520 or the splice element 580 in the second bare fiber holder 520', shown in FIG. 17B), so that the optical fibers are free to move or bow within the alignment mechanism. A smaller slot or opening 537b can be formed opposite pocket 537a. Additional slots and openings (such as slots 537c, 537d) can also be provided in in the fiber organizer to accommodate features of the clamping mechanism, if needed. In one aspect, a mechanical clamp (not shown) can be utilized to secure an array of optical fibers within the fiber organizer. Alternatively, an adhesive, such as a fast-curing UV or visible light initiated adhesive or a thermally activated adhesive, such as a hot-melt material can be utilized to secure an array of optical fibers within the fiber organize.

Fiber organizer 535 includes a fiber comb portion 538 that is used to support, align and guide the optical fibers to be terminated. The fiber comb portion includes a top surface 538a (see FIG. 7B) and an array of grooves 538b, located on the underside of the top surface, disposed on an end of the fiber organizer (nearest the splice element when assembled), with each individual groove or channel 538b configured to guide and support a single optical fiber. The fiber comb portion also includes a ramp section 538c adjacent groove array 538b and disposed between the groove array and the body portion 537 of the fiber organizer. The ramp section includes gradual rising dividing structures 538d that separate the individual groove which can help align the individual fibers during the fiber insertion process. The structure of the fiber comb portion can separate potentially tangled fibers, and arrange the fiber array in a uniform pitch, and allowing for straightforward feeding of the fiber array into the alignment channels of the alignment mechanism. In addition, the groove array/ramp structure of the fiber comb portion allows for precision placement of the fiber array with the naked eye.

Fiber organizer 535 also includes a rear portion having an opening (not shown) that allows for insertion of the optical fibers into the fiber organizer passage 536. In one aspect, the rear portion includes extending support structures 535a and 535b (disposed opposite each other about the opening) that are configured to receive and support compression spring 522. The compression spring can fit over the support structure such that it rests against a rear of the body portion 537 of the fiber organizer on one side of the compression spring and against the first housing portion on the opposite side of the compression spring. A contact bump or protrusion 535d can be formed on the rear portion of the fiber organizer to contact compression spring 522 and to center the force of the spring relative to the fiber organizer. Thus, when first fiber holder 520 is assembled, the resilient element/compression spring 522 will be disposed between the fiber organizer 535 and the first housing portion 530.

Figure 16A:
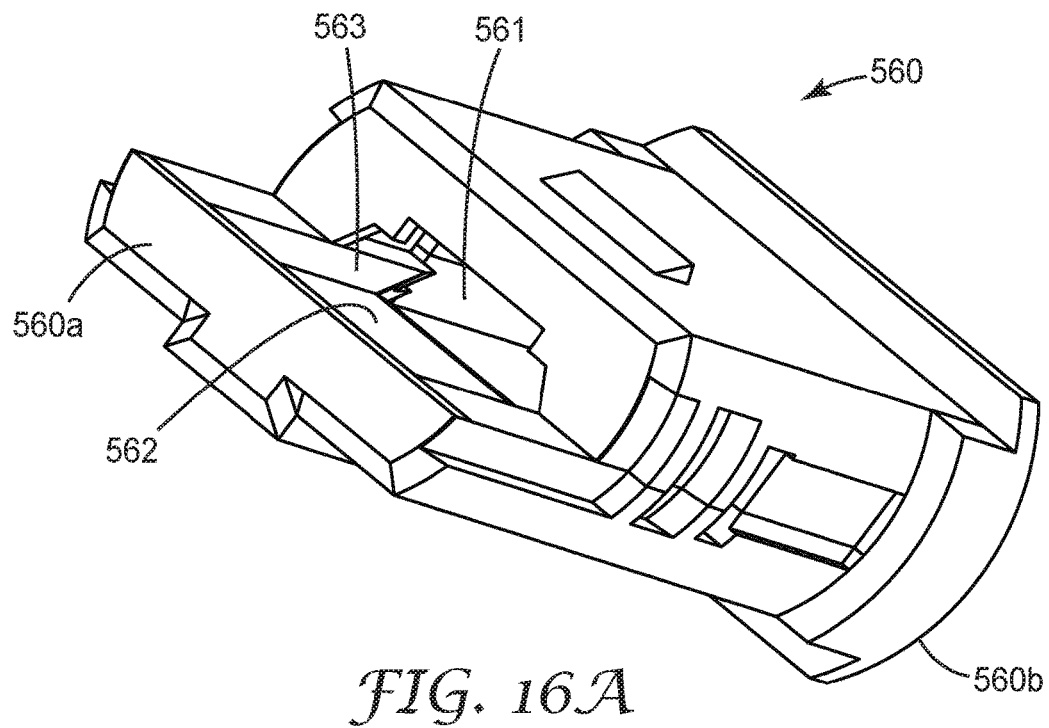
FIGS. 16A-16D are four views of the second housing portion of the fiber holder shown in FIGS. 12A and 12B.
Figure 16B:
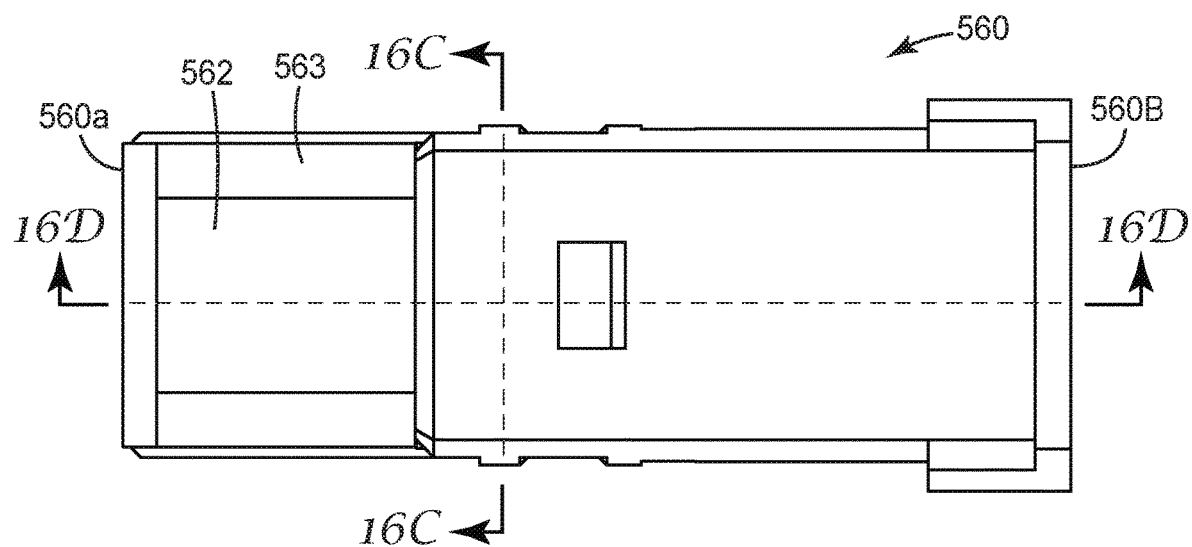
Figure 16C:
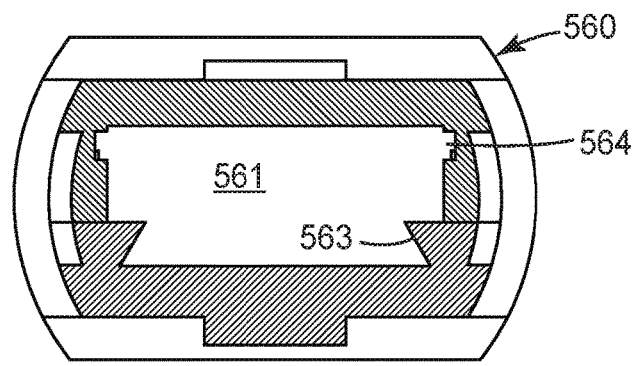
Figure 16D:
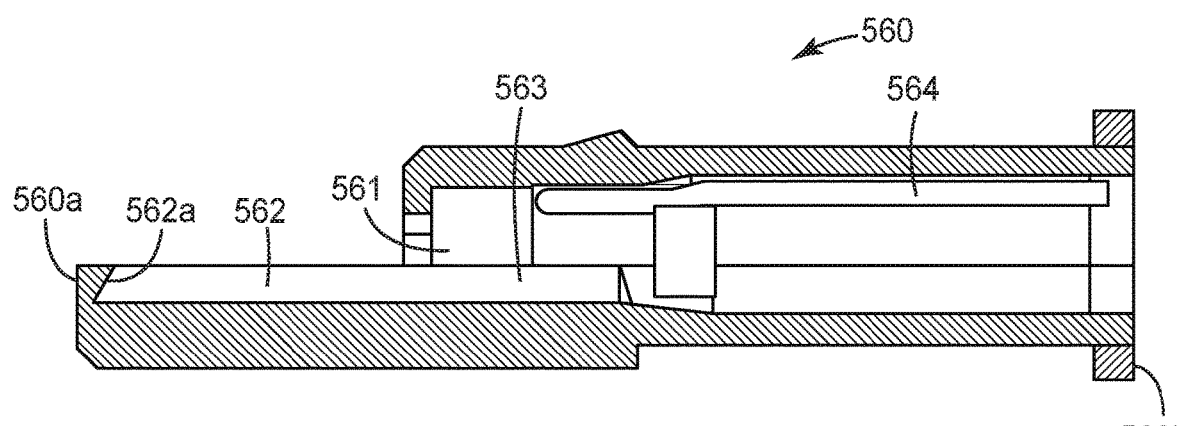
Figure 18A:
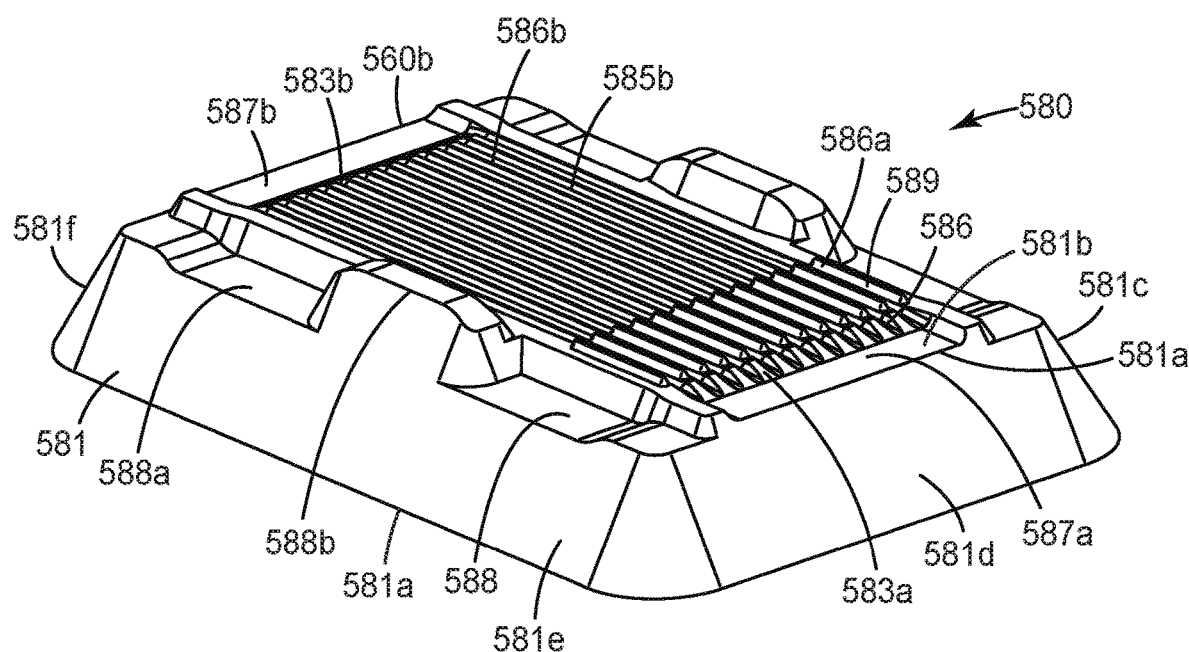
FIGS. 18A and 18B are two views of an exemplary splice element useable in the bare fiber holder of FIGS. 17A and 17B.
Figure 18B:
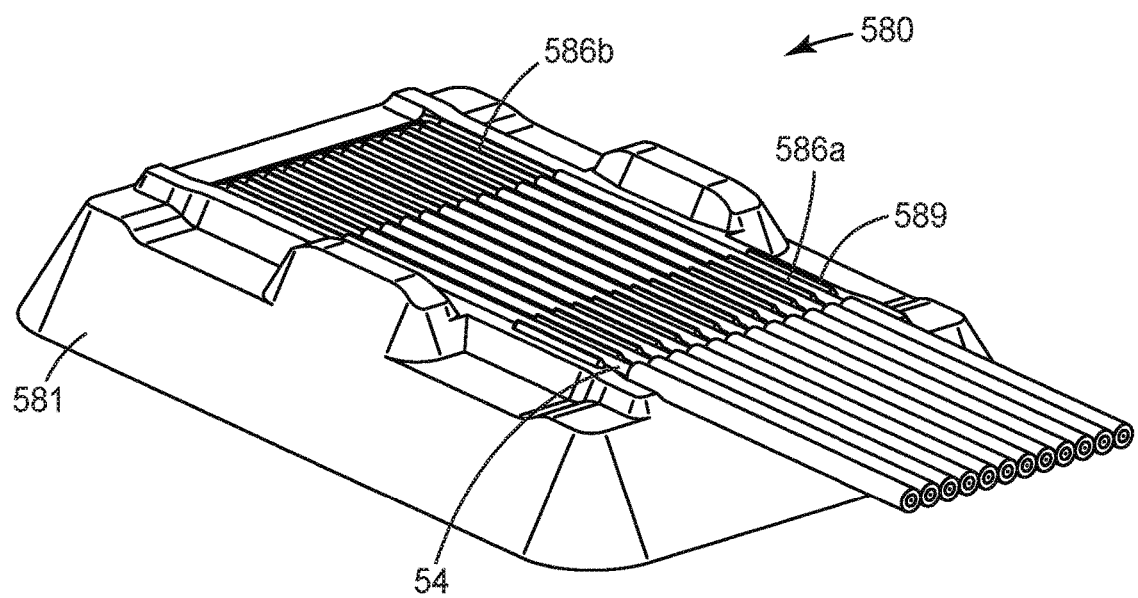

In an exemplary aspect, fiber organized 535 can include a guide pin or protrusion 539b extending from the sides of the fiber organizer to facilitate proper positioning of the fiber organizer in the second housing portion of the exemplary bare fiber holder. The guide pins fit into guide slots 564 formed in the interior side walls of the second housing portion as illustrated in FIGS. 16C and 16D.

In addition, the fiber organizer 535 may have one or more <-shaped notches 539a formed in the sides thereof that can be further used to guide and position the fiber organizer within the second housing portion 560. The <-shaped notches 539a can be guided on inclined side walls 543 which help form the element receiving pocket 562 to ensure proper positioning of the fiber organizer within the second housing portion of the first and second bare fiber holders.

According to an aspect of the present invention, fiber organizer 535 can be formed or molded from a polymer material, although metal and other suitable materials can also be utilized. For example, fiber organizer 535 can comprise an injection-molded, integral material. The choice of suitable materials for the fiber organizers can be made in accordance with the temperature stability parameters.

A first intermediate spring element 524 can be disposed between a front portion of the fiber organizer 535 and the blocking element 550 to help control the force placed on the fiber ends when they are connected. Intermediate spring 524 is substantially similar to the small spring element, intermediate spring 124 as described previously in reference to FIG. 5B. Intermediate spring 524 can be a flat or leaf spring that is seated on a shelf or shoulder portion 536a disposed around the opening of passage 536 that extend through the fiber organizer (see e.g., FIG. 15).

Figure 14A:
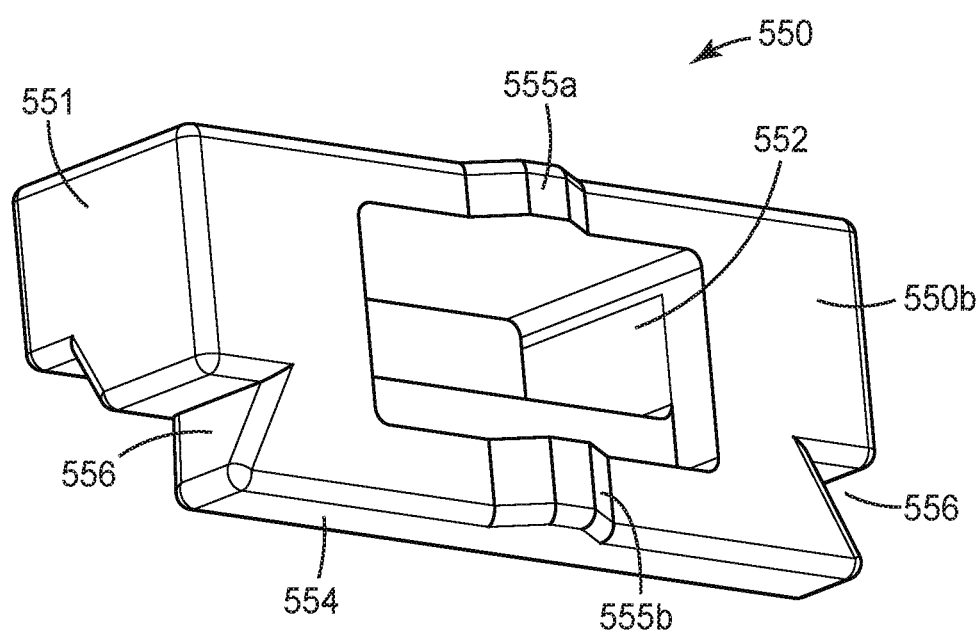
FIGS. 14A and 14B are two views of a blocking element according to an aspect of the invention.
Figure 14B:
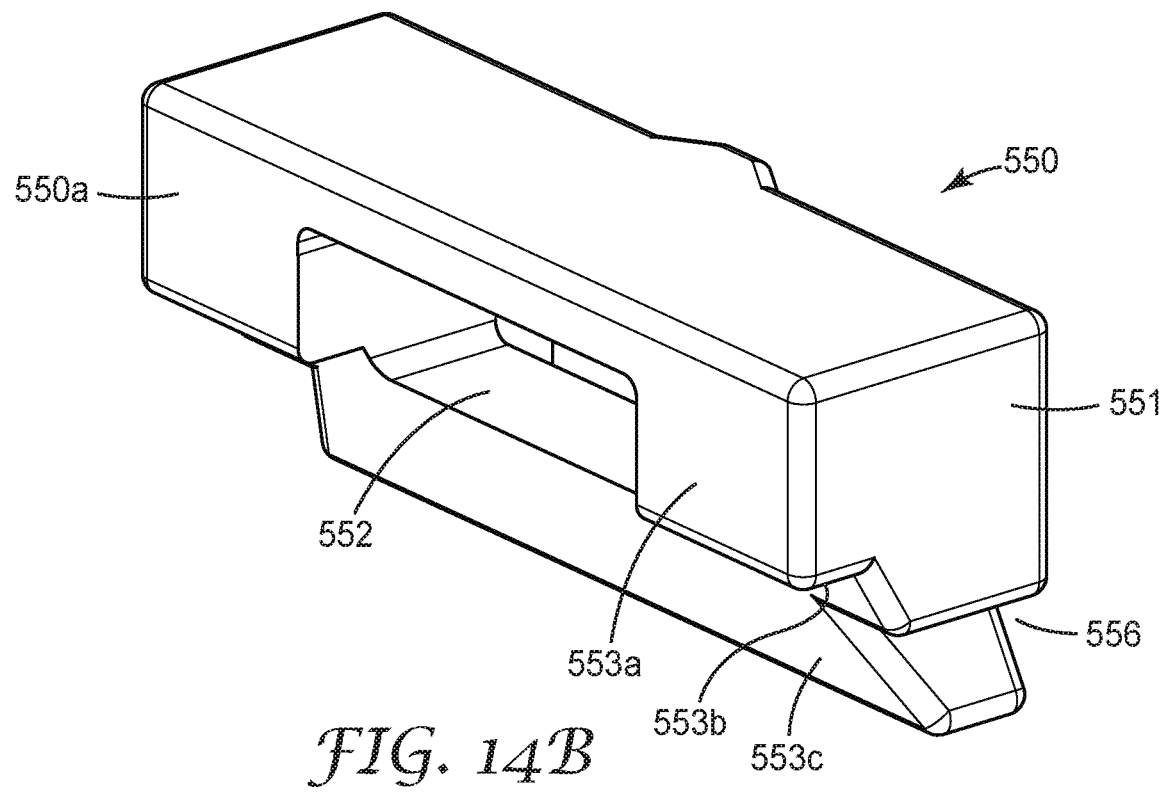

As shown in FIGS. 14A-14B, the blocking element 550 includes a pair of protrusions or bumps 555a, 555b located on a rear portion thereof that provides a point of contact with the intermediate spring and helps center the force applied by the intermediate spring element. The intermediate spring element enables a desired ratio of spring forces to be applied to the fibers being terminated and helps balance the forces within the bare fiber holder. In one aspect, the intermediate spring can provide a countering force to dampen the force placed on the mated fibers by compression spring 522.

The actual force applied to the end of the fiber array can be controlled by tuning the compressive force of intermediate spring 524 and a compression spring 522 disposed between the fiber organizer 535 and the first housing portion 530 to create a variable resulting force on the fiber array. By using this configuration, the multi-fiber splice device(s) of the present invention can utilize the spring forces of the fiber array, the intermediate spring and the main compression spring to achieve a force balance. In one exemplary aspect, this force balancing can be used to enable the exemplary remote grip bare fiber holders to be used to create a reliable dry splice interface (no optical coupling material or index matching gel or adhesive) in the optical path in conjunction with fiber end face shaping techniques known in the industry. For example, putting a spherical end face shape onto the fiber can eliminate the need for index matching material in the splice region and yield an insertion loss of less than 0.5 dB.

As mentioned previously, the first bare fiber holder comprises an alignment mechanism, wherein the alignment mechanism is a clamping element 540 as shown in FIG. 15. Clamping element 540 has a generally rectangular body 541. In an exemplary aspect, the shape of the body 541 is a rectangular frustum. In alternative aspects, the body may have another shape such as a trapezoidal prism, semi-cylindrical solid, bisected prism or other three-dimensional shape having at least one generally flat major surface. The body 541 has a bottom surface 541a, a smaller top surface 541b and four sloped side walls 541c-151f extending from the bottom surface to the top surface. In an exemplary aspect, the side walls are sloped at an angle between about 45° and about 85°, preferably at an angle of about 60° relative to the bottom surface.

Clamping element 540 is configured to join a plurality of parallel optical fibers 54, 54' of first and second optical fiber ribbons 50 as shown in FIGS. 8A-8C when mated with bare fiber holding plate 580 as illustrated in FIGS. 20A-20D. Clamping element 540 has an integral alignment mechanism comprising a plurality of alignment grooves or channels 545 formed in at least a portion of top major surface 541b. Each alignment channel is configured to guide and support a single optical fiber. In the exemplary embodiment shown in FIG. 20A, the clamping element has 12 parallel alignment channels. In alternative embodiments, the exemplary optical fiber slice element can have fewer or more alignment channels depending on the final application and the number of optical fibers to be spliced.

Alignment channels 545 are discontinuous having a first alignment portion 545a and a second alignment portion 545b disposed on either side of interconnection region 544. For example, the first alignment portion 545a of alignment channels 545 can be substantially flat or planar as they extend first and second fiber landing areas 547a can be substantially flat and can extend from first fiber landing areas 547a to the first side 544a of interconnection region, and the second alignment portion 545b of alignment channels 545 can extend from the second side 544b of the interconnection region to an edge of the second fiber landing areas 547b. Each alignment channel 142 can have a semi-circular cross section, a trapezoidal cross section, a rectangular cross section, a v-shaped cross section or the cross-section profile may vary along the length of the alignment channels. In alternative aspects, the alignment channels can have a generally arched profile to aid insertion of the optical fibers into the alignment channels in the proper position.

Figure 13:
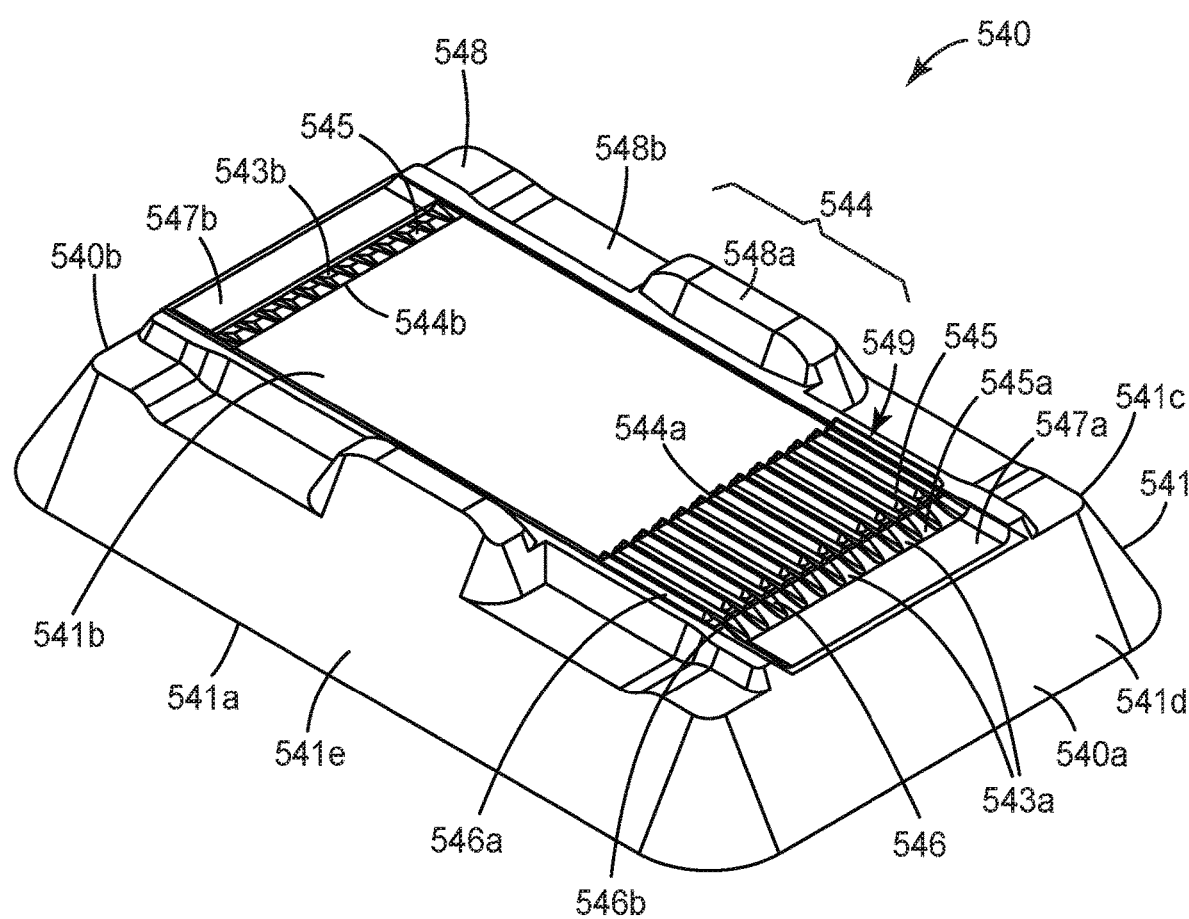
FIG. 13 is an isometric view of an exemplary clamping element useable in the bare fiber holder of FIGS. 12A and 12B.

The interconnection region 544 of clamping element 540 can have a generally flat surface that configured to press on the optical fibers when the first and second bare fiber holders are joined together. In some embodiments, the clamping element can be a monolithic element as shown in FIG. 13. In an alternative aspect, the clamping element can include a well formed in the interconnection area to provide a flexible or resilient interconnection region similar to the structures employed in the exemplary bare fiber holding plates 240, 340 or 440 shown in FIGS. 9A-9C.

The optical fibers can be inserted into the alignment mechanism through entrance openings 543a and 543b. In some embodiments, the entrance openings 543a, 543b can comprise a funneling inlet portion formed by the tapering of the partitions 544 between adjacent channels to provide for more straightforward fiber insertion. In other embodiments, the entrance apertures can be fully or partially cone or funnel-shaped to guide the insertion of the optical fibers into the alignment channels 545.

The alignment channels can have a comb structure 549 adjacent to at least one of the first and second entrance openings to facilitate the insertion of the optical fibers into the alignment channels 545. In the comb structure, a portion 546a of partitions or walls 546 between adjacent alignment channels are higher and tapered than the remaining section 546b of partitions 546. The entrance openings 543a, 543b are characterized by a interchannel pitch (i.e. the distance between the centerline of adjacent alignment channels). In the embodiment, shown in FIG. 13, the channel pitch at the first end of the clamping element is the same as the channel pitch at the second end of the clamping element. In this exemplary embodiment, the interchannel pitch is approximately the same as the inter-fiber spacing in a conventional 12 fiber ribbon. In an alternative embodiment, the interchannel pitch at the first end of the clamping element and the channel pitch at the second end of the clamping element can be different. For example, the channel pitch at the first end of the clamping element can be set to the fiber spacing of a conventional optical fiber ribbon, while the channel pitch at the second end of the clamping element can be at a different value such as when splicing individual optical fibers or when splicing two or more smaller optical fiber ribbon ribbons or optical fiber modules to a larger ribbon fiber.

Clamping element 540 includes a rail 548 disposed along each longitudinal edge of clamping body 541. Clamping element 540 can a locking depression 548a and/or stand-off feature in the form of a locking protrusion 548b. For example, clamping element 540 includes a locking depression 548a and a locking protrusion 548b in each rail 548. These features will interact with corresponding features splice element 580 when the first and second bare fiber holders are mated together as shown in FIGS. 20A-20D. The rails of the clamping element provide course element-to-element alignment to bring the clamping and splice elements together in a controlled manner while the alignment channels in the clamping and splice elements provide the fine fiber-to-fiber alignment necessary to make a robust optical connection.

In an exemplary aspect, the clamping element 540 of the present invention can be formed using a sol casting resin to generate net shape silica ceramic parts, such as is disclosed in U.S. Provisional Patent Application Nos. 62/382,944 and 62/394,547, herein incorporated by reference in its entirety.

Figure 21:
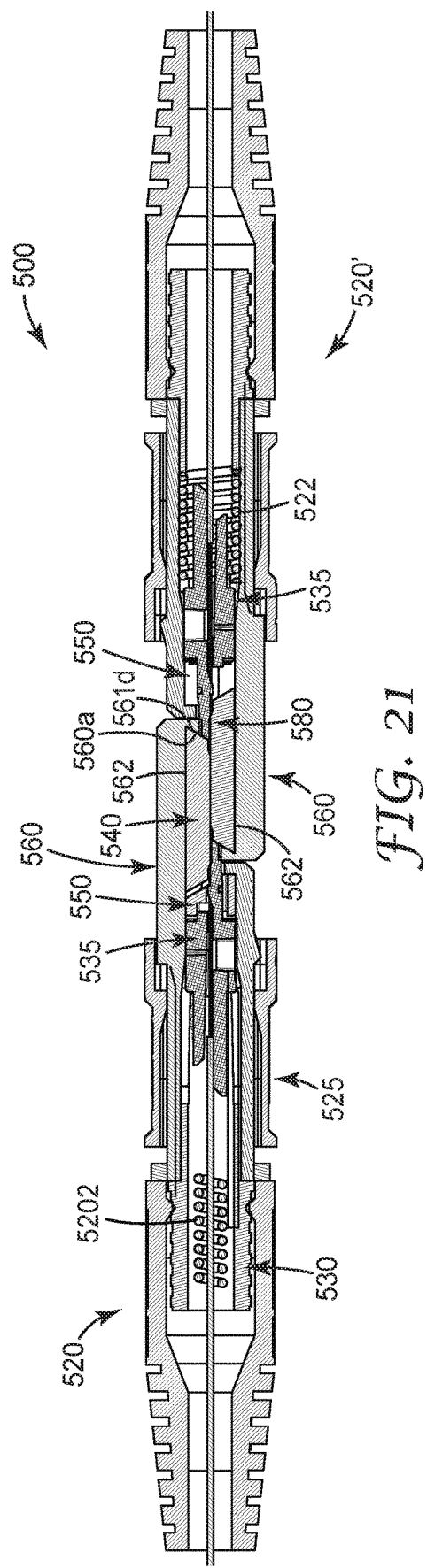
FIG. 21 is a cross sectional view of the optical fiber splice connection system comprising the first bare fiber holder of FIGS. 12A and 12B and the second bare fiber holder of FIGS. 17A and 17B.

Referring to FIGS. 14A-14B and 21, clamping element 540 disposed in an element receiving pocket 562 the first bare fiber holder 520 adjacent to a first end of the second housing portion 560. A blocking element 550 is disposed behind clamping element 540 within the internal cavity of the second housing portion which pushes on the element to ensure that it is properly positioned within the bare fiber holder. Blocking element 550 anchors the clamping element 540 in the element receiving pocket by forming the fourth wall of the receiving pocket. Blocking element 550 includes a front side 550a, a back side 550b and an opening 552, to permit passage of a portion of the comb structure of the fiber organizer which is holding the optical fibers to be spliced by the connection system of the present invention. The front side of the blocking element includes a vertical wall portion 553a, a cutaway portion 553b and an angled wall portion 553c. The angled wall portion 553c is configured to push against inclined wall 541f of clamping element 540 to ensure that it is pushed fully into the element receiving pocket 562 as shown in FIG. 9B. The cutaway portion will rest against the top surface of the splice to control the vertical position of the splice element in the element receiving pocket. In an exemplary aspect, blocking element 550 can include alignment slots 556 along either side 551 of the blocking element that are configured to engage with inclined sidewalls 543 of the element receiving pocket. The back side of the blocking element is a generally vertical surface that includes a pair of protrusions or bumps 555a, 555b located on a rear portion thereof that provides a point of contact with the intermediate spring and helps center the force applied by the intermediate spring element 524.

As mentioned previously, the first and second bare fiber holders 520, 520' are substantially similar with the difference between the first and second bare fiber holders being the fiber alignment mechanism disposed therein. The alignment mechanism disposed in the second bare fiber holder 520' can be a splice element, such as splice element 580 shown in FIGS. 17A-17B and 18A-18B.

Splice element 580 has a generally rectangular body 581. In an exemplary aspect, the shape of the body 581 is a rectangular frustum. In alternative aspects, the body may have another shape such as a trapezoidal prism, semi-cylindrical solid, bisected prism or other three-dimensional shape having at least one generally flat major surface. The body 581 has a bottom surface 581a, a smaller top surface 581b and four sloped side walls 581c-151f extending from the bottom surface to the top surface. In an exemplary aspect, the side walls are sloped at an angle between 38° and about 75° relative to the bottom surface.

Splice element 580 has an integral alignment and clamping mechanism in the form of a plurality of alignment channels 585, formed in the top surface 581b of body 581 between first and second fiber landing areas 587a, 587b disposed adjacent to the first end 581a and the second end 581b of the splice body, respectively. Each alignment channel is configured to guide and support a single optical fiber. In the exemplary embodiment shown in FIG. 18A, the splice element has 52 parallel alignment channels. In alternative embodiments, the exemplary optical fiber slice element can have fewer or more alignment channels depending on the final application and the number of optical fibers to be spliced. Thus, in some embodiments, the splice element can have a single alignment channel for joining a pair of simplex optical fiber cables. In other embodiments, the exemplary splice element can have a larger number of alignment channels.

Alignment channels 585 can be substantially flat or planar as they extend first and second fiber landing areas 587a, 587b of the splice element 580. In the exemplary embodiment shown in FIGS. 3A-3B, the alignment channels are continuous structures extending from the first entrance opening 583a near the first end 581a of splice body 581 to the second entrance opening 583b near the second end 581b of splice body 581. The alignment channels can have a characteristic cross-section, such as the trapezoidal profile shown in FIG. 4C. Alternatively, alignment channels can have a semi-circular cross section, a rectangular cross section, a v-shaped cross section.

The optical fibers can be inserted into the alignment mechanism through entrance openings 583a and 583b. In some embodiments, the entrance openings 583a, 583b can comprise a funneling inlet portion formed by the tapering of the partitions 584 between adjacent channels to provide for more straightforward fiber insertion. In other embodiments, the entrance apertures can be fully or partially cone or funnel-shaped to guide the insertion of the optical fibers into the alignment channels 585.

The alignment channels can have a comb structure 589 adjacent to at least one of the first and second entrance openings to facilitate the insertion of the optical fibers into the alignment channels 585. In the comb structure, a portion 584a of partitions or walls 584 between adjacent alignment channels are higher and tapered than the remaining section 584b of partitions 584.

The entrance openings 583a, 583b are characterized by a interchannel pitch (i.e. the distance between the centerline of adjacent alignment channels). In the embodiment, shown in FIGS. 1A and 5B, the channel pitch at the first end of the splice element is the same as the channel pitch at the second end of the splice element. In this exemplary embodiment, the interchannel pitch is approximately the same as the inter-fiber spacing in a conventional 52 fiber ribbon. In an alternative embodiment, the interchannel pitch at the first end of the splice element and the channel pitch at the second end of the splice element can be different. For example, the channel pitch at the first end of the splice element can be set to the fiber spacing of a conventional optical fiber ribbon, while the channel pitch at the second end of the splice element can be at a different value such as when splicing individual optical fibers or when splicing two or more smaller optical fiber ribbon ribbons or optical fiber modules to a larger ribbon fiber.

Alignment channels 585 are configured such that a fiber disposed in the alignment channel will contact each of the sloped channel walls 585a, 585b of the alignment channel along a line of contact 54a, 54b disappearing into the page in FIG. 19 along the length of the fiber disposed within the alignment channel. Thus, when splice elements 580 and clamping element 540 are brought together, each optical fiber will have two lines of contact 54a, 54b, with the splice element and one line of contact 54c with the clamping element to reliably position and hold said optical fibers. In an exemplary aspect, the three lines of contact can be spaced relatively uniformly around the optical fiber.

Referring to FIGS. 17A and 19, the sloped channel walls 585a, 585b of the alignment channels can be disposed at an angle relative to the bottom wall 585c of the alignment channel of between about 38° and about 75°. The alignment channels can be characterized by a characteristic alignment channel width, w, between the lines of contact extending longitudinally along the sloped channel walls of the alignment channel where the optical fibers contact the alignment channel.

Figure 20A:
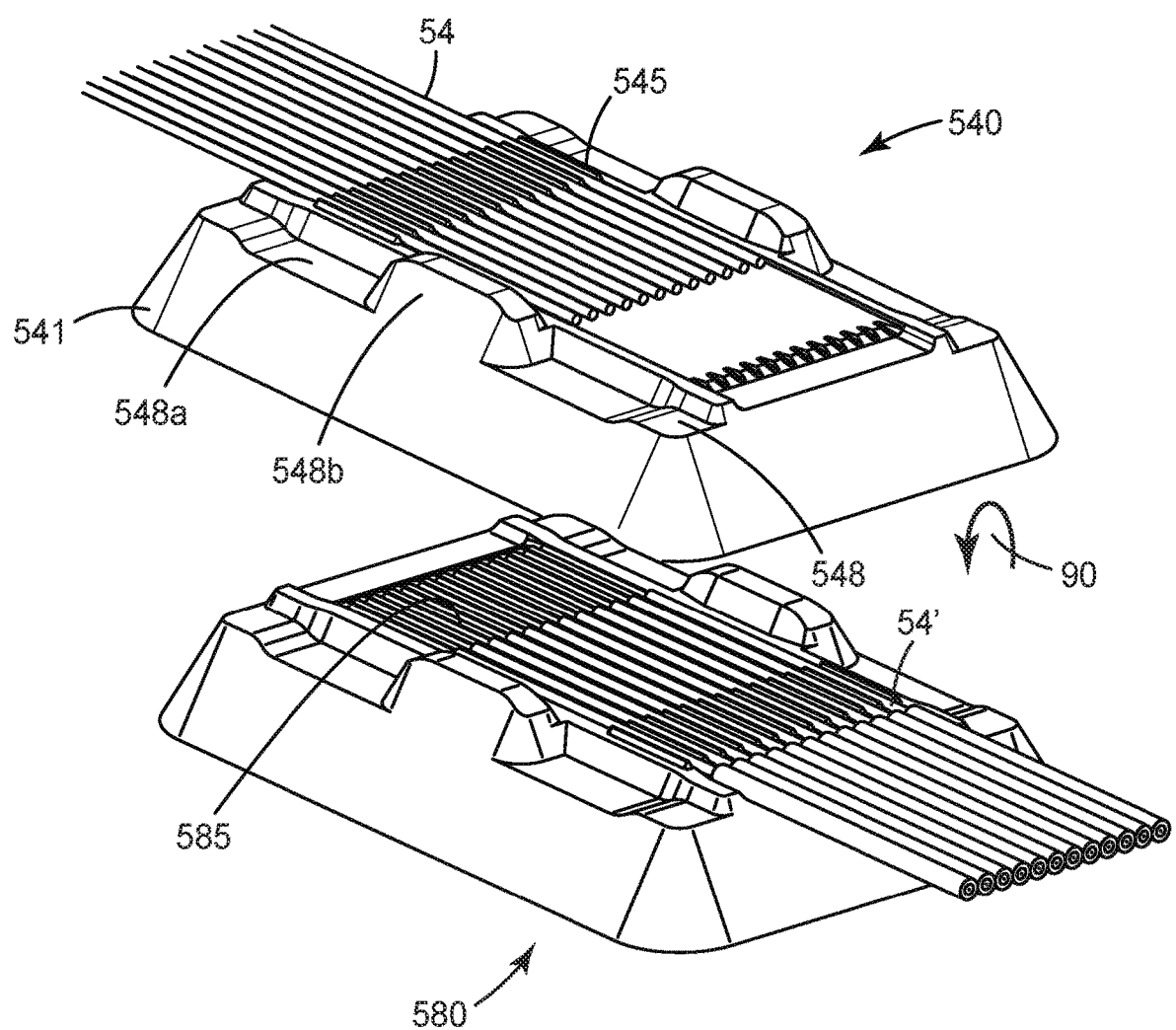
FIGS. 20A-20D are four views of the mating of a pair of the clamping element of FIG. 13 and the splice element of FIGS. 18A and 18B.
Figure 20B:
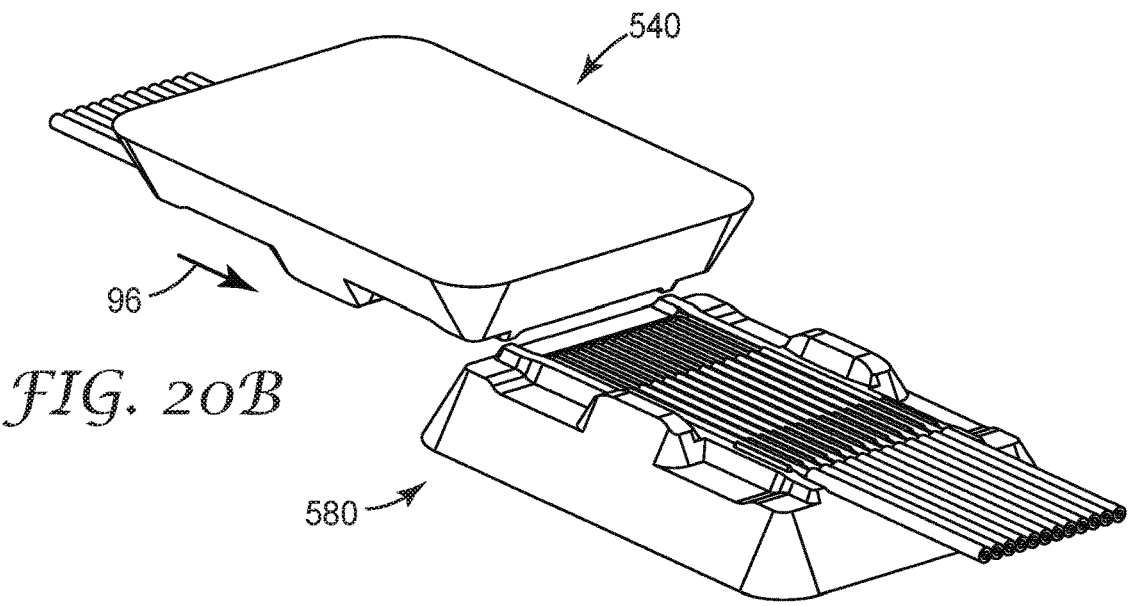
Figure 20C:
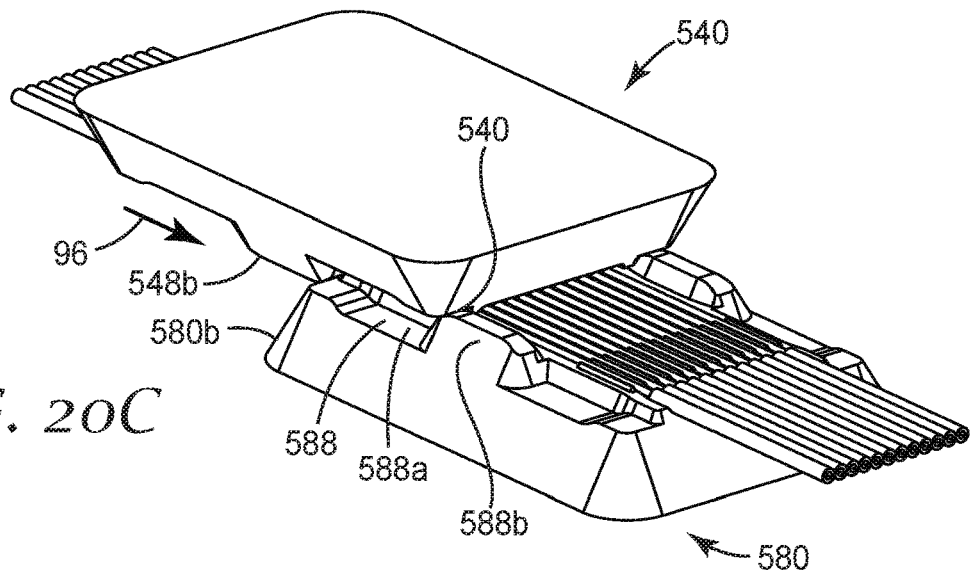
Figure 20D:
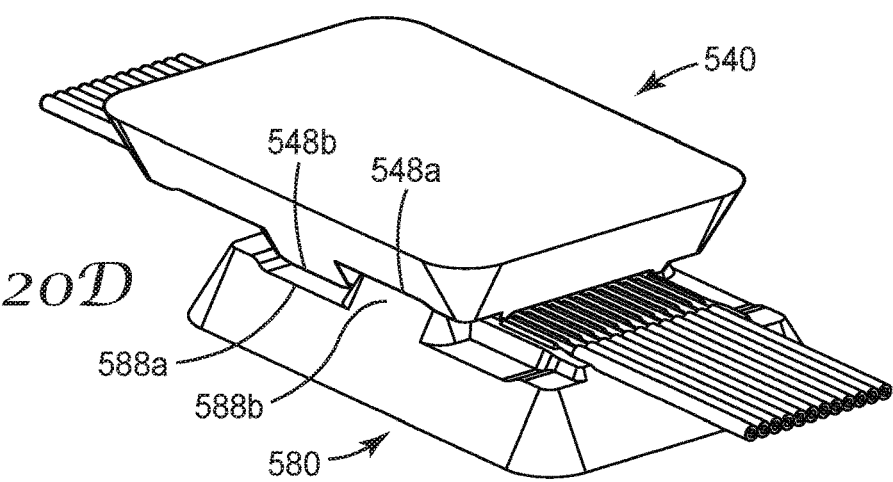

Splice element 580 also includes a rail 588 disposed along each longitudinal edge of splice body 581. Splice element 580 can include standoff features that provide a controlled vertical offset between splice elements 580 and clamping element 540 during at least a portion of the mating process. For example, a first plurality of optical fibers can be disposed in in the alignment channels 545 in clamping element 540 and a plurality of second optical fibers 54' can be secured in the alignment channels 585 in a second splice element 580 (directional arrow 90 in FIG. 20A represents the inversion or flipping over of the clamping element 540 in preparation to mate the clamping element and the splice element). The optical connection is made by sliding the splice elements on the standoff features formed on the clamping element and the splice element until the standoff features fit into depressions formed in the rail surface of the other of splice elements.

Each rail 548, 588 of the clamping element 540 and the splice element 580 can include a locking depression 548a, 588a and/or stand-off feature in the form of a locking protrusion 548b, 588b, respectively. In the exemplary embodiment shown in FIG. 20A, both the clamping element and the splice element splice element 580 includes a locking depression and a locking protrusion in each rail.

FIGS. 20A-20D illustrate the mating sequence for the clamping element 540 and the splice element 580 to optically connect a first and a second plurality of optical fibers 54, 54'. The superstructure around the splice elements is not shown in the figures so that the interactions of the splice elements can be clearly seen. FIG. 20A is a top isometric view of the clamping element and the splice element. The clamping element 540 is flipped over or inverted as provided by directional arrow 90. FIG. 8B shows the clamping element 540 and the splice element 580 moving toward each other in a forward and slightly downward direction as provided by directional arrow 96. FIG. 8C shows the point where the locking protrusion 548b of clamping element 540 contacts rail 588 at the second end 580b of splice element 580 and where the rail 548 of the clamping element contacts the locking protrusion 588b of the splice element. Clamping element 540 continues sliding along on the surface of the locking protrusions as indicted by directional arrows 96 until locking protrusion 548b of the clamping is seated in locking depression 588a of splice element and the locking protrusion 588b of the splice element is seated in the locking depression 548a of the clamping element, as shown in FIG. 8D. The rails of the splice element provide course element-to-element alignment to bring the elements together in a controlled manner while the alignment channels in the splice elements provide the fine fiber-to-fiber alignment necessary to make a robust optical connection.

FIG. 21 is a cross section of exemplary optical fiber connection system 500 showing how the internal component are arranged in the bare fiber holders 520, 520' as described previously.

In some embodiments, second housing portion 560 can be made of a transparent or semi-transparent material or may have a window formed therethrough to allow irradiation of an optical adhesive disposed in the interconnection region of the splice to permanently secure, the first and second bare fiber holders 520, 520' together. For example, the first and second bare fiber holders can be secured together with an optical adhesive such as the optical adhesive described in U.S. patent application Ser. No. 15/696,901. Alternatively, the first and second bare fiber holders can be semi-permanently secured together via a mechanical clamping element, such as clamping element 110, shown in FIG. 1, in either a dry state or using an index patching material disposed between the terminal ends of the optical fiber arrays being joined in the exemplary an optical fiber splice connection system.

A third embodiment of an exemplary optical fiber connection system is shown in FIGS. 22A-22B through 26A-26C. Optical fiber splice connection system 600 provides a ferrule-less interconnection system to optically couple a plurality of first and second optical fibers. Optical fiber splice connection system 600 comprises a pair of bare fiber holders, such as first and second bare fiber holders 620, 620'. In one aspect, the bare fiber holders may be secured together with an auxiliary clamping member (not shown) or by an adhesive. The first and second bare fiber holders 620, 620' can each be field terminated, installed or mounted onto an optical fiber cable or fiber ribbon in the field followed by assembly of the first and second bare fiber holders to form either a semi-permanent or permanent optical connection. Alternatively, the first and second bare fiber holders can be factory terminated, installed or mounted onto an optical fiber cable or fiber ribbon in the factory followed by assembly of the first and second bare fiber holders to form either a semi-permanent or permanent optical connection in the field.

Figure 23A:
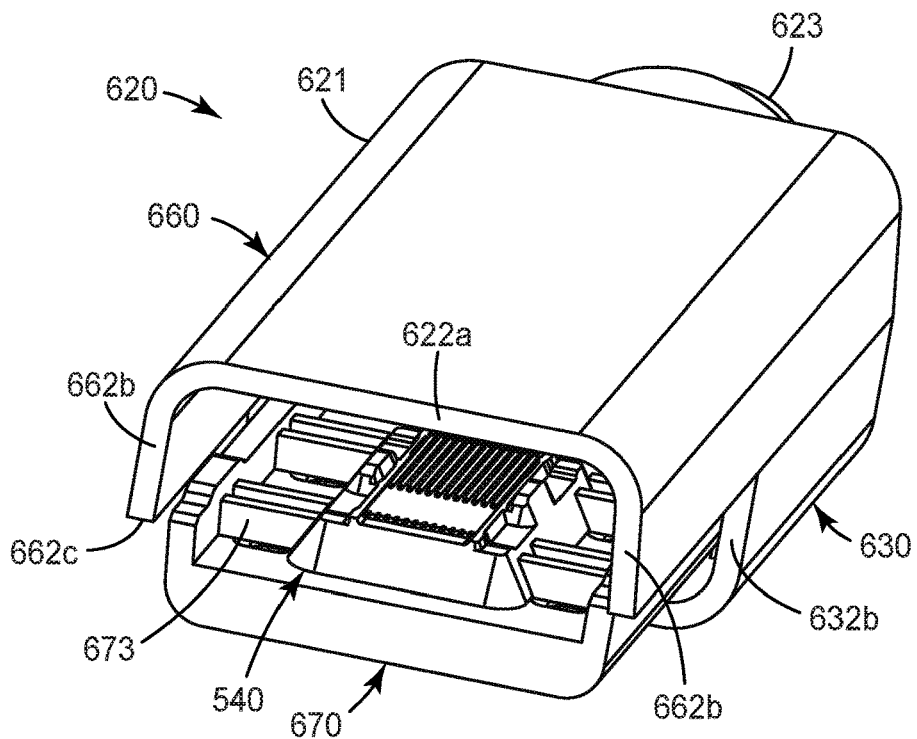
FIGS. 23A-23C are three views of a first bare fiber holder of the exemplary optical fiber connection system of FIGS. 22A and 22B.
Figure 23B:
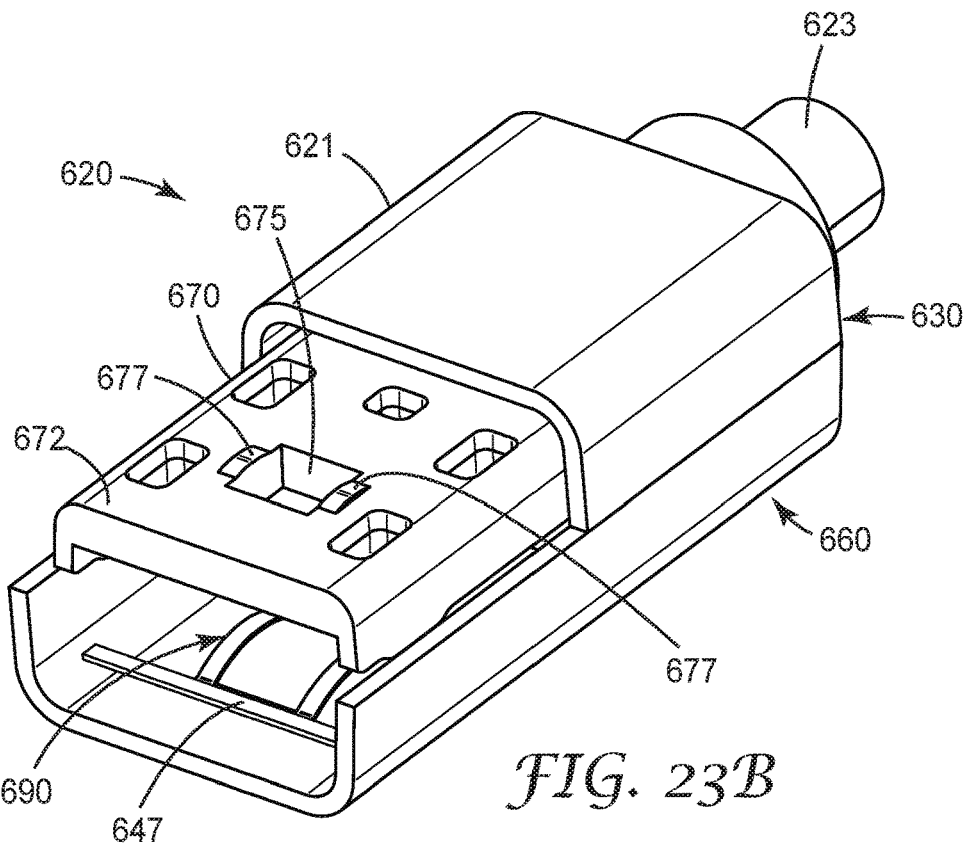
Figure 23C:
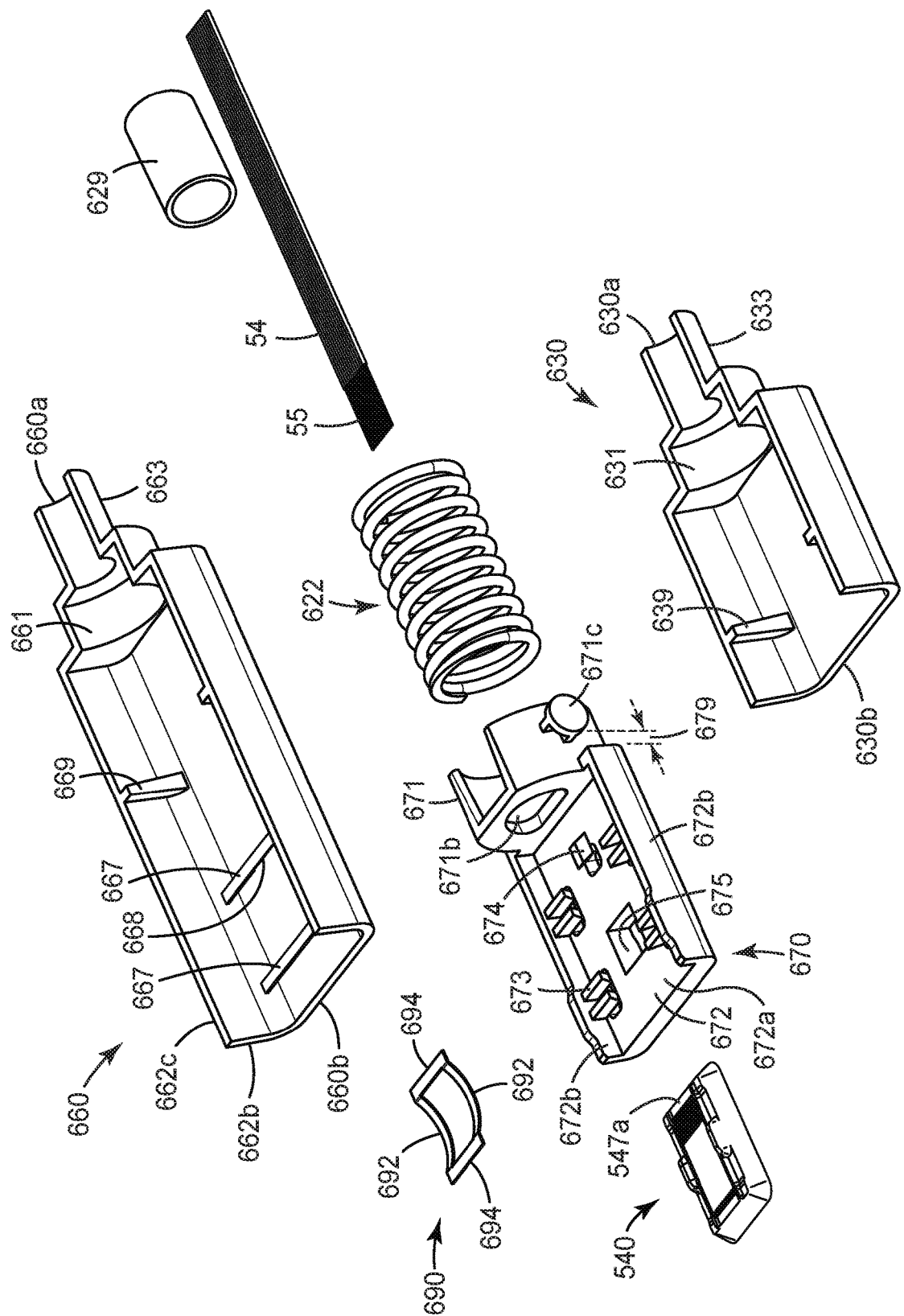
Figure 24A:
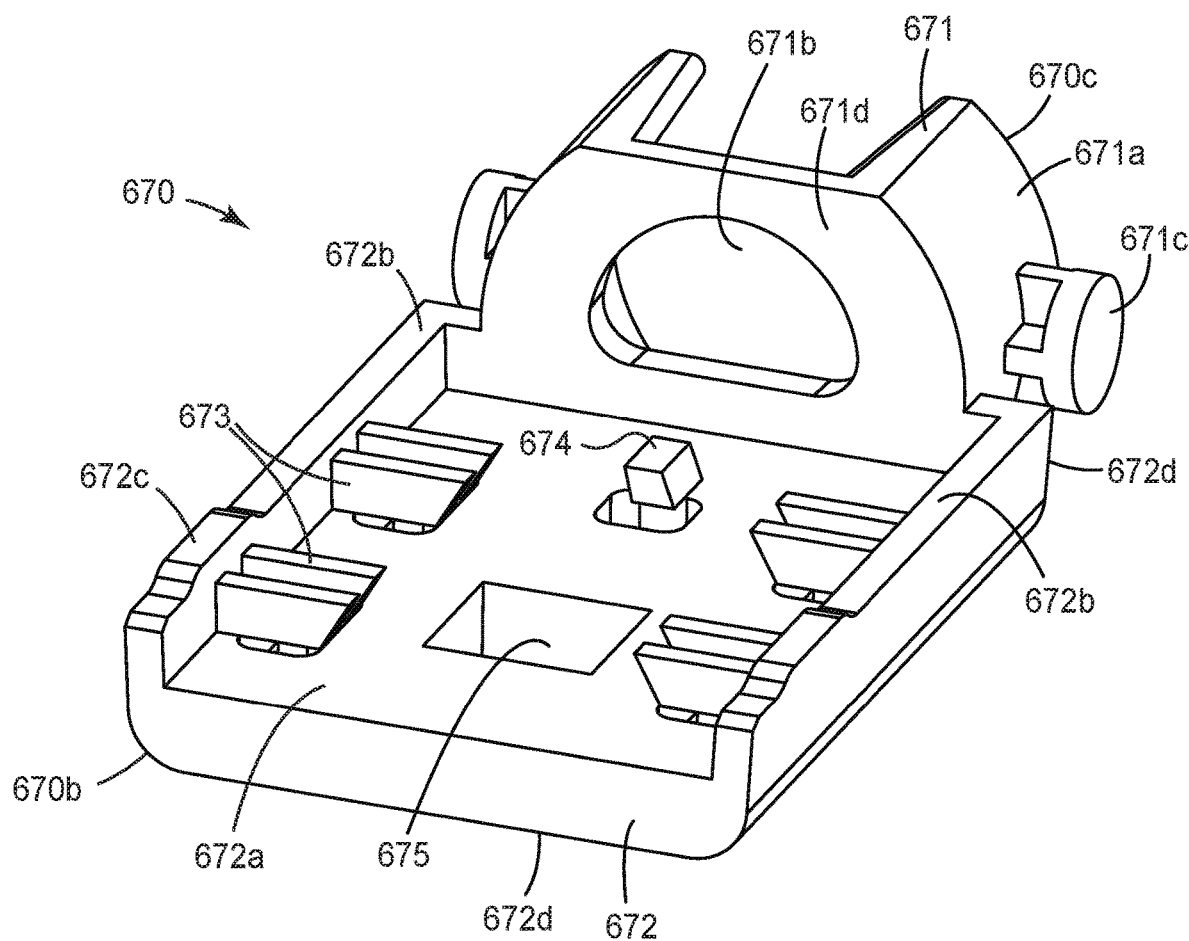
FIGS. 24A and 24B are two views of an element holder of the first bare fiber holder of FIGS. 23A-23C.
Figure 24B:
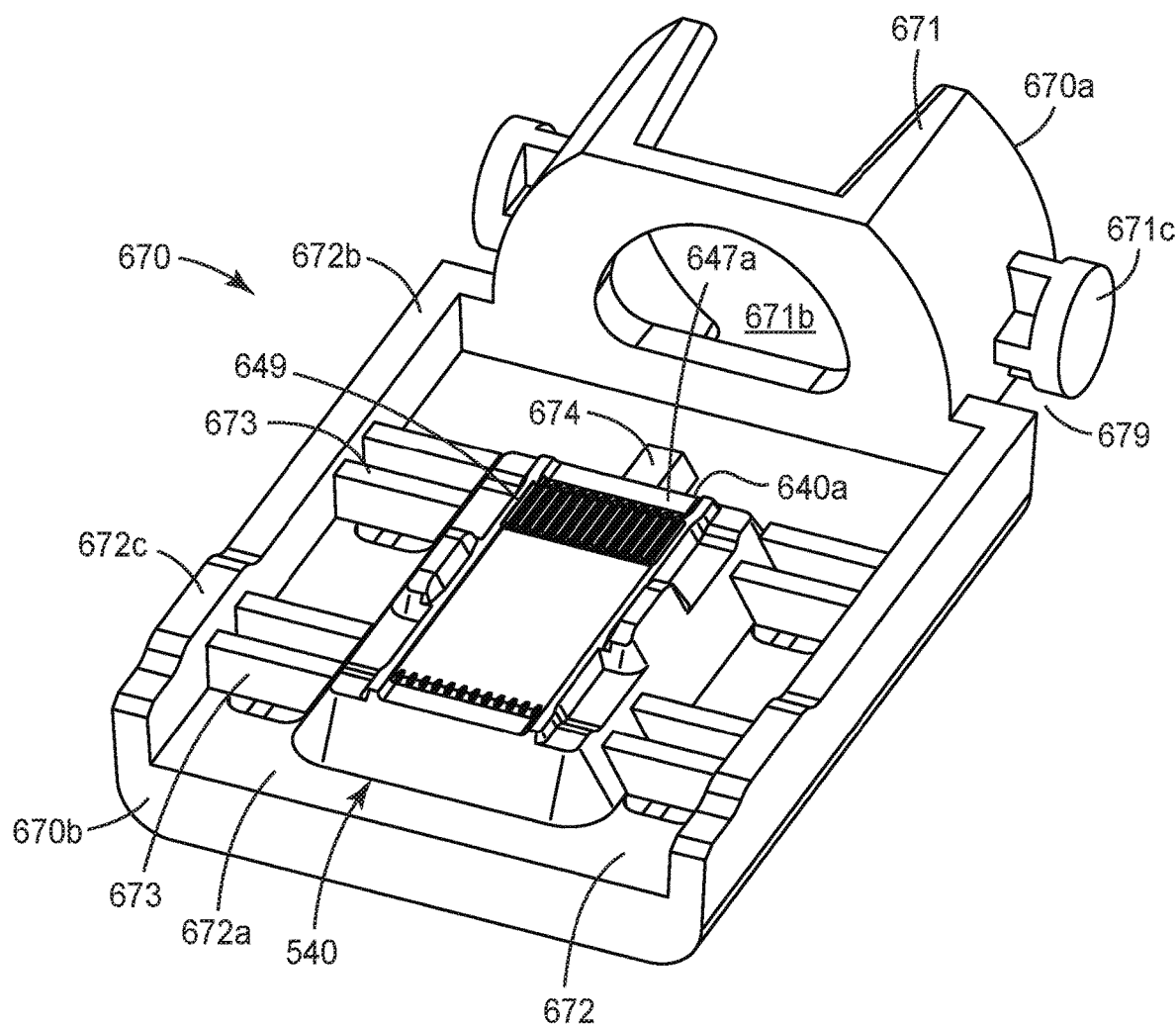

FIGS. 22A-22B are two views of exemplary optical fiber connection system 600. FIGS. 23A-23C illustrated the features and components of first bare fiber holder 620. FIGS. 24A-24B are detail views of the element platform 670 of the first bare fiber holder 620. FIGS. 25A-35B illustrated the features and components of second bare fiber holder 620'. FIGS. 26A-26C show the mating of the first and second bare fiber holders 620, 620' to form optical fiber connection system 600.

First bare fiber holder 620 has a first housing portion 630 and a second housing portion 640 that can be secured together to form the holder housing 621. Holder housing 621 is configured to arrange and hold the remaining components of the first bare fiber holder and to protect the exposed bare glass portion 55 of the optical fibers 54 supported within the first bare fiber holder. The first and second housing portions can be adhesively bonded together, secured by a snap fit, or a latching system. A crimp ring 229 can secure a first end of the first and second housing portions. In alternative embodiment, the holder housing can have a clam shell configuration having a first housing portion and a second housing portion that are joined by a living hinge. In the exemplary embodiment shown in FIGS. 11A-11E, each of the first and second housing 630, 640 can include a semi-cylindrical anchoring portion 633, 643 formed at their first ends 630a, 640a, respectively. The semi-cylindrical anchoring portion 633, 643 form a cylindrical anchoring portion 623 when the first and second housing portions are assembled to for the holder housing 601. Crimp ring 629 can also be fitted over and secured to the cylindrical anchoring portion 623 to anchor the cable jacket or strength members an optical fiber cable to the first bare fiber holder to enhance the cable retention strength of the first bare fiber holder. In the exemplary aspect shown in FIG. 11A, the cylindrical anchoring portion has a smooth outer surface. In some embodiment, it can be desirable to add teeth or ribs to the outer surface of the cylindrical anchoring portion to further increase the retention force.

In an exemplary aspect, the first and second housing portions 630, 640 can have a generally open rectangular channel profile having a base 642a and a pair of parallel walls 642b extending from the base, the side walls having a top edge 642c extending along the length of the side walls.

The top edge 632c of the first housing portion 630 is joined to a portion of the top edge 642c of the second housing portion 640 when the first and second housing portions are assembled to for the holder housing 601.

Optionally, a strain relief boot (not shown) can be mounted over the crimp ring to provide strain relief and bend control to an optical fibers or optical fiber cable at the point where the optical fibers enter the holder housing of the first bare fiber holder.

Referring to FIGS. 22B, 23C and 26C, a leaf spring 690 can be attached to second housing portion 640 of first bare fiber holder 620 to provide a vertical mating force (represented by directional arrows 698 in FIG. 26C) on a bottom surface 672d of element platform 670 of a mating or second bare fiber holder 620'. Similarly, leaf spring 680 attached to second housing portion 640 of second bare fiber holder 620' provides a vertical mating force (represented by directional arrows 698' in FIG. 26C) on a bottom surface 672d of element platform 670 of a first bare fiber holder 620. The combination of the vertical mating forces 698, 698' ensures the vertical alignment of the ends of the first and second optical fibers, while the sloped walls of the three lines of contact of clamping element 540 and splice elements 580 provide the lateral alignment of the optical fibers.

In an exemplary aspect, the second housing 660 can include a pair of spaced apart anchor bars 667 formed on the interior surface 661 of the second housing portion. Leaf spring 980 can be fitted into a slot 668 formed in the anchor bars to secure the leaf spring to the second housing portion. The leaf spring can have a generally arched profile comprising two arched arms 692 connected at both ends by a flat footer portion 694. The footer portion fits into the slot formed in the anchor bars to secure the leaf spring to the second housing portion. In an exemplary aspect, the leaf spring can be stamped from a piece of spring steel and formed into the leaf spring as shown in FIG. 23C.

The first bare fiber holder 620 further comprises a fiber alignment mechanism or clamping plate 540 as described previously with respect to FIG. 13. The clamping element is held by an element platform 670. In this embodiment, the optical fibers can be secured directly to the landing area 672a of the clamping element 540 using an adhesive. For example, an adhesive such as a fast-curing UV or visible light initiated adhesive or a thermally activated adhesive, such as a hot-melt material can be utilized to secure an array of optical fibers within the entrance openings 163a of the splice element. Securing the optical fibers in this area of the splice element still provides the advantages of remote gripping the optical fibers, but without the need for a separate fiber organizer such as that provided in bare fiber holder 120, 520, described above in reference to FIGS. 2A-2C and 12A-12C, respectively.

Element platform 670 includes a collar portion 671 which is attached to an element stage 672. Collar portion 671 can have a generally cylindrical shape that is configured to receive a portion of a compression spring 624. As shown in FIG. 12A, the collar portion can have an opening 671b through an end wall portion 671d where the element stage attaches to the collar portion. The opening permits passage of the optical fibers through the end wall of the collar portion element platform.

Element stage 672 has a base and sidewalls 672b extending from the base. The side walls extend along the longitudinal edges of the base from a second end 670b of the element platform to the collar portion 671. The base has a top surface 672a and a bottom surface 672d. Splice element 160 is anchored to the top surface by element catches 673, 674. In an exemplary aspect, the sidewalls can include a protrusion or bump 672c formed on the top of the sidewalls 672b to control the vertical offset between the clamping and splice elements held on the element platform during the mating of bare fiber holders 620, 620'.

In an exemplary aspect, element stage 672 can include a window 675 that extends through the base of the element stage under the interconnection area 544 of clamping element 540 where the first and second optical fibers are joined end-to-end (see FIG. 11E). In an exemplary aspect, a pair of bare fiber holders 620 can be permanently joined together by an index matched optical adhesive. An exemplary optical adhesive can be cured with actinic radiation via a rapid and straightforward procedure using an eye-safe visible, e.g., blue, LED light source such as is described in United States Patent Application No. such as is described in U.S. patent application Ser. No. 15/695,842, herein incorporated by reference in its entirety, herein incorporated by reference in its entirety. The curing radiation can be shined on the adhesive through at least one of the exemplary splice elements through window 675.

Collar portion 671 can also include a pall 671c that extends from the outer surface 671a of the collar portion either side of the collar portion. A translation gap 679 is formed between the pall and the end 672c of the sidewall 672b. Tapered ridges 639, 669 disposed on the interior surface of the first and second housing portions 630, 660 form a track that fits in gap 679 to control the relative position of the element platform when two of the exemplary bare fiber holders 620, 620' are mated together.

The element platform 670 can be resiliently mounted in the holder housing 621. In an exemplary aspect, a compression spring 622 can be disposed between the holder housing 601 and the element platform. The compression spring applies a forward force (represented by directional arrows 699 in FIG. 22B) on the element platform and the clamping/splice element disposed thereon. For example, the holder housing can comprise a spring seating area 624 that is formed when the first and second housing portions 630, 660 are assembled together.

Using this configuration, optical fiber connection system 600 can utilize the spring forces of the fiber array, and the main compression spring to achieve a force balance to create a reliable dry splice interface (no optical coupling material or index matching gel or adhesive) in the optical path in conjunction with fiber end face shaping techniques known in the industry.

Figure 25A:
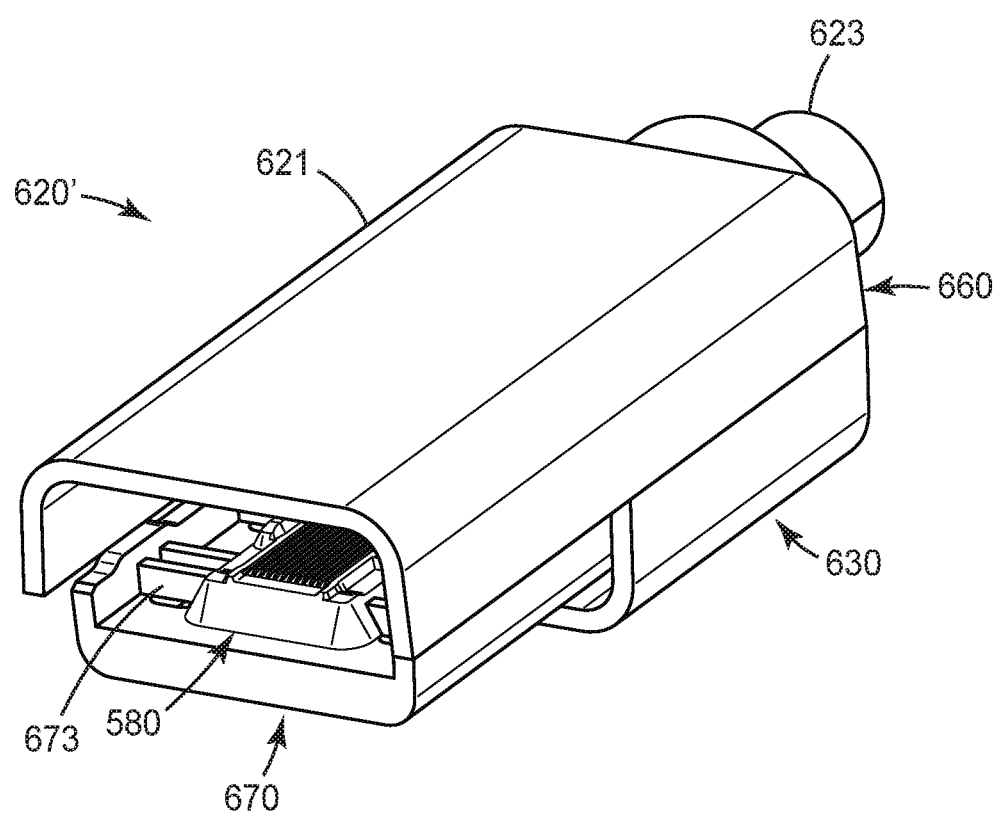
FIGS. 25A-25B are two views of a second bare fiber holder of the exemplary optical fiber connection system of FIGS. 22A and 22B.
Figure 25B:
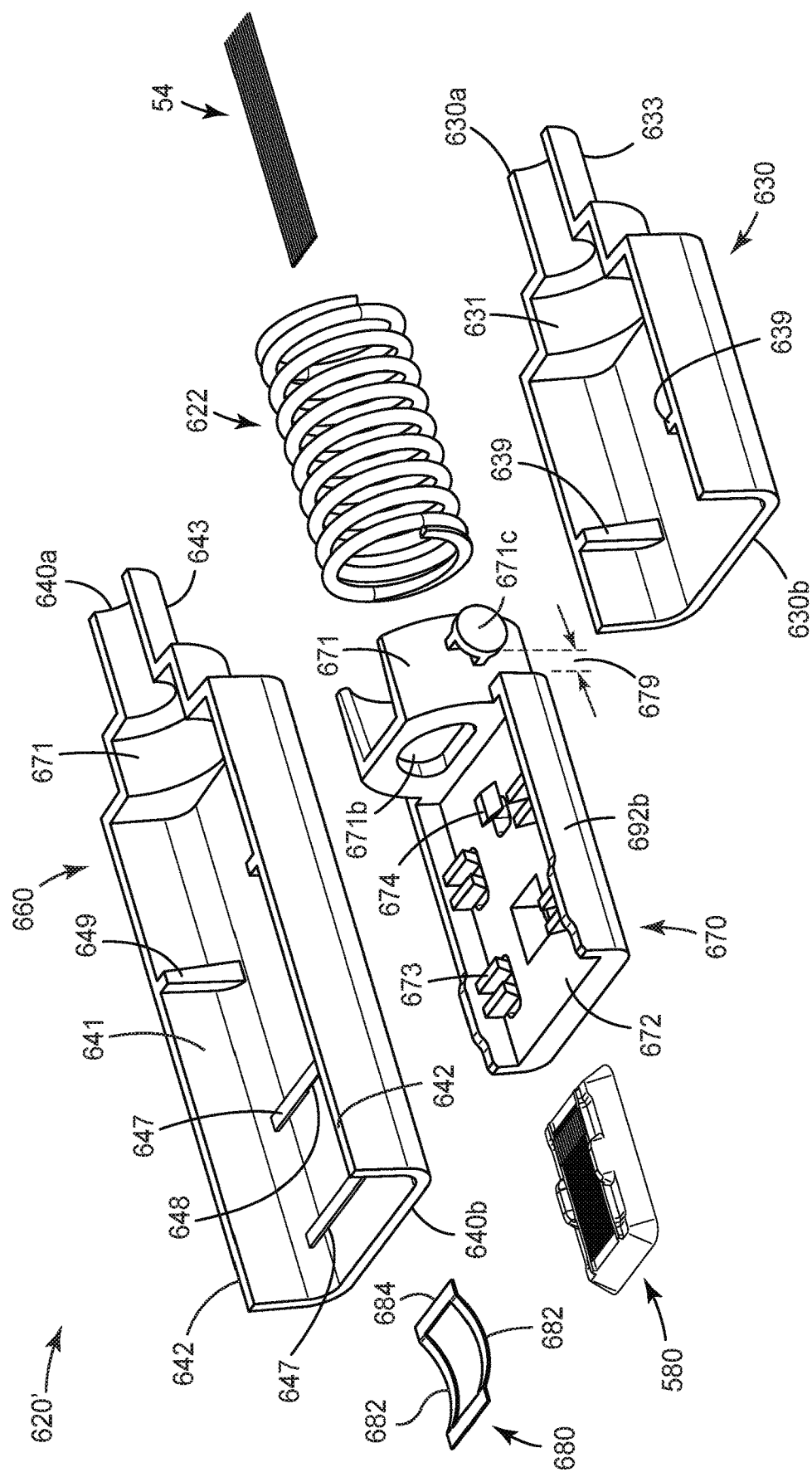
Figure 26C:
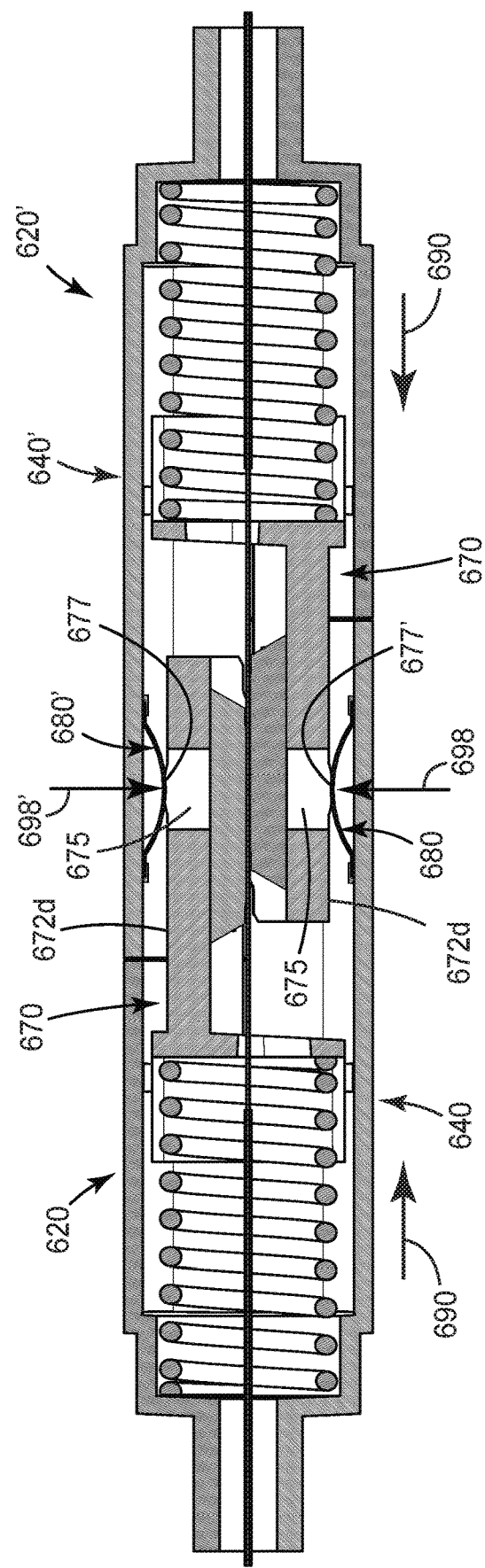

FIGS. 25A-25B show the second bare fiber holder 620' that is configured to mate with the first bare fiber holder 620 of FIGS. 23A-23C to form optical fiber connection system 600. The structure of the first and second bare fiber holders is essentially the same apart from the clamping element 540 in the first bare fiber holder is replaced with splice element 580 in the second bare fiber holder 620'. The second end of splice element 580 abuts against element catch 674 on the element stage.

FIGS. 26A-26C are three cross-sectional views showing the mating of two bare fiber holders 620, 620' of optical fiber splice connection system 600. The first and second bare fiber holders 620, 620' are brought together until the top edge 642c, at the second ends 660b, of the second housing 660 of the first and second bare fiber holders contact each other. As bare fiber holder 620' moves toward bare fiber holder 620, as indicated by directional arrow 695 element stage 672 of bare fiber holder 620' enters the space between stage element stage 672 of bare fiber holder 620 and the second housing 660. Similarly, the element stage 672 of bare fiber holder 620 enters the space between stage element stage 672 of bare fiber holder 620' and the second housing 660 at the same time. As bare fiber holder 620' continues to move toward bare fiber holder 620, the cam surface of the locking protrusions 548b, 588b' and the rails 548, 588 of the clamping element 540 and the splice element 580 engage to roughly align the height of the clamping element and splice element with respect to one another. FIG. 26A shows the initial engagement between the rails (not shown) and the locking protrusions 168b, 168b'. As this occurs, leaf spring 690 begins to apply a vertical force to the back surfaces 672d, of the element stages 672 pushing the clamping element 540 and the splice element 580 toward each other. The vertical force increases as the leaf spring contact the camming feature 677 on the bottom surface of the element stage, up to 6.5-4.5 lbs. Once the bare fiber holders 620, 620' are fully mated as shown in FIG. 26C, the leaf springs 690 continues to apply the vertical force to element holders 670 and in turn the splice elements 540, 580. The vertical force is centered on the point where the first and second optical fibers 54, 54' meet to secure and align the fibers in the alignment channels of the splice elements.

An exemplary optical connection made in accordance with the present disclosure should have an insertion loss of less than 0.1 dB, a return loss variation of less than 5 dB when temperature cycled from −10° C. to +75° C. and have a pullout strength of greater than 0.45 $lb_f$.

The exemplary optical fiber connection systems of the present disclosure can be used in a wide range of applications where low loss optical connections are needed, especially when the connections are semi-permanent or permanent. In some embodiments, the exemplary multifiber devices can be used in fiber optic cassettes, terminals, patch panels, etc. where the splice can be located at a bulkhead or through the wall of an enclosure.

For example, the exemplary optical fiber connection systems can be used in an optical cassette, such as is described in U.S. Provisional Patent Application No. 62/544,370, herein incorporated by reference, wherein the optical cassette or terminal comprises an enclosure having a top, a bottom and a plurality of side walls disposed between the top and the bottom, and at least one exemplary connection system of the present disclosure disposed through one of the plurality of sidewalls. A plurality signal paths can exit the cassette or through one of the plurality of sidewalls wherein the plurality signal paths can comprise a connection point at the sidewall where the plurality signal paths exit the cassette. The exemplary optical fiber connection system of the present disclosure can be used for the multifiber connection device and/or for the single fiber connection points. In an exemplary use in which the cassette or terminal can comprise a plurality of paired single fiber connection points, such that the first of the pair of single fiber connection points is designated as a transmit port and the second of the pair of single fiber connection points is designated as a receive port. In this aspect, signals carried by the plurality of outside optical fibers can be reordered within the cassette or terminal such that the signals leaving the cassette are in a different order than they enter the cassette. In some embodiments, this reordering of the signal paths is used to manage the polarity of the send and receive ports.

In an alternative application, the exemplary optical fiber connection system can be used to make an optical fiber harness assembly. For example, in the exemplary optical fiber connection system may be used to directly connect fiber fanout to a continuous transmission portion or cable in either the field or in the factory. This can be especially advantageous when the fanout portion is made in a first location, the transmission portion is made at a second location and where the fanout portion to a continuous transmission portion are brought together at a third location.

Various modifications, equivalent processes, as well as numerous structures to which the present invention may be applicable will be readily apparent to those of skill in the art to which the present invention is directed upon review of the present specification.

We claim:

1. An optical fiber connection system configured to interconnect a plurality of first and second optical fibers, the connection system comprising:
   a first bare fiber holder comprising a bare fiber holding plate, wherein the bare fiber holding plate of the first bare fiber holder is a clamping plate having an interconnection portion with a generally planar surface and wherein bare ends of the plurality of first optical fibers are disposed adjacent to interconnection portion and where the plurality of first optical fibers are secured in the first bare fiber holder at a first distance from the bare ends of the plurality of first optical fibers, the clamping plate including a thin flexible region disposed above a well formed in a bottom surface of the clamping plate; and
   a second bare fiber holder comprising a bare fiber holding plate, wherein the bare fiber holding plate of the second bare fiber holder is a splicing plate having a plurality of alignment channels and wherein a bare end of each of the second optical fibers extend at least partially into one of the plurality of alignment channels and wherein the plurality of second optical fibers are held at a second distance from the bare ends of the plurality of second optical fibers,
   wherein the first and second bare fiber holders are mated together to simultaneously form a plurality of optical connections between the bare ends of the plurality of first and second optical fibers.

2. The connection system of claim 1, wherein at least one of the first and second bare fiber holders is ferrule-less.

3. The connection system of claim 1, wherein both the first bare fiber holder and the second bare fiber holder are ferrule-less.

4. The connection system of claim 1, wherein the clamping plate comprises alignment channels disposed on either side of the planar surface.

5. The connection system of claim 4, further comprising a first fiber organizer disposed in the first bare fiber holder, wherein the first fiber organizer comprises a comb structure that aligns the optical fibers before the plurality of optical fibers enter the alignment channels on one side of the planar surface.

6. The connection system of claim 5, wherein the comb structure includes an array of grooves, with each groove configured to guide an optical fiber disposed therein and a remote gripping region to remotely grip the plurality of first or second optical fibers at a distance from their bare ends.

7. The connection system of claim 6, wherein the comb structure further comprising a ramp section adjacent the groove array, the ramp section including a gradual rising portion.

8. The connection system of claim 1, wherein the well is filled with an elastomeric filler material.

9. The connection system of claim 1, wherein at least one of the clamping plate and the splicing plate is formed of a low coefficient of thermal expansion silica material.

10. The connection system of claim 9, wherein the low coefficient of thermal expansion silica material is a net shape cast and cure silica material.

11. The connection system of claim 1, further comprising an optical coupling material disposed in at least a portion of the plurality alignment channels in the splicing plate such that the optical coupling material is positioned between the bare ends of the plurality of first and second optical fibers.

12. The connection system of claim 5, wherein at least one of the first and second bare fiber holders further comprises a first housing portion and a second housing portion that can be secured together to form the inner housing that at least partially surrounds the bare fiber holding plate of the first or second bare fiber holder.

13. The connection system of claim 12, further comprising a resilient element disposed between a portion of the first fiber organizer and the first housing portion; and an intermediate spring element disposed between a front portion of the first fiber organizer and the bare fiber holding plate.

14. The connection system of claim 1, wherein the first and second bare fiber holders are mated in the field to optically connect the plurality of first and second optical fibers.

15. The connection system of claim 1, wherein the first and second bare fiber holders are mated in the factory to optically connect the plurality of first and second optical fibers.

16. An optical fiber connection system configured to interconnect at least a first and second optical fiber, the connection system comprising:
 a first bare fiber holder comprising a bare fiber holding plate, wherein the bare fiber holding plate of the first bare fiber holder is a clamping plate having an interconnection portion with a generally planar surface and wherein a bare end of the first optical fiber is disposed adjacent to interconnection portion and where the first optical fiber is secured in the first bare fiber holder at a first distance from the bare end of the first optical fiber, the clamping plate including a thin flexible region disposed above a well formed in a bottom surface of the clamping plate; and
 a second bare fiber holder comprising a bare fiber holding plate, wherein the bare fiber holding plate of the second bare fiber holder is a splicing plate having an alignment channel and wherein a bare end of the second optical fiber extend at least partially into the alignment channels and wherein the second optical fiber is held at a second distance from the bare end of the second optical fiber,
 wherein the first and second bare fiber holders are mated together to simultaneously form an optical connection between the bare ends of the first and second optical fibers.

17. The connection system of claim 16, wherein at least one of the first and second bare fiber holders is ferrule-less.

18. The connection system of claim 16, wherein both the first bare fiber holder and the second bare fiber holder are ferrule-less.

19. The connection system of claim 16, wherein the clamping plate comprises an alignment channel disposed on either side of the planar surface.

20. The connection system of claim 16, wherein the well is filled with an elastomeric filler material.

21. The connection system of claim 16, wherein at least one of the clamping plate and the splicing plate is formed of a low coefficient of thermal expansion silica material.

22. The connection system of claim 21, wherein the low coefficient of thermal expansion silica material is a net shape cast and cure silica material.

23. The connection system of claim 16, further comprising an optical coupling material disposed in at least a portion of the plurality alignment channels in the splicing plate such that the optical coupling material is positioned between the bare ends of the plurality of first and second optical fibers.

24. The connection system of claim 16, wherein at least one of the first and second bare fiber holders further comprises a first housing portion and a second housing portion that can be secured together to form the inner housing that at least partially surrounds the bare fiber holding plate of the first or second bare fiber holder.

25. The connection system of claim 16, wherein the clamping plate is a clamping element.

26. The connection system of claim 16, wherein the splicing plate is a splicing element.

* * * * *